(12) United States Patent
Saito et al.

(10) Patent No.: US 10,373,640 B2
(45) Date of Patent: Aug. 6, 2019

(54) INFORMATION PROCESSING DEVICE, INFORMATION PROCESSING METHOD, AND PROGRAM

(71) Applicant: SONY CORPORATION, Tokyo (JP)

(72) Inventors: Kimihiro Saito, Saitama (JP); Kenji Yamamoto, Kanagawa (JP); Noriaki Nishi, Kanagawa (JP); Junya Shiraishi, Kanagawa (JP); Nobuyoshi Kobayashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/780,090

(22) PCT Filed: Jan. 12, 2017

(86) PCT No.: PCT/JP2017/000779
§ 371 (c)(1),
(2) Date: May 30, 2018

(87) PCT Pub. No.: WO2017/135000
PCT Pub. Date: Aug. 10, 2017

(65) Prior Publication Data
US 2018/0358047 A1 Dec. 13, 2018

(30) Foreign Application Priority Data
Feb. 5, 2016 (JP) ................................ 2016-021294

(51) Int. Cl.
*G11B 7/00* (2006.01)
*G11B 7/005* (2006.01)
(Continued)

(52) U.S. Cl.
CPC .............. *G11B 7/005* (2013.01); *G11B 7/131* (2013.01); *G11B 7/133* (2013.01); *G11B 20/10009* (2013.01); *G11B 20/10046* (2013.01)

(58) Field of Classification Search
None
See application file for complete search history.

(56) References Cited

U.S. PATENT DOCUMENTS 6,400,666 B1 * 6/2002 Yoo .................... G11B 7/0956
369/44.32
6,594,214 B1 * 7/2003 Misaizu ............. G11B 27/3027
369/53.11
(Continued)

FOREIGN PATENT DOCUMENTS

JP H05-325196 A 12/1993
JP H06-162515 A 6/1994
(Continued)

OTHER PUBLICATIONS

Feb. 1, 2019, European Search Report issued for related EP Application No. 17747163.8.

*Primary Examiner* — Peter Vincent Agustin
(74) *Attorney, Agent, or Firm* — Paratus Law Group, PLLC

(57) ABSTRACT

Provided are a device and a method which are capable of performing crosstalk-removed high-quality data reproduction from a high-density recording type optical disc. The device includes a photo detector that outputs a readout signal from a reproduction track of an information recording disc, an adjacent track reproduction binary signal supply unit that outputs a binary signal (binary data) which is a reproduction signal of an adjacent track of the reproduction track, a multi-input adaptive equalizer that includes an equalizer unit that receives the readout signal from the reproduction track and an adjacent track reproduction binary signal and outputs an equalization signal by an adaptive equalization process based on an input signal, and a binarization processing unit (Continued)

that executes a binarization process based on the equalization signal and generates a reproduction signal of the reproduction track.

17 Claims, 37 Drawing Sheets

(51) Int. Cl.
    *G11B 7/131* (2012.01)
    *G11B 7/133* (2012.01)
    *G11B 20/10* (2006.01)

(56) References Cited

U.S. PATENT DOCUMENTS

| | | | |
|---|---|---|---|
| 2002/0018411 A1* | 2/2002 | Kumagai | G11B 7/005 369/47.17 |
| 2005/0259551 A1* | 11/2005 | Kudo | G11B 7/0903 369/59.22 |
| 2007/0286048 A1* | 12/2007 | Hayashi | G11B 20/10009 369/59.22 |
| 2011/0044149 A1* | 2/2011 | Yamamoto | G11B 7/00736 369/100 |
| 2012/0082201 A1* | 4/2012 | Shiraishi | G11B 20/10009 375/232 |
| 2014/0341006 A1 | 11/2014 | Miyashita et al. | |
| 2016/0218808 A1* | 7/2016 | Nishi | G11B 20/10009 |

FOREIGN PATENT DOCUMENTS

| | | |
|---|---|---|
| JP | 2003-100017 A | 4/2003 |
| JP | 2003-223761 A | 8/2003 |
| JP | 2005-332453 A | 12/2005 |
| JP | 2007-518202 A | 7/2007 |
| JP | 4184585 B2 | 11/2008 |
| JP | 2012-079385 A | 4/2012 |
| JP | 2015-057753 A | 3/2015 |
| WO | WO 2015/022767 A1 | 2/2015 |
| WO | WO 2016/006157 A1 | 1/2016 |

\* cited by examiner

FIG. 35

| | TRACK COMPATIBLE OUTPUT SIGNALS | INPUT TO MULTI-INPUT ADAPTIVE EQUALIZER | REFERENCE CIRCUIT EXAMPLE |
|---|---|---|---|
| (1) | Tn<br>FIVE SIGNALS (A TO E) | Tn: FIVE SIGNALS A TO E (DIGITIZED ANALOG SIGNALS) | FIG. 4 |
| (2) | Tn−1 / Tn / Tn+1<br>FIVE SIGNALS (A TO E) / FIVE SIGNALS (A TO E) / FIVE SIGNALS (A TO E) | Tn−1: FIVE SIGNALS A TO E (DIGITIZED ANALOG SIGNALS)<br>Tn: FIVE SIGNALS A TO E (DIGITIZED ANALOG SIGNALS)<br>Tn+1: FIVE SIGNALS A TO E (DIGITIZED ANALOG SIGNALS) | FIG. 13 |
| (3) | Tn−1 / Tn / Tn+1<br>BINARY SIGNAL (BINARY) / FIVE SIGNALS (A TO E) / BINARY SIGNAL (BINARY) | Tn−1: BINARY SIGNAL D(tn−1) (BINARY DATA)<br>Tn: FIVE SIGNALS A TO E (DIGITIZED ANALOG SIGNALS)<br>Tn+1: BINARY SIGNAL D(tn+1) (BINARY DATA) | FIGS. 15 AND 16<br>FIGS. 25 TO 29 |
| (4) | Tn−1 / Tn / Tn+1<br>BINARY SIGNAL (BINARY) / ONE SIGNAL / BINARY SIGNAL (BINARY) | Tn−1: BINARY SIGNAL D(tn−1) (BINARY DATA)<br>Tn: ONE SIGNAL (DIGITIZED ANALOG SIGNAL)<br>Tn+1: BINARY SIGNAL D(tn+1) (BINARY DATA) | FIGS. 15 AND 16<br>FIGS. 25 TO 29 |

*FIG. 37*

| | TRACK COMPATIBLE OUTPUT SIGNALS | INPUT TO MULTI-INPUT ADAPTIVE EQUALIZER | REFERENCE CIRCUIT EXAMPLE |
|---|---|---|---|
| (1) | Tn — FIVE SIGNALS (A TO E) | Tn: FIVE SIGNALS A TO E (DIGITIZED ANALOG SIGNALS) | FIG. 4 |
| (2) | Tn−1 FIVE SIGNALS (A TO E)   Tn FIVE SIGNALS (A TO E) | Tn−1: FIVE SIGNALS A TO E (DIGITIZED ANALOG SIGNALS)<br>Tn: FIVE SIGNALS A TO E (DIGITIZED ANALOG SIGNALS) | FIG. 13 |
| (3) | Tn−1 D BINARY SIGNAL (BINARY)   Tn FIVE SIGNALS (A TO E) | Tn−1: BINARY SIGNAL D(tn−1) (BINARY DATA)<br>Tn: FIVE SIGNALS A TO E (DIGITIZED ANALOG SIGNALS) | FIGS. 17 AND 18<br>FIGS. 19 TO 24 |

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2017/000779 (filed on Jan. 12, 2017) under 35 U.S.C. § 371, which claims priority to Japanese Patent Application No. 2016-021294 (filed on Feb. 5, 2016), which are all hereby incorporated by reference in their entirety.

TECHNICAL FIELD

The present disclosure relates to an information processing device, an information processing method, and a program. More specifically, the present disclosure relates to an information processing device, an information processing method, and a program which are capable of implementing high-quality data reproduction from a disc in which high-density data recording is performed.

BACKGROUND ART

Optical discs such as digital versatile discs (DVDs) or Blu-ray (a registered trademark) discs (BD) have been widely used as media for recording various data in addition to images and programs.

The optical discs such as BDs are required to perform high-density information recording.

As a method of increasing the density of optical discs, there are a method of reducing a channel bit length, that is, a mark length, and increasing a density in a linear density direction and a method of narrowing a track pitch.

However, in a case where the density is increased in the linear density direction, there arises a problem that inter-symbol interference increases.

Further, if the track pitch is narrowed, information leaking from an adjacent track (an adjacent track crosstalk) increases.

In order to reduce the adjacent track crosstalk (hereinafter referred to simply as a "crosstalk"), various methods have been proposed.

For example, Patent Document 1 (International Publication No. WO 2016/006157) discloses a configuration of generating a reproduction signal in which the crosstalk is reduced by dividing a light receiving region of a photo detector and performing an adaptive equalization process using a plurality of light receiving signals obtained from respective split regions.

However, in this method, it is difficult to reliably analyze a recording signal of an adjacent track, and it is difficult to remove the crosstalk sufficiently.

Further, a technique of cancelling the crosstalk by supplying a reproduction signal of a track of a reproduction target and reproduction signals of tracks on both sides thereof to an adaptive equalizer unit and controlling a tap coefficient of the adaptive equalizer unit is disclosed in Patent Document 2 (Japanese Patent Application Laid-Open No. 2015-05775.3), Patent Document 3 (Japanese Patent Application Laid-Open No. 2012-079385), Patent Document 4 (Japanese Patent Application No. 4184585), and the like.

However, in the configuration described in Patent Documents mentioned above, in order to acquire a signal from which the crosstalk signal has been removed from a read signal of a current reproduction track, it is necessary to adjust, phases of the read signal of the current reproduction track and the read signals of the tracks on both sides thereof and then input the resulting signal to the adaptive equalizer unit.

For this process, a memory for temporarily storing the read signal of the track adjacent to the current reproduction track or a delay processing configuration is required, and thus the required memory capacity increases, and there is a problem in that the circuit size increases.

CITATION LIST

Patent Document

Patent Document 1: International Publication No. WO 2016/006157
Patent Document 2: Japanese Patent Application Laid-Open No. 2015-057753
Patent Document 3: Japanese Patent Application Laid-Open No. 2012-079385
Patent Document 4: Japanese Patent Application No. 4184585

SUMMARY OF THE INVENTION

Problems to be Solved by the Invention

The present disclosure was made, for example, in light of the above-mentioned problems, and it is an object of the present disclosure to provide an information processing device, an information processing method, and a program which are capable of implementing a reproduction process of high-quality data in which the crosstalk caused by the recording signal of the adjacent track or the like is suppressed.

In one embodiment of the present disclosure, it is an object to provide an information processing device, an information processing method, and a program which are capable of implementing a reproduction process of high-quality data in which the crosstalk is suppressed while suppressing a necessary capacity of the memory for temporary storing the read data of the adjacent track to be small without increasing a circuit size.

Solutions to Problems

A first aspect of the present disclosure is an information processing device, including:
a photo detector that outputs a readout signal from a reproduction track of an information recording disc;
an adjacent track reproduction identification signal supply unit that outputs a reproduction identification signal obtained from a reproduction signal of an adjacent track of the reproduction track;
a multi-input adaptive equalizer that includes an equalizer unit that receives the readout signal from the reproduction track and an adjacent track reproduction identification signal and outputs an equalization signal by an adaptive equalization process based on an input signal; and
a reproduction signal generating unit that executes a reproduction signal generation process based on the equalization signal and generates a reproduction signal of the reproduction track.

Furthermore, a second aspect of the present disclosure is an information processing method executed in an information processing device, the method including:

outputting, by a photo detector, a readout signal from a reproduction track of an information recording disc;

outputting, by an adjacent track reproduction identification signal supply unit, a reproduction identification signal obtained from a reproduction signal of an adjacent track of the reproduction track;

inputting, by a multi-input adaptive equalizer, the readout signal from the reproduction track and an adjacent track reproduction identification signal to an equalizer unit and outputting an equalization signal by an adaptive equalization process based on an input signal; and executing, by a reproduction signal generating unit, a reproduction signal generation process based on the equalization signal and generating a reproduction signal of the reproduction track.

Furthermore, a third aspect of the present disclosure is a program causing an information processing device to execute in formation processing including:

a process of outputting, by a photo detector, a readout signal from a reproduction track of an information recording disc;

a process of outputting, by an adjacent track reproduction identification signal supply unit, a reproduction identification signal obtained from a reproduction signal of an adjacent track of the reproduction track;

a process of inputting, by a multi-input adaptive equalizer, the readout signal from the reproduction track and an adjacent track reproduction identification signal to an equalizer unit and outputting an equalization signal by an adaptive equalization process based on an input signal; and a process of generating, by a reproduction signal generating unit, a reproduction signal of the reproduction track by executing a reproduction signal generation process based on the equalization signal.

Further, for example, a program of the present disclosure is a program which can be provided to an information processing device or a computer system which is capable of executing various program codes through a storage medium or a communication medium provided in a computer readable format. As the program is provided in a computer readable format, a process according to the program is implemented on the information processing device or the computer system.

Still other objects, features, and advantages of the present disclosure will become apparent from detailed description based on an embodiment of the present disclosure to be described later or the appended drawings. Further, in this specification, a system refers to a logical aggregate configuration of a plurality of devices and is not limited to a configuration in which devices of respective components are in the same housing.

Effects of the Invention

According to a configuration of one embodiment of the present disclosure, a device and a method which are capable of performing crosstalk-removed high-quality data reproduction from a high-density recording type optical disc are realized.

Specifically, the device includes a photo detector that outputs a readout signal from a reproduction track of an information recording disc, an adjacent track reproduction binary signal supply unit that outputs a binary signal (binary data) which is a reproduction signal of an adjacent track of the reproduction track, a multi-input adaptive equalizer that includes an equalizer unit that receives the readout signal from the reproduction track and an adjacent track reproduction binary signal and outputs an equalization signal by an adaptive equalization process based on an input signal, and a binarization processing unit that executes a binarization process based on the equalization signal and generates a reproduction signal of the reproduction track.

With this configuration, a device and a method which are capable of performing crosstalk-removed high-quality data reproduction from a high-density recording type optical disc are realized.

Further, the effects described in this specific area are merely examples and not intended to be limited and may have additional effects.

BRIEF DESCRIPTION OF DRAWINGS

FIG. 35 is a diagram illustrating each data illustrated in FIG. 34.

FIG. 37 is a diagram illustrating each piece of data illustrated in FIG. 34.

MODE FOR CARRYING OUT THE INVENTION

Hereinafter, an information processing device, an information processing method, and a program according to the present disclosure will be described with reference to the appended drawings. Further, the description proceeds in accordance with the following items.

1. Configuration and reproduction process example of information processing device
  1-1. Configuration example of optical pickup
  1-2. Configuration example of data detection processing unit
2. Basic configuration example of crosstalk cancellation process using read signal of adjacent track
3. Configuration and process of executing crosstalk cancellation using binary reproduction signal (binary data) of adjacent track
  3-1. Example in which reproduction signals of two adjacent tracks on both sides are applied
  3-2. Example in which reproduction signal of one adjacent track is applied
  3-3. Specific configuration example of adjacent track reproduction binary signal supply unit in example in which reproduction signal of one adjacent track is applied and configuration example of information processing device
  3-4. Specific configuration example of adjacent track reproduction binary signal supply unit in example in which reproduction signals of two adjacent tracks are applied and configuration example of information processing device
  3-5. Configuration example in which parallel reproduction process of plurality of tracks is executed
4. Quality evaluation of reproduction signal using binary reproduction signal (binary data) of adjacent track
5. Conclusion of configuration of present disclosure

[1. Configuration and Reproduction Process Example of Information Processing Device]

First, a configuration and a process example of an information processing device that executes a data recording/reproducing process to which an optical disc, for example, a Blu-ray (a registered trademark) disc (BD) is applied will be described.

Figure 1:
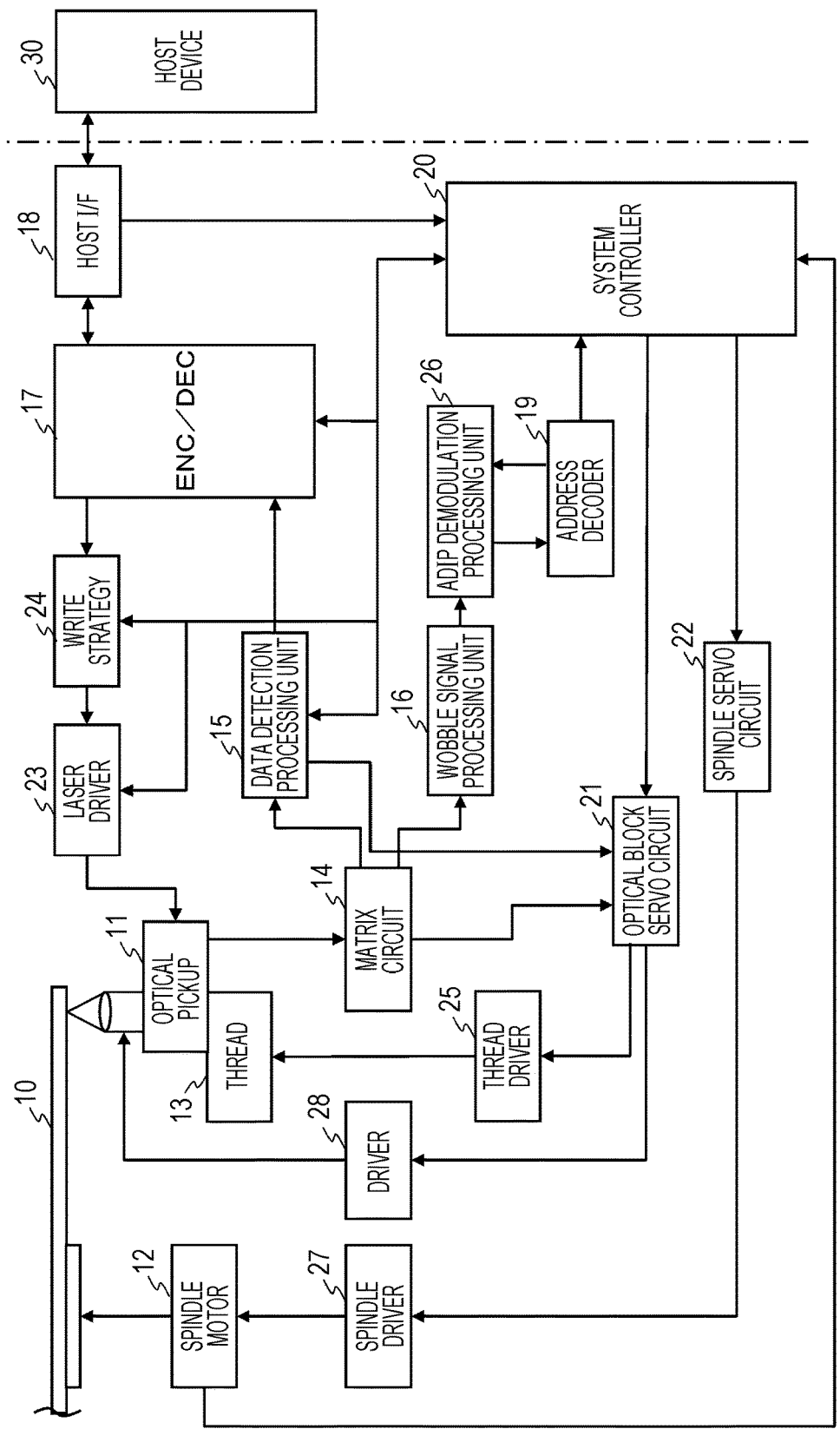
FIG. 1 is a diagram illustrating a configuration example of an information processing device.

FIG. 1 is a block diagram illustrating a configuration example of an information processing device that executes a data reproducing process and a recording process on an optical disc 10.

As illustrated in FIG. 1, the information processing device includes an optical pickup 11 that records or reproduces information in or from the optical disc 10 serving as an optical recording medium, and a spindle motor 12 that rotates the optical disc 10.

In order to move the optical pickup 11 in a radial direction of the optical disc 10, a thread (feed motor) 13 is installed.

The optical disc 10 is, for example, a high-density optical disc such as a Blu-ray (a registered trademark) disc (BD).

For example, the BD is a high-density optical disc having a recording capacity of about 25 GB in one layer on one side and about 50 GB in two layers on one side.

Further, in the BD standard, in order to reduce a beam spot diameter, a light source wavelength is set to 405 nm, and a numerical aperture NA of an objective lens is increased to 0.85. According to the BD standard, the spot diameter can be reduced to 0.58 μm.

Further, in recent years, for the Blu-ray (a registered trademark) disc (BD), BDXL (a registered trademark) in which the channel bit length, that is, the mark length is reduced, the density is increased in the linear density direction, and a large capacity of 100 GB in three layers and 128 GB in 4 layers is implemented has been put into practical use.

Further, in order to increase the recording capacity, a method of recording data in both a groove track and a land track (a land/groove recording method) has been also employed.

Further, a groove set along the recording track of the disc is referred to as a groove (G), and a track formed by the groove is referred to as a groove track.

Further, an area serving as a mountain portion sandwiched between two grooves is referred to as a land (L), and a track formed by the land is referred to as a land track.

In the high-density recording type disc, data is recorded in either the groove (G) or the land (L). With this configuration, more data can be recorded in the disc.

However, in such a high-density recording disc, there is a problem, that, the crosstalk is highly likely to occur in the data reproducing process.

In other words, there is a problem that the crosstalk in which, data of an adjacent track is mixed into readout data of a current readout track as noise is likely to occur.

If the optical disc 10 is loaded into the information processing device, it is rotationally driven at a constant linear velocity (CLV) or a constant angular velocity (CAV) by the spindle motor 12 at the time of recording/reproducing.

A CAV or a zone CAV is preferable in order to align a phase of a wobble groove uniform in a half radial direction of the optical disc 10.

At the time of reproducing, mark information recorded on a track on the optical disc 10 is read out by the optical pickup (optical head) 11.

At the time of data recording to the optical disc 10, the optical pickup 11 records user data on a track on the optical disc 10 as a change of a phase change mark, a dye change mark, or the like in brightness (reflectance) or a reflection phase (complex reflectance).

In the case of a recordable disc, a recording mark according to the phase change mark is recorded on the track formed by the wobbling groove, but the phase change mark is recorded with a linear density of 0.12 μm/bit and 0.08 μm/channel bit in the case of a BD of 23.3 GB per layer in accordance with a run length limited (RLL) (1, 7) parity preserve/prohibit repeated minimum transition run length (rmtr) (PP) modulation scheme or the like.

Similarly, the phase change mark is recorded with a density corresponding to a channel bit length depending on a disc type such as a linear density of 0.0745 μm/channel bit in the case of a BD of 25 GB/layer, with a linear density of 0.05826 μm/channel bit in the case of BDXL of 32 GB/layer, or a linear density of 0.05587 μm/channel bit in the case of BDXL of 33.4 GB/layer.

If a channel clock cycle is indicated by "T," the mark length is 2 T to 8 T.

In the case of a read only disc, no groove is formed, but data modulated in accordance with the RLL (1, 7) PP modulation scheme is similarly recorded as an embossed pit sequence.

In an inner circumference area and the like of the optical disc 10, for example, physical information of a disc or the like is recorded by an embossed pit or a wobbling groove as reproduction-only management information.

Such information is also read out by the optical pickup 11.

Further, ADIP information embedded as a wobbling of the groove track on the optical disc 10 is also read by the optical pickup 11.

In the optical pickup 11, a laser diode serving as a laser beam source, a photo detector for detecting reflected light, an objective lens serving as a laser beam output end, and an optical system that irradiates a disc recording surface with laser beams through the objective lens and guides the reflected light to the photodetector, and the like are configured.

In the optical pickup 11, the objective lens is held to be movable in a tracking direction and a focus direction by a two-axis mechanism.

The entire optical pickup 11 is movable in the half radial direction of the disc by the thread mechanism 13.

A driving current from a laser driver 23 is supplied to the laser diode of the optical pickup 11, and the laser diode generates a laser.

The reflected light from the optical disc 10 is detected by the photo detector, and converted into an electric signal corresponding to an amount of received light, and the electric signal is supplied to a matrix circuit 14.

The matrix circuit 14 includes a current voltage conversion circuit, a matrix calculation/amplification circuit, and the like are provided corresponding to output currents from a plurality of light receiving elements serving as the photo detectors, and generates a necessary signal through a matrix calculation process.

A current-voltage conversion circuit may be formed in the photo detector element in view of a signal transmission quality.

For example, a reproduction information signal (RF signal) corresponding to reproduction data, a focus error signal for servo control, a tracking error signal, and the like are generated.

Further, a signal related to wobbling of a groove, that is, a push-pull signal is generated as a signal for detecting the wobbling.

The reproduction information signal output from the matrix circuit 14 is supplied to a data detection processing unit 15, the focus error signal and the tracking error signal are supplied to an optical block servo circuit 21, and the push-pull signal is supplied to a wobble signal processing unit 16.

The data detection processing unit 15 performs a binarization process of the reproduction information signal.

For example, the data detection processing unit 15 performs an A/D conversion process of the RF signal, a reproduction clock generation process by a PLL, a partial response (PR) equalization process, Viterbi decoding (maximum likelihood decoding), and the like, and obtains a binary data string through a partial response maximum likelihood decoding process (a PRML detection scheme).

The data detection processing unit 15 supplies a binary data string serving as information read from the optical disc 10 to an encoding/decoding unit 17 at a subsequent stage.

The encoding/decoding unit 17 performs demodulation of the reproduction data at the time of reproducing and performs a modulation process of the record data at the time of recording.

In other words, the encoding/decoding unit 17 performs data demodulation, deinterleaving, ECC decoding, address decoding, and the like at the time of reproducing, and performs ECC encoding, interleaving, data modulation, and the like at the time of recording.

At the time of reproducing, the binary data string decoded by the data detection processing unit 15 is supplied to the encoding/decoding unit 17.

The encoding/decoding unit 17 performs the demodulation process on the binary data string and obtains the reproduction data from optical disc 10.

For example, the encoding/decoding unit 17 performs the demodulation process on the data which is recorded on the optical disc 10 by performing the run-length limited code modulation such as the RLL (1, 7) PP modulation, performs the ECC decoding process for the error correction, and obtains the reproduction data from the optical disc 10.

The data decoded up to reproduction data by the encoding/decoding unit 17 is transferred to a host interface 18 and transferred to a host device 30 on the basis of an instruction of a system controller 20.

The host device 30 is, for example, a computer device, an audio-visual (AV) system device, or the like.

At the time of recording/reproducing for the optical disc 10, processing of ADIP information is performed.

In other words, the push-pull signal output from the matrix circuit 14 as the signal related to the groove wobbling is converted into wobble data digitalized in a wobble signal processing circuit 16.

A clock synchronized with the push-pull signal is generated by the PLL process.

An ADIP demodulation processing unit 26 demodulates the wobble data into a data stream constituting an ADIP address, and the data stream is supplied to an address decoder 19.

The address decoder 19 decodes the supplied data, obtains an address value, and supplies the address value to the system controller 20.

At the time of recording, the record data is transferred from the host device 30, and the record data is supplied to the encoding/decoding unit 17 via the host interface 18.

The encoding/decoding unit 17 performs addition error correction code addition (ECC encoding), interleaving, sub code addition, and the like as the encoding process of the record data.

The run-length limited code modulation such as the RLL (1-7) PP scheme is performed on the processed data.

The record data processed by the encoding/decoding unit 17 is supplied to a write strategy unit 24.

The write strategy unit 24 performs a laser driving pulse waveform adjustment on a characteristic of a recording layer, a spot shape of the laser beams, a recording linear velocity, and the like as a recording compensation process.

Then, the laser driving pulse is output to the laser driver 23.

The laser driver 23 causes a current to flow through the laser diode in the optical pickup 11 on the basis of the laser drive pulse which has undergone the recording compensation process, and performs laser emission.

Accordingly, a mark corresponding to the record data is formed on the optical disc 10.

The optical block servo circuit 21 generates various servo drive signals of focus, tracking, and thread from the focus error signal and the tracking error signal from the matrix circuit 14 and execute the servo operation.

In other words, the optical block servo circuit 21 generates the focus drive signal and the tracking drive signal in accordance with the focus error signal and the tracking error signal, and drives a focus coil and a tracking coil of the two-axis mechanism in the optical pickup 11 through a driver 28.

Accordingly, a tracking servo loop and a focus servo loop by the optical pickup 11, the matrix circuit 14, the optical block servo circuit 21, the driver 28, the two-axis mechanism are formed.

Further, the optical block servo circuit 21 executes a track jump operation by turning off the tracking servo loop in accordance with a track jump command from the system controller 20 and outputting a jump drive signal.

Further, the optical block servo circuit 21 generates a thread drive signal on the basis of the thread error signal obtained as a low frequency component of the tracking error signal, access execution control from the system controller 20, and the like, and drives the thread mechanism 13 through a thread driver 25.

A spindle servo circuit 22 performs control such that the spindle motor 12 performs CLV rotation or CAV rotation.

The spindle servo circuit 22 obtains the clock generated by the PLL for the wobble signal as current rotating speed information of the spindle motor 12, compares the clock with predetermined reference speed information, and generate a spindle error signal.

Further, at the time of data reproduction, since a reproduction clock generated by the PLL in the data detection processing unit 15 is the current rotating speed information of the spindle motor 12, it is compared with the predetermined reference speed information, and the spindle error signal is generated.

Then, the spindle servo circuit 22 outputs the spindle drive signal generated in accordance with the spindle error signal, and executes the CLV rotation or the CAV rotation of the spindle motor 12 through a spindle driver 27.

The spindle servo circuit 22 generates the spindle drive signal in accordance with a spindle kick/brake control signal from the system controller 20, and also performs operations of, for example, starting, stopping, accelerating, and decelerating the spindle motor 12.

Various kinds of operations of the servo system and the recording/reproducing system described above are controlled by the system controller 20 constituted by a microcomputer.

The system controller 20 executes various kinds of processes in accordance with a command given from the host device 30 via the host interface 18.

For example, if a write command is issued from the host device 30, the system controller 20 first moves the optical pickup 11 to an address at which writing is performed.

Then, the encoding/decoding unit 17 executes an encoding process on data (for example, video data, audio data, or the like) transferred from the host device 30 as described above.

Then, the laser driver 23 drives the laser emission and performs the recording in accordance with the encoded data.

Further, for example, in a case where a read command for requesting transfer of certain data recorded on the optical disc 10 is supplied from the host device 30, the system controller 20 first performs seek operation control on the instructed address.

In other words, the command is issued to the optical block servo circuit 21, and an access operation of the optical pickup 11 on an address specified by the seek command as is executed.

Thereafter, operation control necessary for transferring data of an instructed data section to the host device 30 is performed.

In other words, reading of data from the optical disc 10 is performed, a reproduction process in the data detection processing unit 15 and the encoding/decoding unit 17 is executed, and requested data is transferred.

Further, the example of FIG. 1 has been described as an optical disc device connected to the host device 30, but the optical disc device may not be connected to other devices.

In this case, a manipulating unit and a display unit are provided, and a configuration of an interface part of data input/output is different from that in FIG. 1.

In other words, recording or reproduction is performed in accordance with a manipulation of the user, and a terminal portion for input and output of various kinds of data are formed.

Of course, various configurations can be considered as a configuration example of the optical disc device.

[1-1. Configuration Example of Optical Pickup]

Next, a specific configuration example of the optical pickup 11 used for the optical disc device will be described with reference to FIG. 2.

The optical pickup 11 records information on the optical disc 10, for example, using laser beams having a wavelength $\lambda$ of 405 nm, and reproduces information from the optical disc 10.

The laser beams are emitted from a semiconductor laser (a laser diode (LD)) 51.

The laser beams pass through an collimator lens 52, a polarizing beam splitter (PBS) 53, and an objective lens 54 and are irradiated to the optical disc 10.

The polarizing beam splitter 53 has, for example, a splitting surface that transmits approximately 100% of P polarized light and reflects approximately 100% of S polarized light.

The reflected light from the recording layer of the optical disc 10 returns to the same optical path and enters the polarizing beam splitter 53.

A $\lambda/4$ element (not illustrated) is interposed, and approximately 100% of the incident laser beams are reflected by the polarizing beam splitter 53.

The laser beams reflected by the polarizing beam splitter 53 are converged onto a light receiving surface of a photo detector 56 via a lens 55.

The photo detector 56 includes a light receiving cell which is installed on the light receiving surface and performs photoelectric conversion on the incident light.

Figure 2:
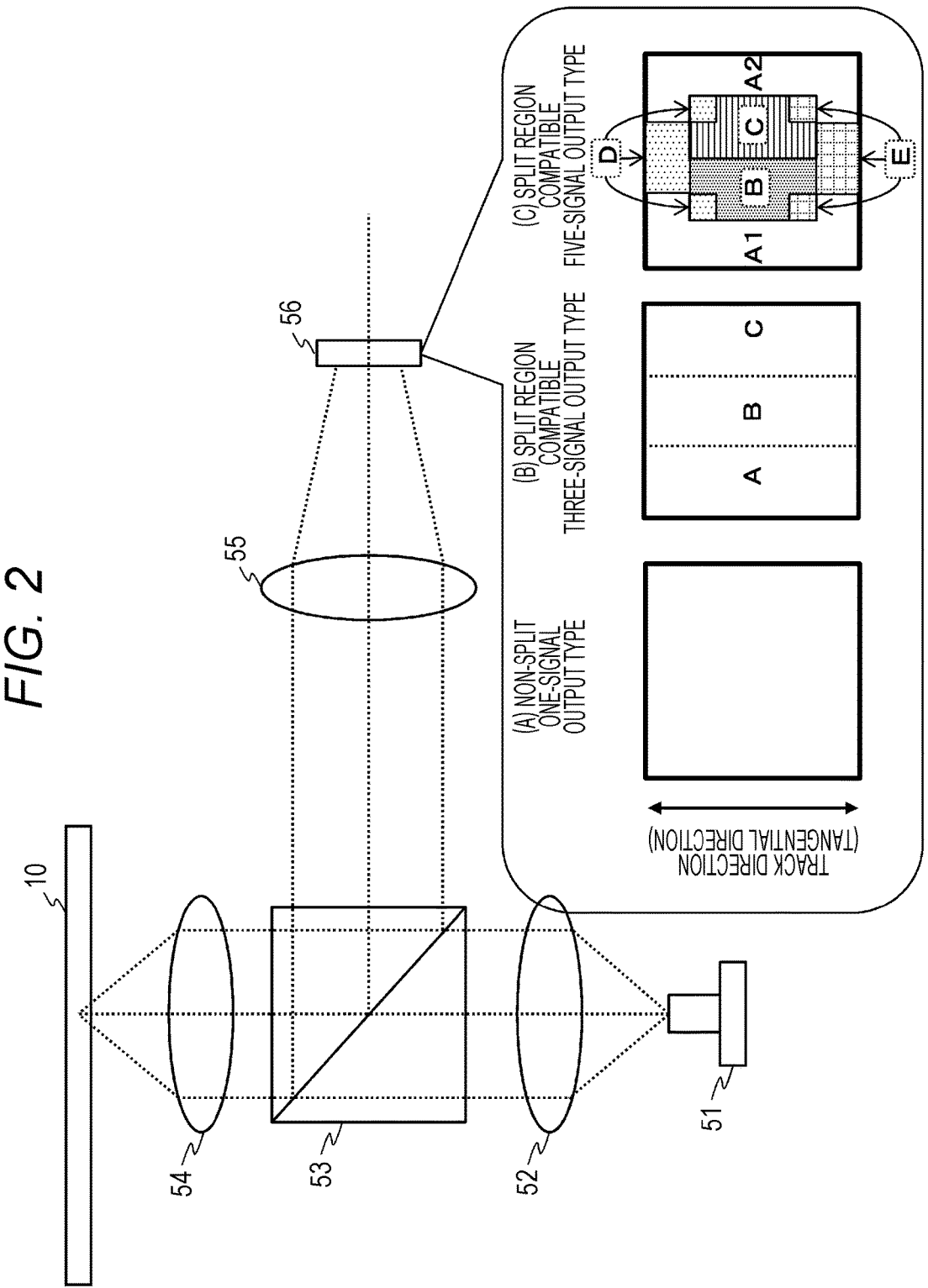
FIG. 2 is a diagram illustrating a configuration example of an optical pickup.

There are various types of photo detector 56 as illustrated in FIG. 2. FIG. 2 illustrates an example of the following three types:

(A) a non-split one-signal output type;
(B) a split region compatible three-signal output type; and
(C) a split region compatible five-signal output type.

(A) The non-split one-signal output type outputs one electric signal corresponding to an amount of light received by the light receiving cell on the entire surface of the photo detector 56.

(B) The split region compatible three-signal output type is constituted by light receiving cells obtained by dividing the light receiving surface of the photo detector 56, and outputs three electric signals corresponding to an amount of light received by the light receiving cells of the respective split regions.

(C) The split region compatible five-signal output type is also constituted by light receiving cells obtained by dividing the light receiving surface of the photo detector 56, and outputs five electric signals corresponding to an amount of light received by the light receiving cells of the respective split regions.

The light receiving cells of (B) the split region compatible three-signal output type and (C) the split region compatible five-signal output type are divided into a plurality of regions by a dividing line extending in a radial direction (disc radial direction) and a tangential direction (track direction) of the optical disc 10.

The split type photo detector 56 outputs electric signals of a plurality of channels in accordance with the amount of received light of each region of the light receiving cell.

Further, the split configuration can have various configurations in addition to the configurations described above.

Figure 3:
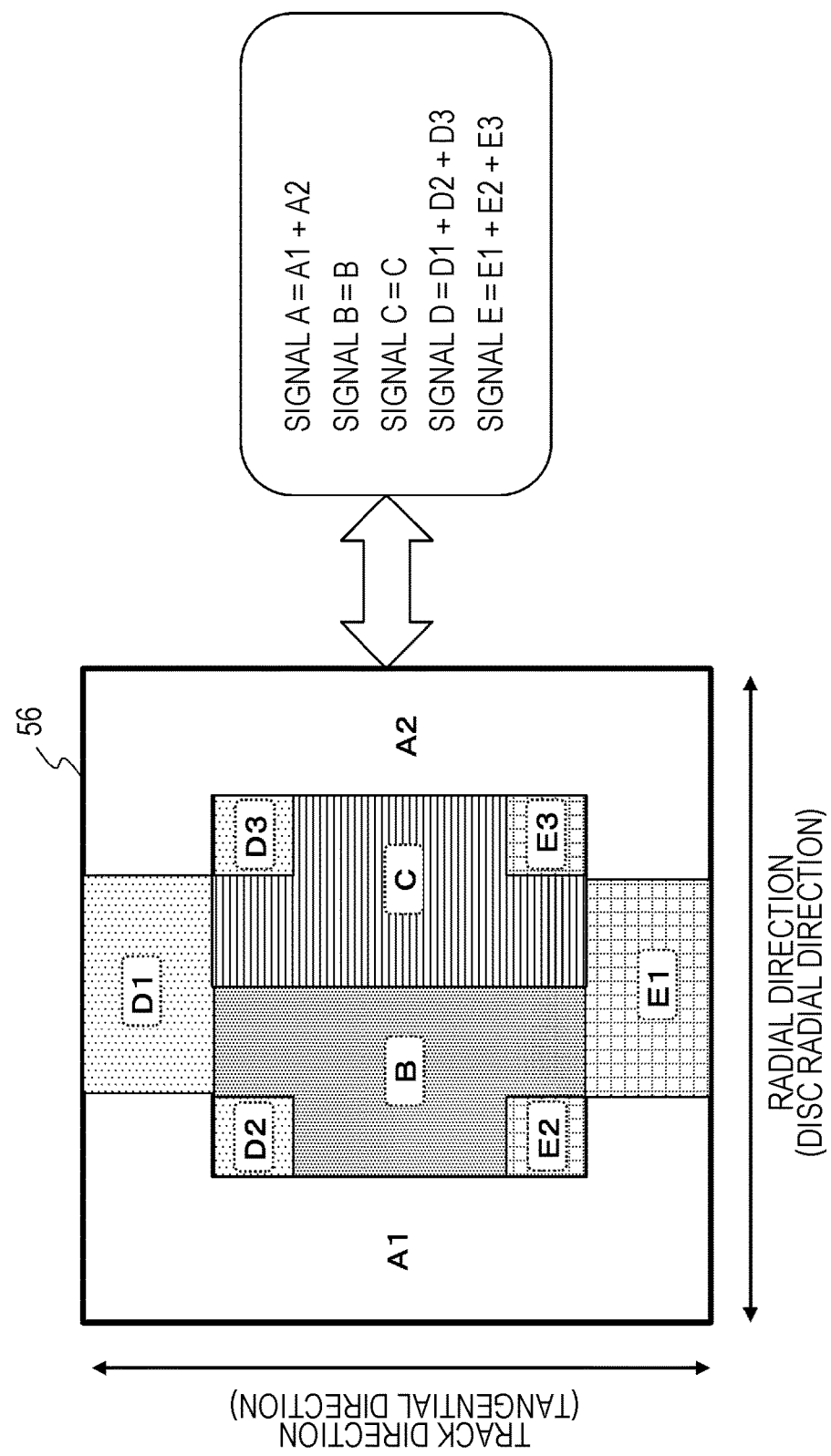
FIG. 3 is a diagram, illustrating a configuration example of a split region compatible five-signal output type optical pickup.

FIG. 3 illustrates a detailed configuration of (C) the split region compatible five-signal output type photo detector 56 illustrated in FIG. 2.

As illustrated in FIG. 3, the photo detector 56 is constituted by light receiving cells divided into a plurality of regions.

In the example illustrated in FIG. 3, it is divided into regions A1, A2, B, C, D1, D2, D3, E1, E2, and E3. In each split region, each electric signal corresponding to the amount of received light is output individually.

However, signals applied to the generation of the reproduction signal are the following five signals corresponding to five channels.

a signal A=A1+A2
a signal B=B
a signal C=C
a signal D=D1+D2+D3
a signal E=E1+E2+E3

The reproduction signal is generated using the five signals.

Further, a signal including addition signals of a plurality of regions may be configured to generate a signal by multiplying by a weight coefficient of a preset region unit.

For example, an output signal may be generated by multiplying the following weight coefficients p and q:

$$A=p*A1+q*A2$$

Using such split type photo detector, it is possible to obtain a high-quality reproduction signal by performing an adaptive equalization process on each signal using multi-input adaptive equalizer.

The adaptive equalization process configuration using the multi-input adaptive equalizer will be described later.

Each of signals A to E is a characteristic signal corresponding to a light receiving region such as a signal in which a signal component of a current read track is large or a signal in which a ratio of an adjacent track in the crosstalk is high. A high-quality reproduction signal can be obtained by executing the adaptive equalization process in accordance with a characteristic of each signal.

Further, the generation process configuration of the reproduction signal using the split type photo detector is disclosed in Patent Document 1 (International Publication No. WO 2016/006157) which is a prior application filed by the present applicant.

The multi-signal output type photo detector used in the present disclosure has a similar configuration to that in disclosed in the publication, and setting of a plurality of signals output from the photo detector and a configuration and a process of inputting each of a plurality of signals to the multi-input adaptive equalizer and obtaining an equalization signal and a binary signal are similarly applied even in the present disclosure.

Further, the configuration of the optical pickup 11 illustrated in FIG. 2 indicates the minimum constituent elements for describing the present disclosure, and the focus error signal and the tracking error signal output to the optical block servo circuit 21 via the matrix circuit 14, the signal for generating the push-pull signal output to the wobble signal processing circuit 16 via the matrix circuit 14, and the like are omitted.

Further, various configurations other than the configuration illustrated in FIG. 2 are possible.

Further, an embodiment of the present disclosure to be described below will be mainly described as an example using the split region-compatible five-signal output type photo detector described above with reference to FIG. 3.

However, the present disclosure processing is not limited to the split region compatible five-signal output type photo detector described with reference to FIG. 3 but can also be applied to the non-split one-signal output type illustrated in FIG. 2, the split region compatible three-signal output type, other configurations using photo detectors having different division configurations can be also applied.

In a case where the split type photo detector such as the split region compatible three-signal output type photo detector or the split region compatible five-signal output type photo detector is used, it is possible to divide luminous flux of return beams from the optical disc 10 into a plurality of regions and obtain the reproduction information signals of a plurality of channels corresponding to the respective regions.

The high-quality reproduction signal can be obtained through data processing using the signals of the region units.

Further, as a method of obtaining the reproduction information signal for each region, a method other than the method of dividing the photo detector 56 can also be used.

For example, a method in which, in the optical pickup 11 illustrated in FIG. 2, an optical path conversion element for separating a plurality of regions is arranged in an optical path passing through the objective lens 54 and reaching the photo detector 56, and a plurality of beams separated by the optical path conversion element are supplied to different photo detector may be used.

As the optical path conversion element, a diffraction element such as a holographic optical element, a refraction element such as a micro lens array or a micro prism, or the like can be used.

[1-2. Configuration Example of Data Detection Processing Unit]

Next, a configuration example of the data detection processing unit 15 in the configuration illustrated in FIG. 1 will be described with reference to FIG. 4.

As described above, the detection signals corresponding to the respective regions which are reproduced from the optical disc 10 by the optical pickup 11 are supplied to the matrix circuit 14 and converted into the reproduction information signals of a plurality of channels corresponding to the respective regions.

Figure 4:
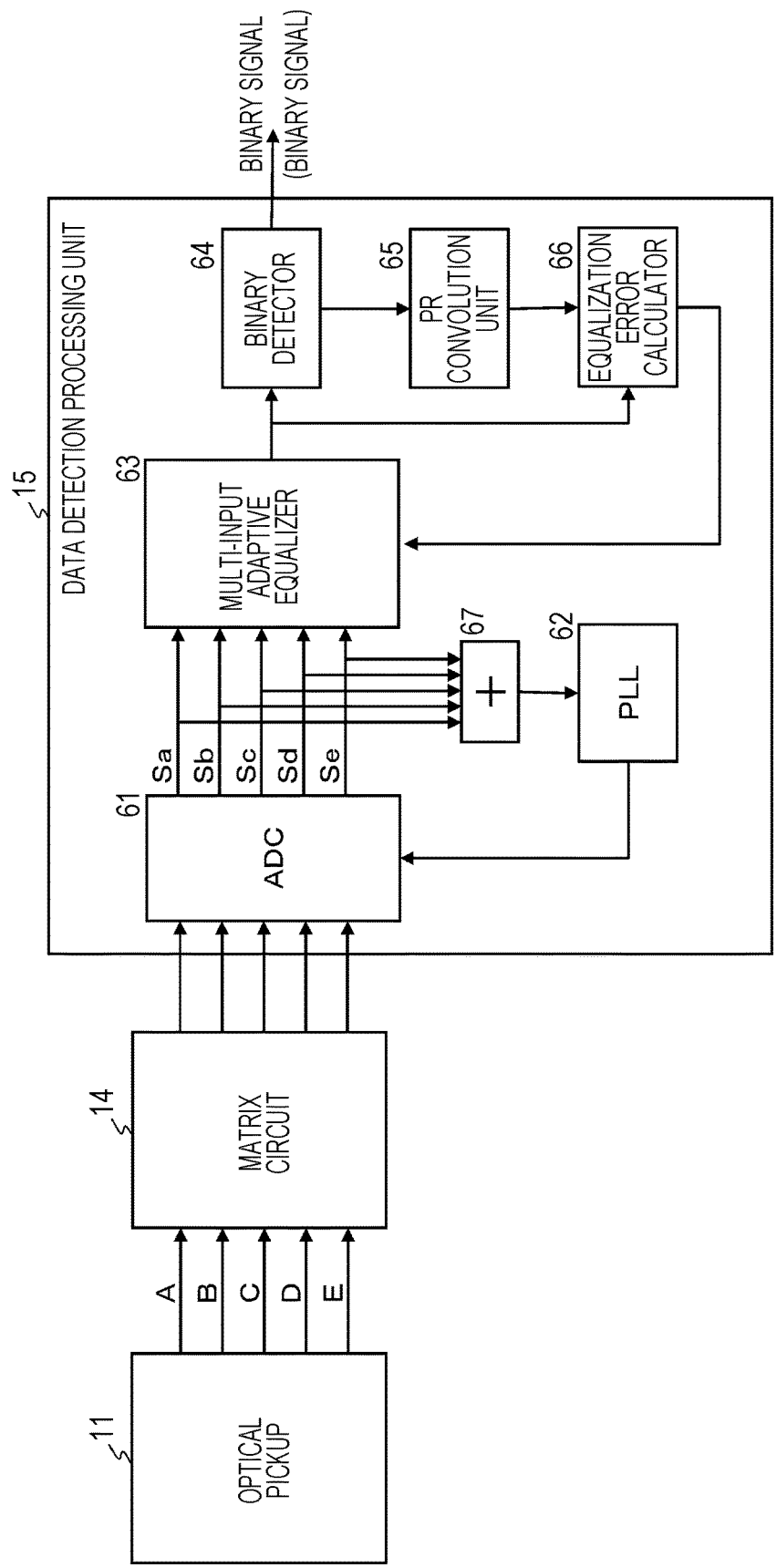
FIG. 4 is a diagram illustrating a configuration example of a data detection processing unit.

As illustrated in FIG. 4, the data detection processing unit 15 includes an A/D converter 61 to which the reproduction information signals supplied from the matrix circuit 14 are supplied.

Further, FIG. 4 illustrates a configuration example of the data detection processing unit 15 that receives the five signals A to E obtained by using the split region compatible five-signal output type photo detector 56 illustrated in FIG. 3 and generates the reproduction signals.

A clock for the A/D converter 61 is formed by a PLL 62. The reproduction information signals supplied from the matrix circuit 14 are converted into digital data by the A/D converter 61.

The reproduction information signals of the five channels obtained by digitizing the signals A to E are indicated by Sa to Se.

A signals obtained by adding the reproduction information signals Sa to Se by an addition circuit 67 is supplied to the PLL 62.

Further, the signals A to E are the following electric signals corresponding to the amount of received light of the regions described above with reference to FIG. 3.

the signal A=A1+A2
the signal B=B
the signal D=D1+D2+D3
the signal E=E1+E2+E3

As illustrated in FIG. 4, the data detection processing unit 15 includes a multi-input adaptive equalizer 63, a binary detector 64, a partial response (PR) convolution unit 65, and an equalization error calculator 66.

The multi-input adaptive equalizer 63 performs a PR adaptive equalization process on the basis of the reproduction information signals Sa to Se.

In other words, the reproduction information signals Sa to Se are output via the adaptive equalizer unit, and an added equalization signal y0 is equalized to approximate a desired PR waveform.

Further, an output of the multi-input adaptive equalizer may be used as the signal input to the PLL 62. In this case, an initial coefficient of the multi-input adaptive equalizer is set to a predetermined value.

The binary detector 64 is, for example, a Viterbi decoder, and obtains binary data DT by performing the maximum likelihood decoding process on the PR equalized equalization signal y0.

The binary data DT is supplied to the encoding/decoding unit 17 illustrated in FIG. 1, and undergoes a reproduction data demodulation process.

For Viterbi decoding, a Viterbi detector constituted by a plurality of states configured using consecutive bits of a predetermined length as units and branches indicated by transitions therebetween is used, and it is configured to detect a desired bit sequence efficiently from all possible bit sequences.

Two registers, that is, a register that stores a partial response sequence which is called a path metric register and reaches up to each state and a path metric of signal for each state and a register that stores a flow of a bit sequence which is called a path memory register and reaches the state are prepared in an actual circuit.

Further, a calculation unit that calculates a partial response sequence which is called a branch metric unit and a path metric of a signal for each branch is prepared.

In the Viterbi decoder, it is possible to associate various bit sequences with each other with a one-to-one relation using one of paths passing through states.

Further, the path metric between the partial response sequence passing through the paths and the actual signal (reproduction signal) is obtained by sequentially adding the branch metric in the inter-state transition constituting the path, that is, the branch.

Further, selection of a path in which the path metric is minimized can be implemented by sequentially selecting the paths with the small path metrics while comparing the magnitudes of the path metrics of two or less branches reaching each state.

The selection information is transferred to the path memory register, and information indicating the path reaching each state with the bit sequence is stored.

Since a value of the path memory register converges onto a bit sequence which eventually minimizes the path metric while being sequentially updated, the result is output.

In the PR convolution unit 65, the convolution process of the binarization result is performed to generate a target signal Zk.

Since the target signal Zk is an ideal signal having no noise since the binary detection result is convoluted.

For example, in the case of PR (1, 2, 2, 2, 1), a value P of each channel clock is (1, 2, 2, 2, 1). A constraint length is 5.

Further, in the case of PR (1, 2, 3, 3, 3, 2, 1), the value P of each channel clock is (1, 2, 3, 3, 3, 2, 1). The constraint length is 7.

In a case where the recording density is increased to the extent that the capacity exceeds 35 GB when the wavelength λ of the laser beams is 405 run, the NA of the objective lens is 0.85, and the track pitch is constant to be 0.32 μm, if the constraint length of the partial response is increased from 5 to 7, and the detection capability is not increased, it is difficult to detect it.

The equalization error calculator 66 obtains an equalization error ek from the equalization signal y0 from the multi-input adaptive equalizer 63 and the target signal Zk and supplies the equalization error ek to the multi-input adaptive equalizer 63 for tap coefficient control.

Figure 7:
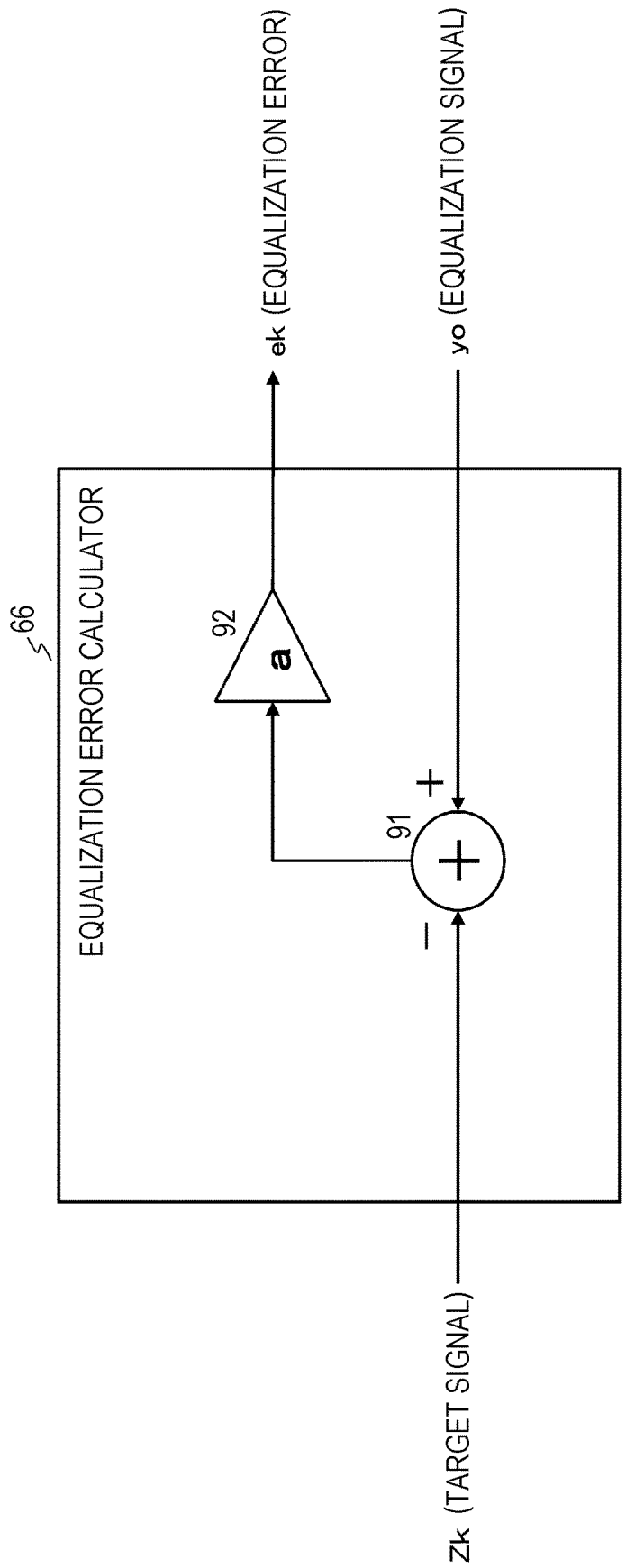
FIG. 7 is a diagram illustrating an example of equalization error calculator.

As illustrated in FIG. 7, the equalization error calculator 66 includes a subtracter 91 and a coefficient multiplier 92.

The subtracter 81 subtracts the target signal Zk from the equalization signal y0.

The equalization error ek is generated by multiplying the subtraction result by a predetermined coefficient a through the coefficient multiplier 82.

Figure 5:
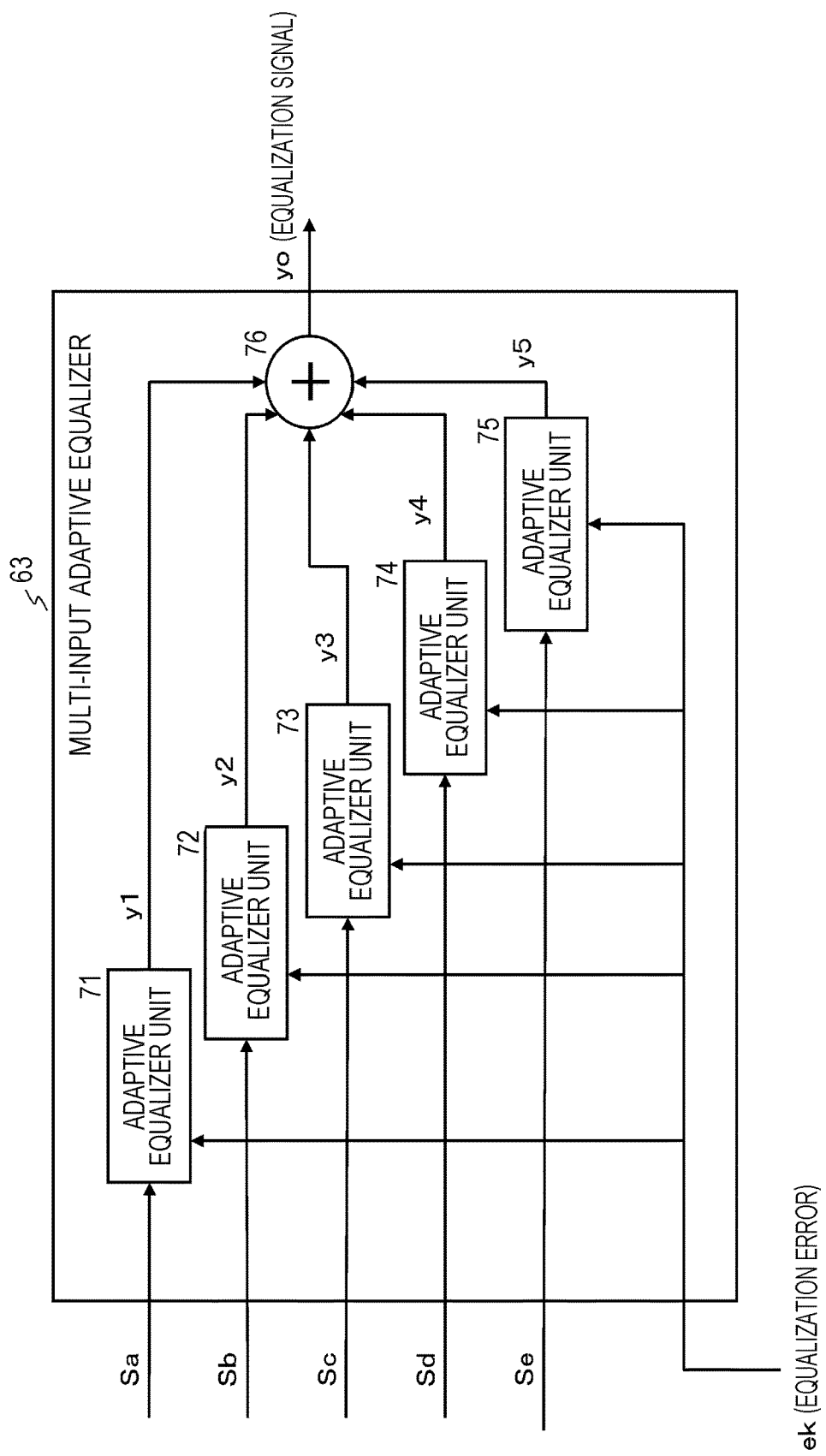
FIG. 5 is a diagram illustrating an example of a multi-input adaptive equalizer.

As illustrated in FIG. 5, the multi-input adaptive equalizer 63 includes adaptive equalizer units 71 to 75 and an adder 76.

The above-described reproduction information signal Sa is input to the adaptive equalizer unit 71, the reproduction information signal Sb is input to the adaptive equalizer unit 72, the reproduction information signal Sc is input to the adaptive equalizer unit 73, the reproduction information signal Sd is input to the adaptive equalizer unit 74, and the reproduction information signal Se is input to the adaptive equalizer unit 75.

The adaptive equalizer units are installed corresponding to the number of divided signals A to E obtained from the split regions.

Each of the adaptive equalizer units 71 to 75 has a finite impulse response (FIR) filter tap number, a calculation accuracy (bit resolution), and a parameter of an update gain of adaptive operation, and an optimal value is set in each of the adaptive equalizer units 71 to 75.

The equalization error ek is supplied to each of the adaptive equalizer units 71 to 75 as a coefficient control value for adaptive control.

Outputs y1 to y5 of the adaptive equalizer units 71 to 75 are added by an adder 76 and output as the equalization signal y0 of the multi-input adaptive equalizer 63.

The output target of the multi-input adaptive equalizer 63 is an ideal PR waveform in which binary detection result is convoluted into the partial response (PR).

Figure 6:
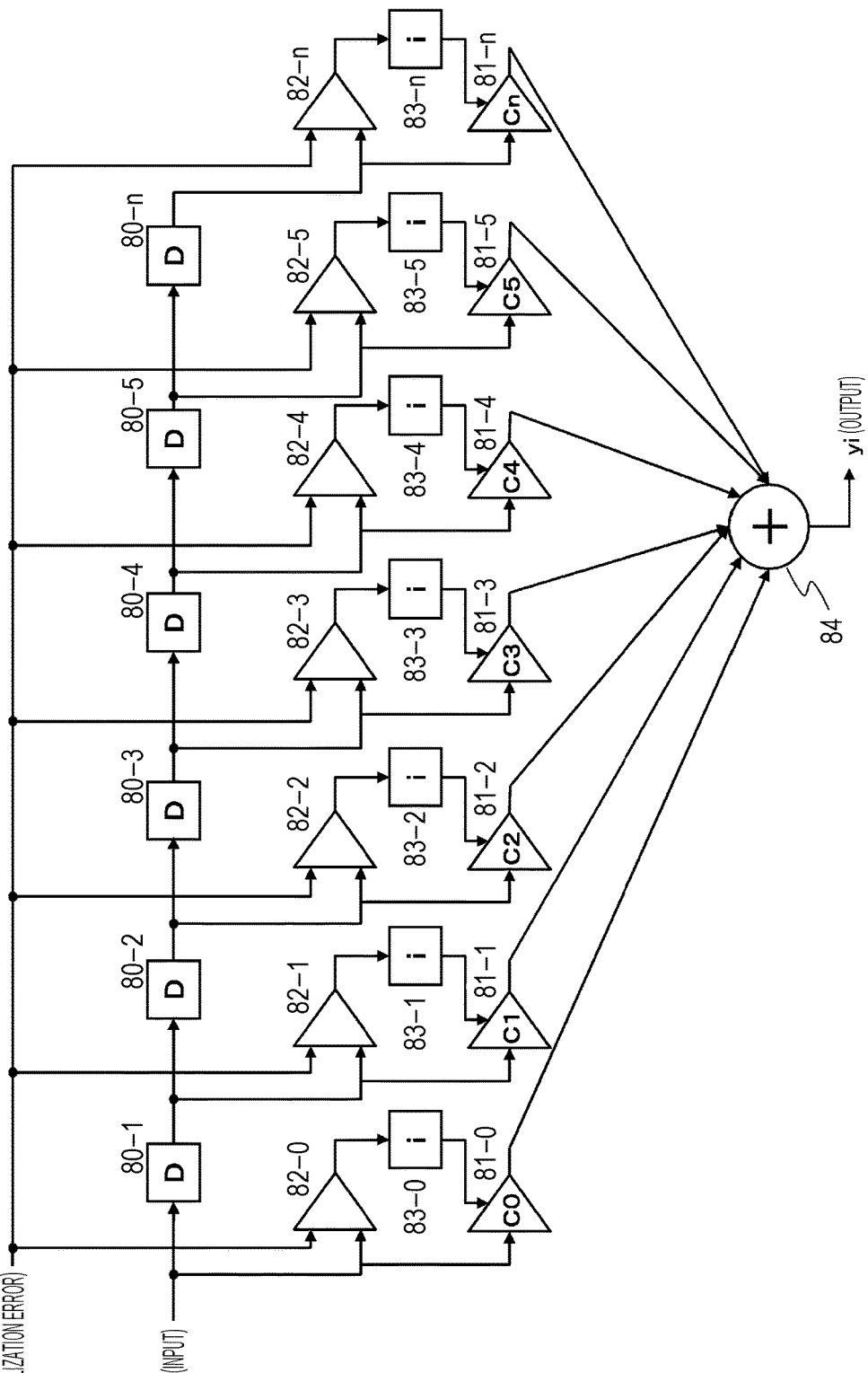
FIG. 6 is a diagram illustrating an example of an adaptive equalizer unit.

The adaptive equalizer unit 71 includes, for example, an FIR filter illustrated in FIG. 6.

The adaptive equalizer unit 71 is a filter with (n+1) taps including delay elements 80-1 to 80-$n$, coefficient multipliers 81-0 to 81-$n$, and adder 84.

The coefficient multipliers 81-0 to 81-$n$ multiply an input x at each time point by tap coefficients C0 to Cn.

Outputs of the coefficient multipliers 81-0 to 81-$n$ are added by an adder 84 and sent out as an output y.

In order to perform the adaptive equalization process, the tap coefficients C0 to Cn are controlled. To this end, calculators 82-0 to 82-$n$ that receive the equalization error ek and each tap input and perform a calculation are installed.

Further, integrators 83-0 to 83-$n$ that integrate outputs of the calculators 82-0 to 82-$n$ are installed.

Each of the calculators 82-0 to 82-$n$ performs, for example, a calculation of $-1 \times ek \times x$.

The outputs of the calculators 82-0 to 82-$n$ are integrated by integrators 83-0 to 83-$n$, and the tap coefficients C0 to Cn of the coefficient multipliers 81-0 to 81-$n$ are changed and controlled on the basis of the integration result.

Further, the integration of the integrators 83-0 to 83-$n$ is performed to adjust the responsiveness of adaptive coefficient control.

The data detection processing unit 15 having the above configuration reduces unnecessary signals such as the crosstalk and then decodes the binary data.

The other adaptive equalizer units 72 to 75 illustrated in FIG. 5 also have the similar configuration as the adaptive equalizer unit 71.

The common equalization error ek is supplied to the adaptive equalizer units 71 to 75, and the adaptive equalization is performed.

In other words, the adaptive equalizer units 71 to 75 performs optimization of the error and the phase distortion of the input signal frequency components of the reproduction information signals Sa, Sb, Sc, Sd, and Se, that is, the adaptive PR equalization.

In other words, the tap coefficients C0 to Cn are adjusted in accordance with the calculation result of $-1 \times ek \times x$ in the calculators 82-0 to 82-$n$.

This means that the tap coefficients C0 to Cn are adjusted in the direction in which the equalization error is eliminated.

As described above, the adaptive equalizer units 71 to 75 adaptively control the tap coefficients C0 to Cn in a direction in which a desired frequency characteristic is obtained using the equalization error ek.

The equalization signal y0 of the multi-input adaptive equalizer 63 obtained by adding the outputs y1, y2, y3, y4, and y5 of the adaptive equalizer units 71 to 75 by the adder 76 is the signal in which the crosstalk and the like is reduced.

Further, a specific example of the tap coefficient control process and the like corresponding to the respective signals A to E are described in Patent Document 1 (International Publication No. WO 2016/006157) which is a prior application of the same applicant as the present applicant. In the configuration of the present application, a tap coefficient setting process corresponding to each signal similar to that described in the prior application can be applied.

[2. Basic Configuration Example of Crosstalk Cancellation Process Using Read Signal of Adjacent Track]

Next, a basic configuration example of the crosstalk cancellation process using the read signal of the adjacent track will be described.

As described above, the optical discs such as the BDs are required to perform the high-density information recording. One method of increasing the density of optical discs is a method of narrowing the track pitch.

Specifically, for example, the land (L)/groove (G) recording method of recording data in both the groove track and the land track is effective.

However, in such a high-density recording disc, there is a problem that the crosstalk is highly likely to occur in the data reproducing process.

In other words, there is a problem that the crosstalk in which data of an adjacent track is mixed into readout data of a current readout track as noise is likely to occur.

As a technique of removing the crosstalk, there is a crosstalk cancellation technique to which the read signal of the adjacent track is applied.

Further, a configuration example of executing the crosstalk cancellation using the read signal of the adjacent track is disclosed in Patent Document 2 (Japanese Patent Application Laid-Open No. 2015-057753), which is the prior application by the present applicant.

A basic configuration example of the crosstalk cancellation process using the read signal of the adjacent track will be described below.

Figure 8:
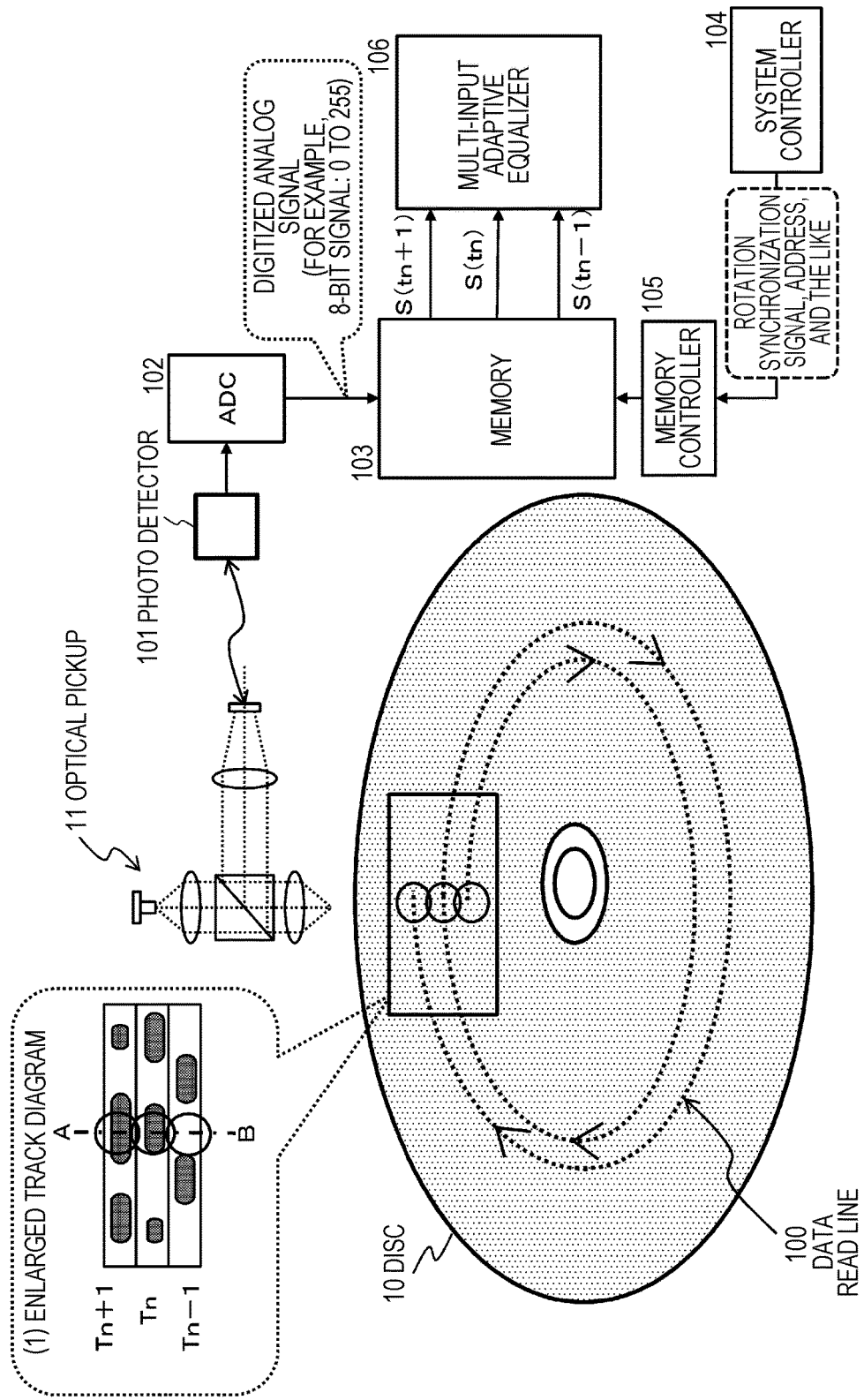
FIG. 8 is a diagram illustrating a configuration example of an information processing device (a reproducing device) that performs crosstalk cancellation using a read signal of an adjacent track.

FIG. 8 is a diagram illustrating a configuration example of an information processing device (a reproducing device) that performs the crosstalk cancellation using the read signal of the adjacent track.

The optical pickup 11 reads data from a disc 10.

The optical pickup 11 reads track data along a data read line 100 of disc 10 illustrated in FIG. 8.

As illustrated in an enlarged track diagram of FIG. 8(1), three adjacent tracks Tn−1, Tn, and Tn+1 centered on the track Tn are read along the data read line 100.

Read data from the disc 10 is input from a photo detector 101 to an AD converter (ADC) 102, converted into a digital signal, and stored in a memory 103.

Further, the data stored in the memory 103 is a digital signal generated on the basis of an analog signal which is a read signal (RF signal) from the disc 10, for example, a digitized analog signal of 8 bits (0 to 255).

The data read along the data read line 100 of the disc 10 illustrated in FIG. 8 is stored in the memory 103.

If the read data of adjacent regions of three tracks of an A-B line in the enlarged track diagram of FIG. 8(1) is stored in the memory 103, the read signals corresponding to the three tracks of the A-B line are input to a multi-input adaptive equalizer 106.

Signals S(tn+1) to S(tn−1) illustrated in FIG. 8 correspond to the read signals of the tracks Tn+1, Tn, and Tn−1.

Further, it is necessary to perform the data input from the memory 103 to the multi-input adaptive equalizer 106 in a state in which the three signals of the A-B line of FIG. 8(1) are synchronized with one another. This control is performed by a memory controller 105 on the basis of a rotation synchronization signal, an address, or the like provided from, a system controller 104 to the memory controller 105.

For example, the multi-input adaptive equalizer 106 has a configuration similar to that described above with reference to FIGS. 5 and 6.

In FIG. 5, the five signals of the split region compatible five-signal output type detector are input, but in the example illustrated in FIG. 8, three read signals of the tracks Tn−1 to Tn+1 are input.

However, this is a case where a non-split detector is used, that is, a case where (A) the non-split one-signal output type detector described with reference to FIG. 2 is used.

For example, in a case where the split region compatible five-signal output type detector is used, it is necessary to input 15 (=5×3) signals. This example will be described later.

The multi-input adaptive equalizer 106 includes a plurality of adaptive equalizer units that receive the three read signals of the tracks Tn−1 to Tn+1.

Each adaptive equalizer unit has a configuration similar to that described above with reference to FIG. 6.

The read signal S(tn) of the center track Tn which is one adaptive reproduction target is input to one adaptive equalizer unit.

Further, the read signals S(tn−1) and S(tn−t−1) of the adjacent tracks Tn−1 and Tn+1 which cause the crosstalk component are input to each individual adaptive equalizer unit.

The output of each adaptive equalizer unit is calculated, the equalization signal, and the binarization process is performed on the equalization signal to generate the binary data.

With this process, it is possible to obtain the high-quality data from which the crosstalk component is removed from the read signal S(tn) of the track Tn.

Further, a configuration and a process of the multi-input adaptive equalizer 106 will be described later with reference to FIG. 11.

Using the configuration illustrated in FIG. 8, it is possible to remove the crosstalk component by inputting the read signals of the current reproduction track and the adjacent track to the multi-input adaptive equalizer 106.

However, in the configuration illustrated in FIG. 8, it is necessary to accumulate the read data along the data read line 100 shown in the disc 10 of FIG. 8, that is, the read data corresponding to almost two rounds of the disc in the memory 103.

As described above, the data stored in the memory 103 is a digital signal generated on the basis of an analog signal which is the read signal (RF signal) from the disc 10, for example, the digitalized analog signal of 8 bits (0 to 255), and since the data amount is large, there is a problem that the memory capacity required for the memory 103 increases.

Figure 9:
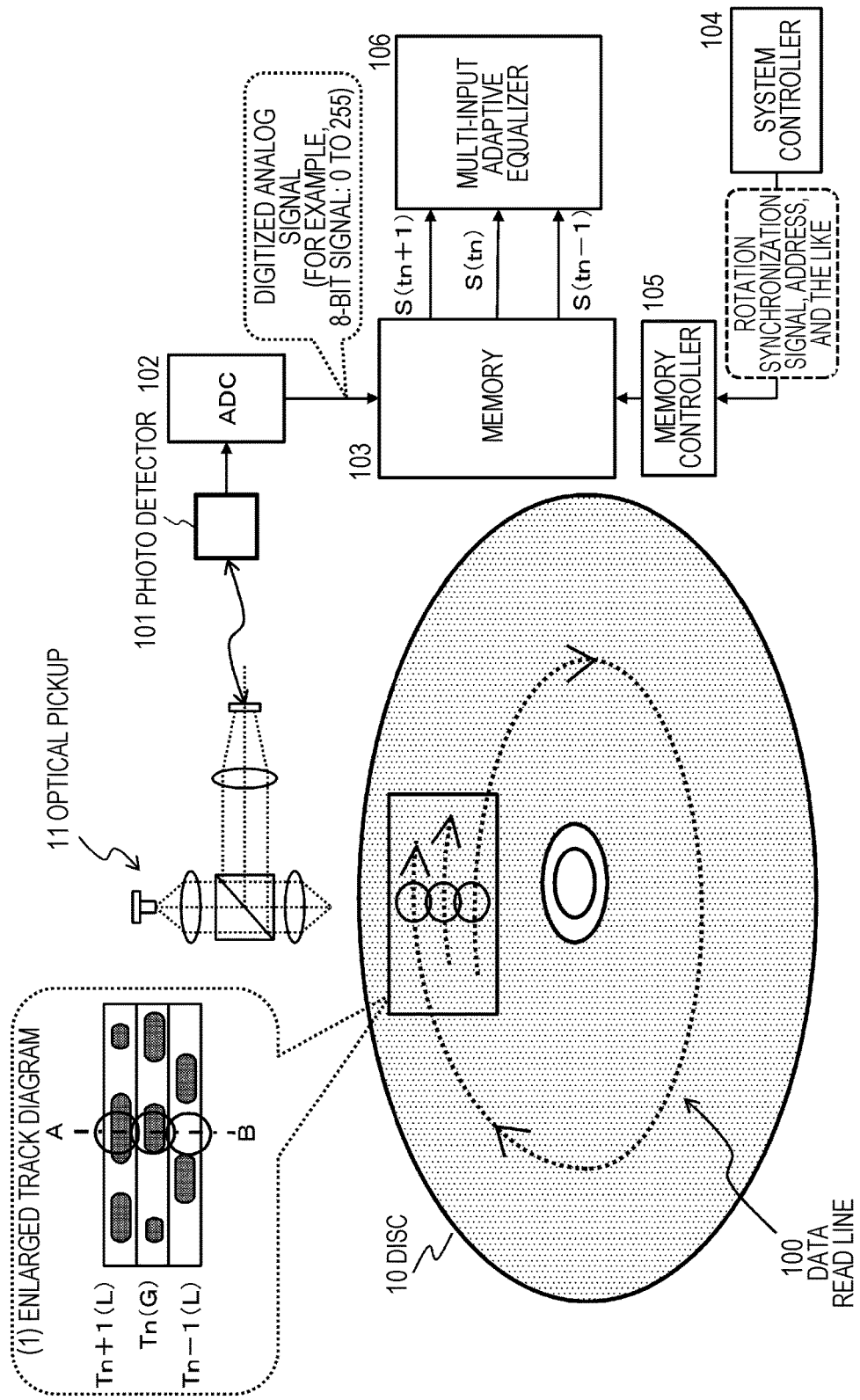
FIG. 9 is a diagram illustrating a configuration example of an information processing device (a reproducing device) that performs crosstalk cancellation using a read signal of an adjacent track.

Further, in a case where data is recorded in both the land (L) and the groove (G), and data reading is executed by an individual pickup, data corresponding to one round of track may be stored in the memory as illustrated in FIG. 9.

In the configuration illustrated in FIG. 9, the read data of adjacent land tracks Tn−1 (L) and Tn+1 (L) is necessary for the crosstalk reduction process of the read data of the track Tn (G) which is a central groove track.

In the example illustrated in FIG. 9, the land (L) and the groove (G) are reproduced using an individual pickup, and in this case, data to be accumulated for the crosstalk reduction of the read data of the track Tn (G) which is the central groove track is read data corresponding to one round of track of the land (L).

Further, G and L illustrated in FIG. 9 indicate a groove and a land, respectively. The present example is an example using the disc 10 in which data is recorded in both the groove (G) and the land (L).

In the configuration illustrated in FIG. 8, it is necessary to accumulate track read data corresponding to almost two rounds in the memory. Further, in the configuration illustrated in FIG. 9, it is necessary to store the track read data corresponding to almost one round in the memory. As a configuration for solving such a problem, a configuration illustrated in FIG. 10 is provided.

Figure 10:
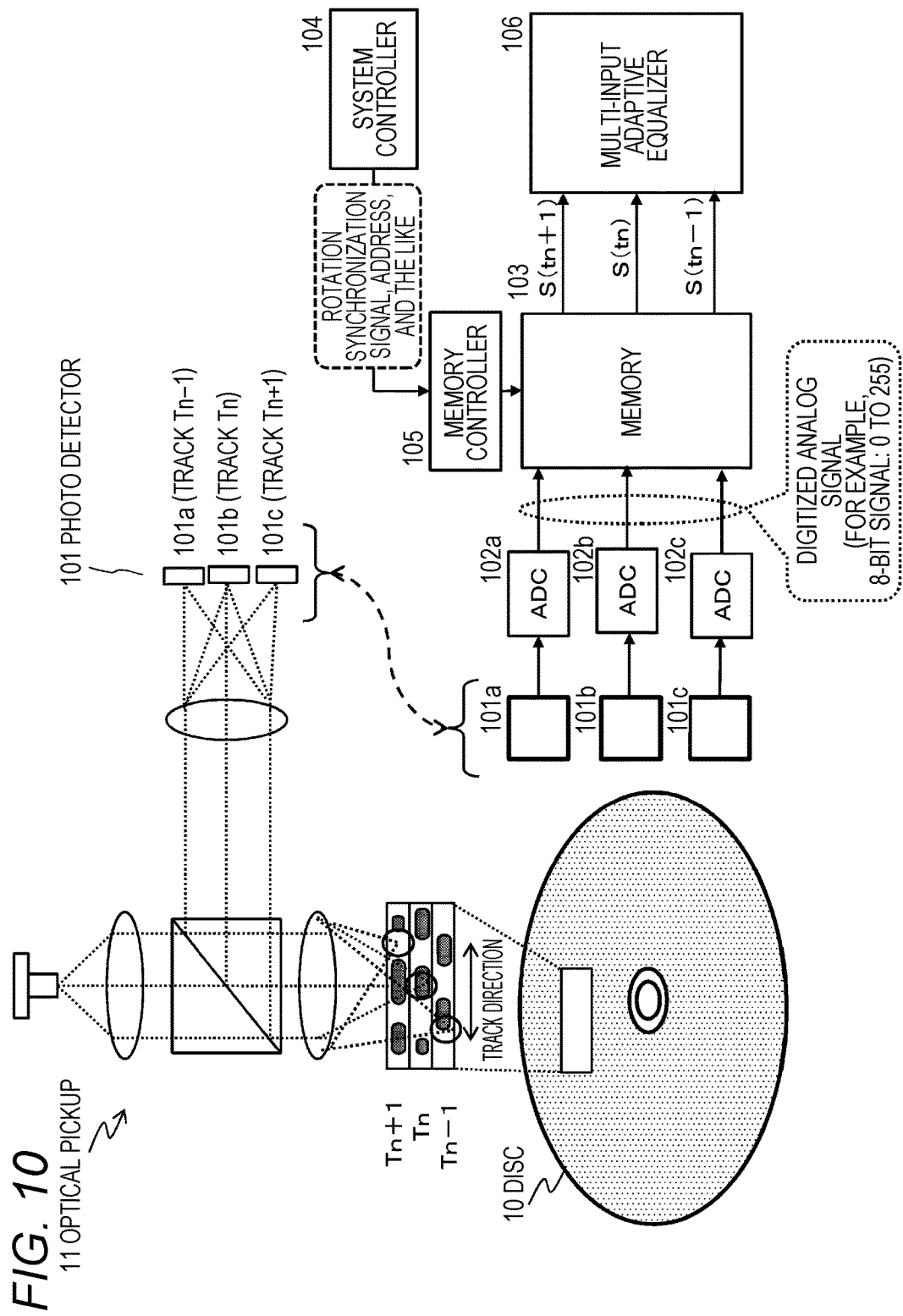
FIG. 10 is a diagram illustrating a configuration example of an information processing device (reproducing device) for performing crosstalk cancellation using a read signal of an adjacent track.

The example illustrated in FIG. 10 is a configuration in which a pickup 11 irradiates each of three adjacent tracks with spot light at a time, and reflected light from the respective tracks are detected through three photo detectors 101a to 101c.

Further, as illustrated in FIG. 10, a configuration in which three spot lights are irradiated, and detection light from each spotlight is detected by an individual photo detector is described, for example, in Patent Document 4 (Japanese Patent Application No. 4184585).

However, if the positions of the spot lights irradiated to the three adjacent tracks are arranged in the half radial direction of the disc, interference or the like based on overlapping of the spot lights or the like occurs, and noise increases, and thus it is necessary to set the respective spot lights at non-overlapping positions, and the three spot lights are set at positions at which the spot lights deviate from one another in the track direction.

In the configuration illustrated in FIG. 10, the read data from the disc 10, that is, the read data from the three adjacent tracks Tn−1, Tn, and Tn+1 are input from photo detector 101a to 101c to AD converters (ADCs) 102a to 102c, converted into digital signals, and stored in the memory 103.

Further, in this case, the data stored in the memory 103 is a digital signal generated on the basis of an analog signal which is the read signal (RF signal) from the disc 10, for example, a digitized analog signal of 8 bits (0 to 255).

The data read from the three adjacent tracks are stored in the memory 103.

The read data deviates in the track direction.

As described above, it is necessary to input the data of the three adjacent tracks with no deviation in the track direction to the multi-input adaptive equalizer 106.

Therefore, it is necessary to store the data of the three adjacent tracks with no deviation in the track direction in the memory 103, and it is necessary to store the data corresponding to the three tracks in a section corresponding to the deviation of the three spot lights irradiated to the three tracks in the track direction.

If the read data of the adjacent regions of the three tracks of the A-B line of the enlarged track diagram of FIG. 8(1) described above is stored in the memory 103, the read signals corresponding to the three tracks of the A-B line are stored in the multi-input adaptive equalizer 106.

In FIG. 10, the signals S(tn+1) to S(tn−1) correspond to the read signals of the tracks Tn+1, Tn, and Tn−1, respectively, similarly to FIG. 8.

Further, it is necessary to perform the data input from the memory 103 to the multi-input adaptive equalizer 106 in a state in which the signals of the three tracks at the nearest positions, that is, the three signals of the A-B line in FIG. 8(1) described above are synchronized with one another. This control is performed by a memory controller 105 on the basis of a rotation synchronization signal, an address, or the like provided from a system controller 104 to the memory controller 105.

In FIG. 10, the memory 103 also stores it is necessary to store the signals read from the three adjacent tracks, that is, the digital signal generated on the basis of an analog signal which is the read signal (RF signal) from the disc 10, for example, a digitized analog signal of 8 bits (0 to 255) in the memory 103, and thus there is a problem in that a necessary memory capacity increases.

Further, in the configuration illustrated in FIG. 10, circuits for processing the signals from the three adjacent tracks in parallel, for example, ADCs which correspond in number to the read data are required, and thus there arises a problem in that the circuit configuration is complicated.

A specific configuration example and a process example of the multi-input adaptive equalizer 106 in the configuration described above with reference to FIGS. 8 and 10 will be described with reference to FIG. 11.

The multi-input adaptive equalizer 106 includes adaptive equalizer units 111, 112, and 113 and an adder 114.

The reproduction signal S(tn+1) corresponding to the track Tn+1 is input to the adaptive equalizer unit 111.

The reproduction signal S(tn) corresponding to the track Tn is input to the adaptive equalizer unit 112.

The reproduction signal S(tn−1) corresponding to the track Tn−1 is input to the adaptive equalizer unit 113.

Each of the adaptive equalizer units 111, 112, and 113 has an FIR filter tap number, a calculation accuracy (bit resolution), and a parameter of an update gain of adaptive operation, and an optimal value is set in each of the adaptive equalizer units 111, 112, and 113.

The equalization error ek is supplied to each of the adaptive equalizer units 111, 112, and 113 as a coefficient control value for adaptive control.

Outputs y1 to y3 of the adaptive equalizer units 111, 112, and 113 are added by an adder 114 and output as the equalization signal y0 of the multi-input adaptive equalizer 106.

The output target of the multi-input adaptive equalizer 106 is an ideal PR waveform in which binary detection result is convoluted into the partial response (PR).

Each of the adaptive equalizer units 111, 112, and 113 is constituted by, for example, the FIR filter illustrated in FIG. 6.

In other words, each of the adaptive equalizer units 111, 112, and 113 is a filter with (n+1) taps including delay elements 80-1 to 80-$n$, coefficient multipliers 81-0 to 81-$n$, and an adder 84.

The coefficient multipliers 81-0 to 81-$n$ multiply an input x at each time point by tap coefficients C0 to Cn.

Outputs of the coefficient multipliers 81-0 to 81-$n$ are added by an adder 84 and sent out as an output y.

In order to perform the adaptive equalization process, the tap coefficients C0 to Cn are controlled. To this end, calculators 82-0 to 82-$n$ that receive the equalization error ek and each tap input and perform a calculation are installed. Further, integrators 83-0 to 83-$n$ that integrate outputs of the calculators 82-0 to 82-$n$ are installed.

Each of the calculators 82-0 to 82-$n$ performs, for example, a calculation of $-1 \times ek \times x$. The outputs of the calculators 82-0 to 82-$n$ are integrated by integrators 83-0 to 83-$n$, and the tap coefficients C0 to Cn of the coefficient multipliers 81-0 to 81-$n$ are changed and controlled on the basis of the integration result. Further, the integration of the integrators 83-0 to 83-$n$ is performed to adjust the responsiveness of adaptive coefficient control.

By using the above configuration, the crosstalk cancellation is performed, and then the binary data is decoded.

Each of the adaptive equalizer units 111, 112, and 113 has the configuration illustrated in FIG. 6, and is supplied with the same equalization error ek and performs the adaptive equalization.

First, the adaptive equalizer unit 112 to which the reproduction information signal S(tn) of the track to be processed is inputted performs optimization of the error and the phase distortion of the input signal frequency component of the reproduction information signal S(tn), that is, the adaptive PR equalization. This is identical to the function of the normal adaptive equalizer.

In other words, the tap coefficients C0 to Cn are adjusted in accordance with the calculation result of $-1 \times ek \times x$ in each of the calculators 82-0 to 82-$n$ illustrated in FIG. 6, and the tap coefficients C0 to Cn are adjusted in the direction in which the equalization error is eliminated.

On the other hand, in the other two adaptive equalizer units 111 and 113, the output target is not related to the reproduction information signals S(tn+1) and S(tn−1) of the near tracks. Thus, the adaptive equalizer units 111 and 113 perform the calculation of cancelling the correlation component, that is, the crosstalk component.

Figure 11:
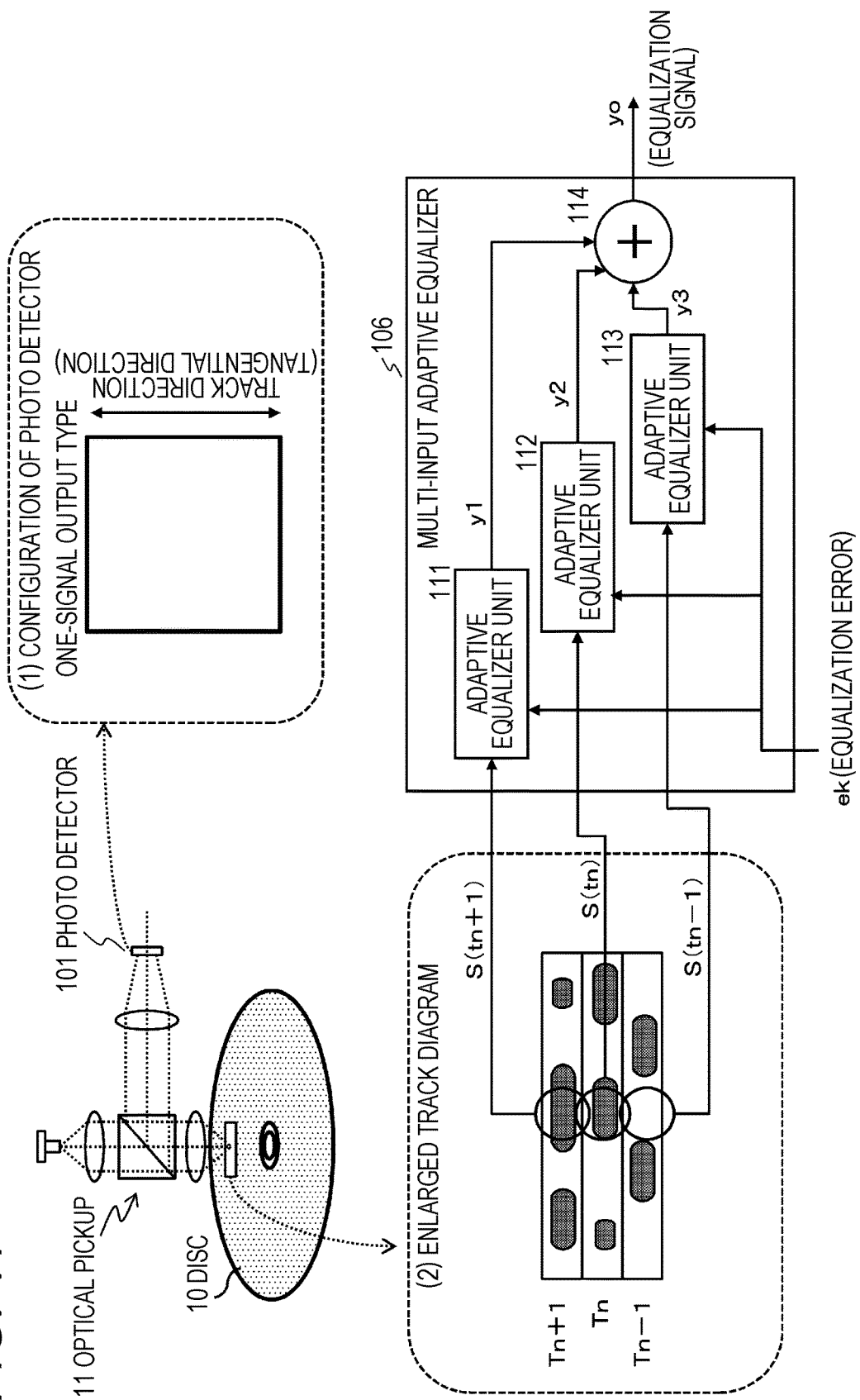
FIG. 11 is a diagram for describing a specific example of a multi-input adaptive equalizer of an information processing device (a reproducing device) that performs crosstalk cancellation using a read signal of an adjacent track.

In other words, in the case of the adaptive equalizer units 111 and 113, the tap coefficients C0 to Cn are adjusted in accordance with the calculation result of −1×ek×x in each of the calculator 82-0 to 82-n, and the tap coefficients C0 to Cn are adjusted so that the frequency characteristic is obtained in the direction in which the crosstalk component is eliminated in the addition result of the adder 114 of FIG. 11.

As described above, the adaptive equalizer unit 112 adaptively controls the tap coefficients C0 to Cn in the direction in which the desired frequency characteristic is obtained using the equalization error ek, while the adaptive equalizer units 111 and 113 automatically the tap coefficients C0 to Cn in the direction in which the frequency characteristic for the crosstalk cancellation is similarly obtained using the equalization error ek. Accordingly, the equalization signal y0 of the multi-input adaptive equalizer 106 obtained by adding the outputs y1, y2, and y3 of the adaptive equalizer units 111, 112, and 113 by the adder 114 is a signal in which the crosstalk is canceled.

The configuration example of the reproducing device described with reference to FIGS. 8 and 10 is a configuration example in which the read signal of each track is one signal, that is, "(A) the non-split one-signal output type" photo detector described above with reference to FIG. 2 is used.

For example, in a case where the photo detector to be used is "(B) the three-signal output type" or "(C) the five-signal output type" illustrated in FIG. 2, the read signals from the respective tracks are three signals or five signals.

With the increase in the number of read signals, a data storage memory for input timing adjustment to the multi-input adaptive equalizer, that is, data to be stored in the memory 103 illustrated in FIGS. 8 and 10 is increased three times or five times.

Figure 12:
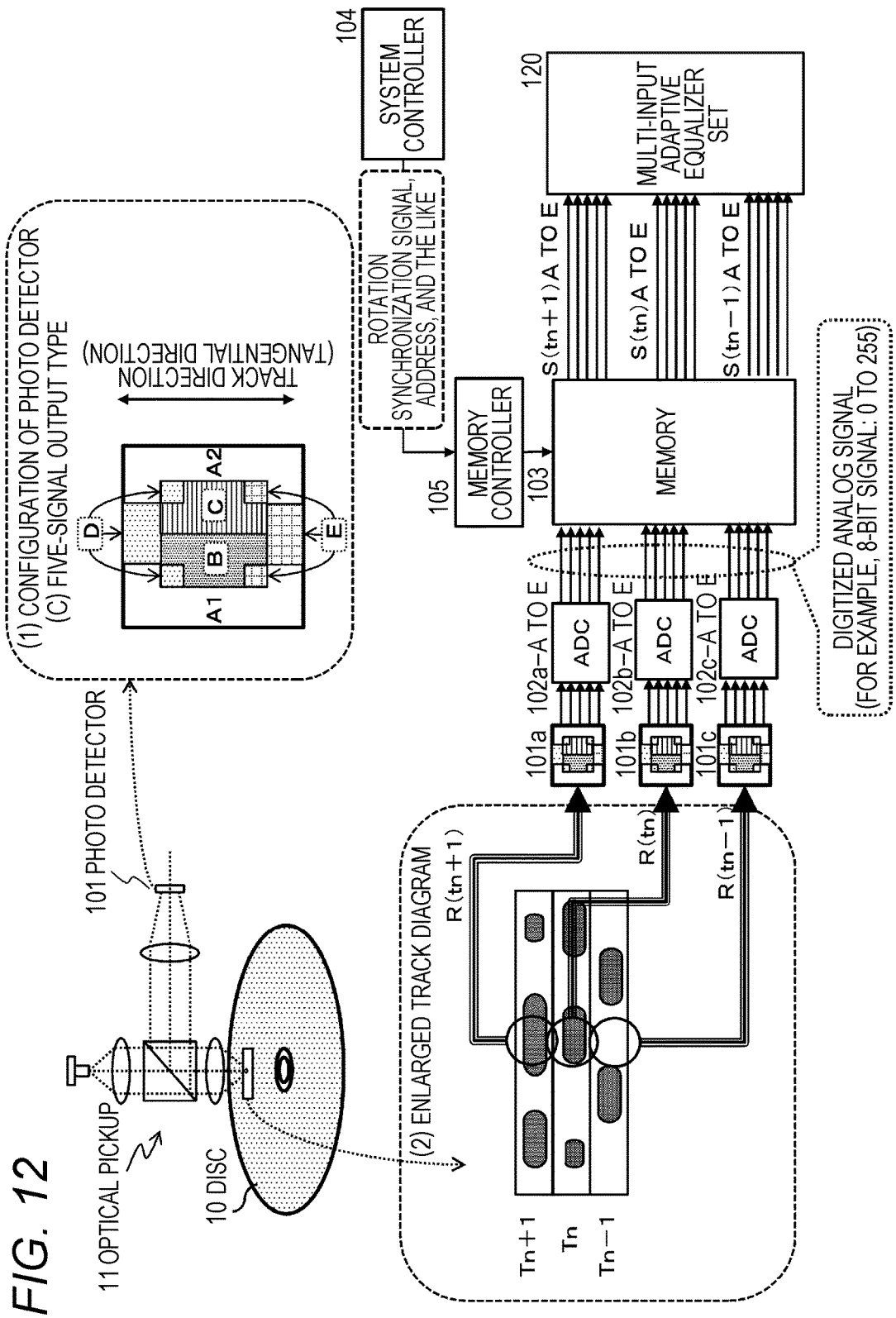
FIG. 12 is a diagram illustrating a configuration example of an information processing device (a reproducing device) that executes crosstalk cancellation by applying read data of an adjacent track using a five-signal output type photo detector.

FIG. 12 illustrates a configuration example of an information processing device (a reproducing device) that executes the crosstalk cancellation by applying the read data of the adjacent track using "(C) the five-signal output type" photo detector illustrated in FIG. 2.

The optical pickup 11 illustrated in FIG. 12 has the five-signal output type photo detector 101 described above with reference to FIGS. 2 and 3.

In other words, as described above with reference to FIG. 3, the following signals A to E are output in accordance with the amount of received light in the respective split regions (A1, A2, B, C, D1 to D3, and E1 to E3).

the signal A=A1+A2
the signal B=B
the signal C=C
the signal D=D1+D2+D3
the signal E=E1+E2+E3

The five signals are output from the photo detector 101.

Further, as described above, a signal including addition signals of a plurality of regions may be configured to generate a signal by multiplying by a weight coefficient of a preset region unit.

For example, an output signal may be generated by multiplying the following weight coefficients p and q:

$$A = p*A1 + q*A2$$

The pickup 11 performs the data reading process from the three adjacent tracks on the disc 10, and inputs the read data to the ADC 102, and the read data is converted into digital data and stored in the memory 103.

Further, the data reading process from the three adjacent tracks is executed in accordance with any one of the processes described above with reference to FIGS. 8 and 10. In other words, the data reading process is executed by any one of the following processes (a) and (b):

(a) the data reading processing corresponding to two rounds of track as described with reference to FIG. 8; and (b) the process in which a plurality of spot lights are irradiated, and readable pickup is applied as described with reference to FIG. 10.

In the configuration illustrated in FIG. 12, the read data from the disc 10, that is, the read data from the three adjacent tracks Tn−1, Tn, and Tn+1 are input from photo detector 101a to 101c to AD converters (ADCs) 102a to 102c, converted into digital signals, and stored in the memory 103.

Each of the photo detectors 101a to 101c outputs the five signals A to E in parallel.

Each of the AD converters (ADCs) 102a to 102c is constituted by five ADCs. In other words, a total of 15 ADCs operate in parallel, and digital signals generated by the 15 ADCs are stored in the memory 103.

The data stored in the memory 103 is a digital signal generated on the basis of an analog signal which is the read signal (RF signal) from the disc 10, for example, a digitized analog signal of 8 bits (0 to 255).

The data read from the three adjacent tracks are stored in the memory 103.

The five digitized analog signals of 8 bits (0 to 255) are output from one photo detector, and a total of 15 8-bit signals corresponding to the three tracks are stored in the memory 103.

The data stored in the memory 103 differs depending on which of the following processes (a) and (b) is performed:

(a) the data reading processing corresponding to two rounds of track as described with reference to FIG. 8; and (b) the process in which a plurality of spot lights are irradiated, and readable pickup is applied as described with reference to FIG. 10.

The data stored in the memory 103 differs depending on which of the above processes (a) and (b) is performed.

However, in both cases, it is necessary to store the data of 5 times in the memory 103 as compared with a case where the non-split photo detector described above with reference to FIG. 8 and FIG. 10 is used.

If the read data corresponding to the three tracks is stored in the memory 103, the read signals corresponding to the three tracks are input to a multi-input adaptive equalizer set 120.

Further, it is necessary to perform the data input from the memory 103 to the multi-input adaptive equalizer set 120 in a state in which the signals of the three tracks at the nearest positions, that is, the three signals of the A-B line in FIG. 8(1) described above are synchronized with one another. This control is performed by a memory controller 105 on the basis of a rotation synchronization signal, an address, or the like provided from a system controller 104 to the memory controller 105.

Figure 13:
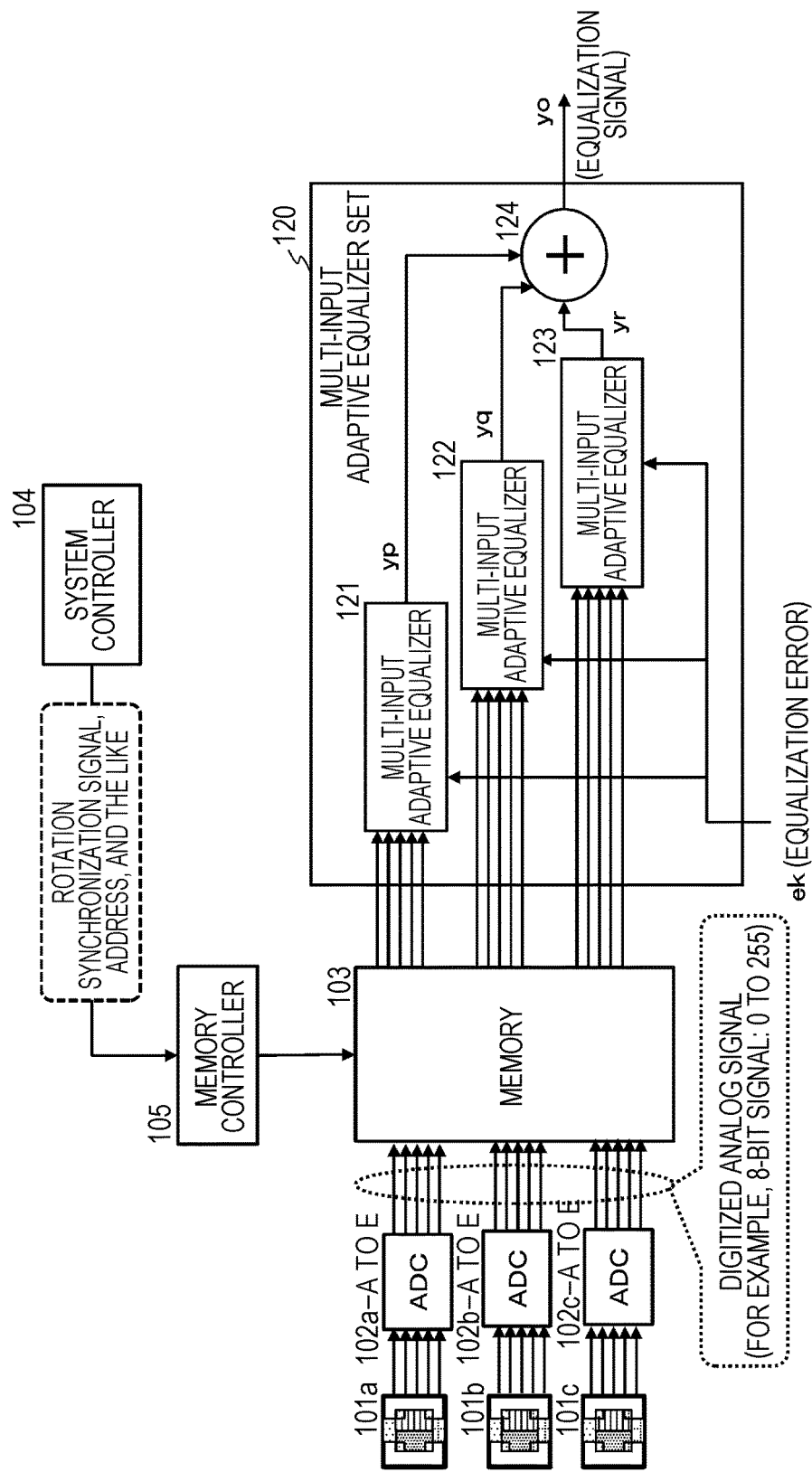
FIG. 13 is a diagram illustrating an example of a multi-input adaptive equalizer set.

As illustrated in FIG. 13, the multi-input adaptive equalizer set 120 includes three multi-input adaptive equalizers 121 to 123 to which the read signals (the five signals A to E) of the three tracks are input and an adder 124.

Figure 14:
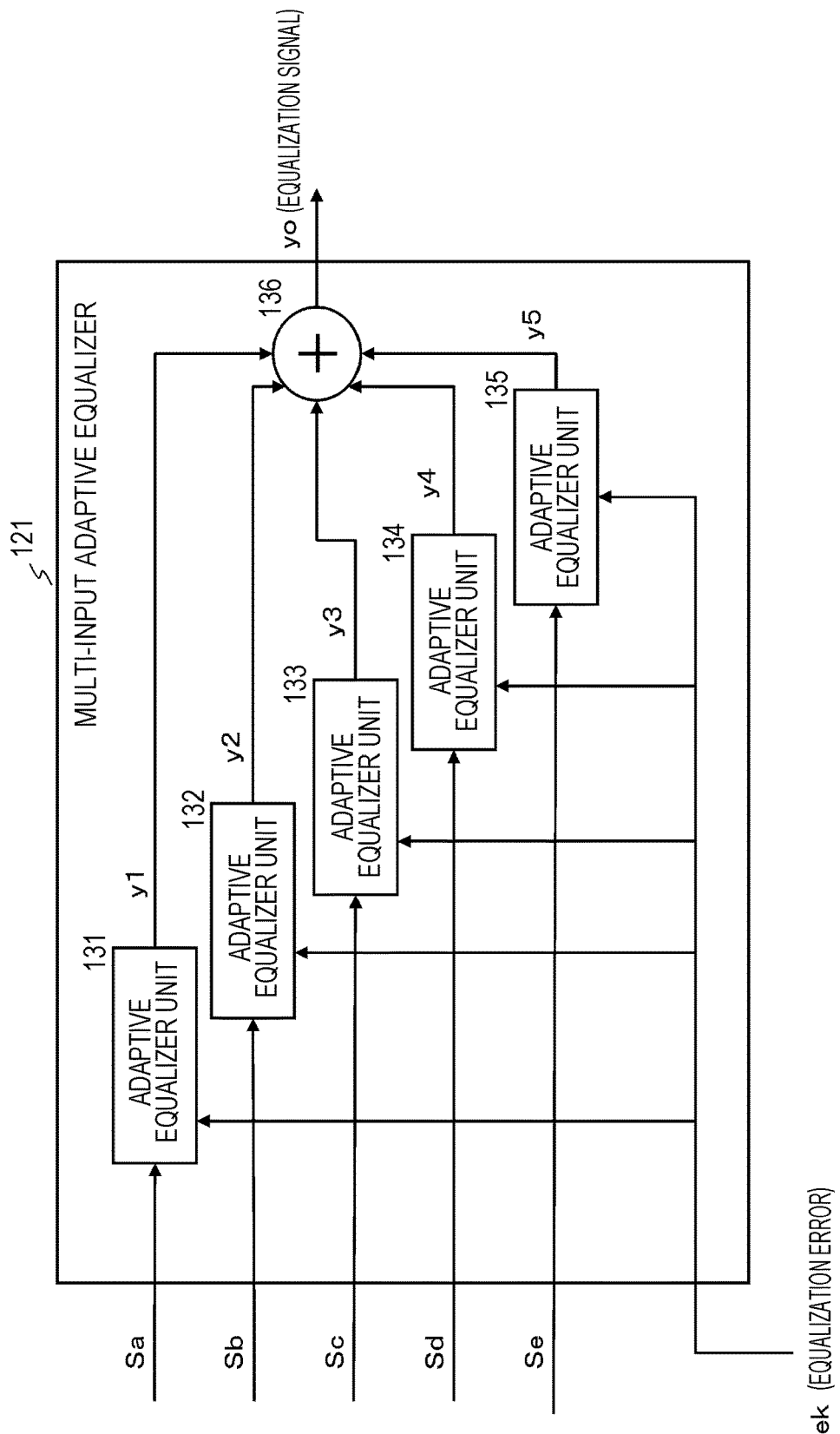
FIG. 14 is a diagram illustrating a configuration of each of multi-input adaptive equalizers 121 to 123.

As illustrated in FIG. 14, each of the multi-input adaptive equalizers 121 to 123 includes five adaptive equalizer units 131 to 135 for inputting the reproduction signals Sa to Se based on the five signals A to E output from the split region compatible five-signal output type photo detector, and an adder 136.

Each of adaptive equalizer units 131 to 135 includes an FIR filter described above with reference to FIG. 6.

In other words, the multi-input adaptive equalizer set 120 illustrated in FIGS. 12 and 13 includes 15 (=3×5) FIR filters described with reference to FIG. 6.

As described with reference to FIGS. 12 to 14, if the crosstalk cancellation using the read signal of the adjacent track is tried to be executed using the split type photo detector such as the split region compatible five-signal output type photo detector, the following problems occur:

(a) a circuit configuration of the multi-input adaptive equalization equalizer is increased;

(b) a memory capacity required for a memory required for the synchronization process of input data to the multi-input adaptive equalization equalizer is increased; and (c) A data processing circuit such as an ADC for an output signal of the photo detector increases in accordance with the number of processed signals, and the circuit size increases.

A configuration of solving such a problem will be described below.

[3. Configuration and Process of Executing Crosstalk Cancellation Using Binary Reproduction Signal (Binary Data) of Adjacent Track]

A configuration and a process of the information processing device that executes the crosstalk cancellation using the binary reproduction signal (binary data) of the adjacent track will be described below.

[3-1. Example in which Reproduction Signals of Two Adjacent Tracks on Both Sides are Applied]

Figure 15:
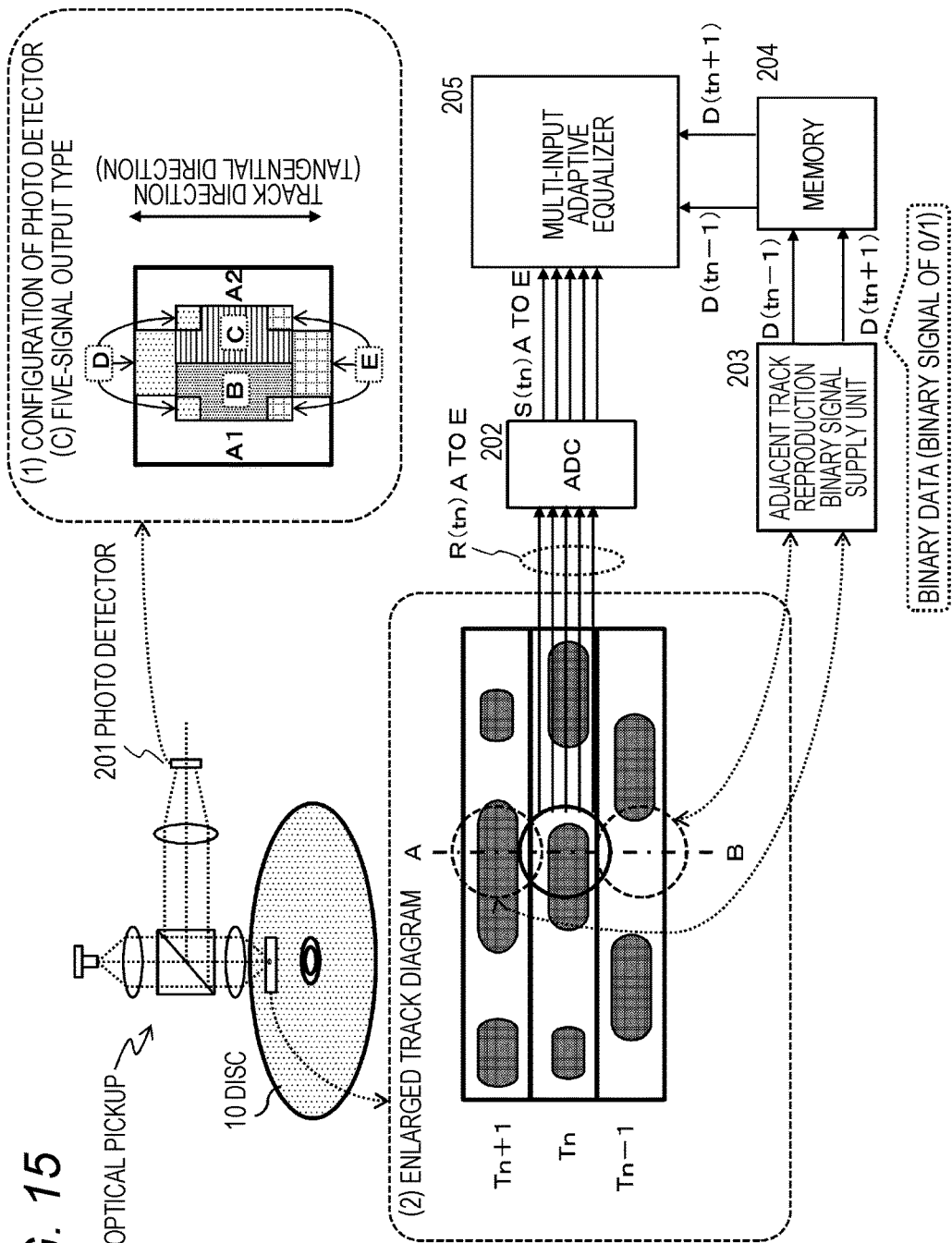
FIG. 15 is a diagram for describing an overview of a configuration and a process of an information processing device that executes crosstalk cancellation using a binary reproduction signal (binary data) of an adjacent track.

FIG. 15 is a diagram illustrating an overview of a configuration and a process of an information processing device that executes the crosstalk cancellation using the binary reproduction signal (binary data) of the adjacent track.

In FIG. 15, the optical pickup 11 includes a five-signal output type photo detector 201 as illustrated in FIG. 15(1).

Further, in the following description, an example in which the five-signal output type photo detector 201 is applied will be described as a representative example, but the process of the present disclosure can be applied even in a configuration in which photo detectors having various signal output numbers such as the one-signal output type or the three-signal output type other than the five-signal output type are used.

The optical pickup 11 reads the record data of the current reproduction track (Tn), that is, the center track (Tn) of the three adjacent tracks (Tn−1, Tn, and Tn+1) illustrated in an enlarged track diagram of FIG. 15(2). The photo detector 201 of the optical pickup 11 inputs read signals [R(tn)A to R(tn)E] including the five signals to an ADC 202.

The ADC 202 performs the digital conversion of the five read signals and inputs the signals S(tn)A to S(tn)E to the multi-input adaptive equalizer 205.

The input signals are digitized analog signals (for example, 8 bits (0 to 255)) obtained by digitizing the read signal (RF signal) from the disc 10.

On the other hand, for the adjacent tracks (Tn−1 and Tn+1) of the current reproduction track (Tn), the last reproduction signal, that is, a binary signal or binary data having any one of 1 and 0 corresponding to a mark (pit) recorded in the disc is input from an adjacent track reproduction binary signal supply unit 203 to a multi-input adaptive equalizer 205 via a memory 204.

A signal D(tn−1) illustrated in FIG. 15 is the reproduction binary signal (binary data) of the track Tn−1, and a signal D(tn+1) is the reproduction binary signal (binary-data) of the track Tn+1.

The signals supplied by the adjacent track reproduction binary signal supply unit 203 is the last reproduction signals of the adjacent tracks (Tn−1 and Tn+1) of the current reproduction track (Tn), that is, a binary signal or binary data having any one of 1 and 0 corresponding to a mark (pit) recorded in the disc.

This binary signal (binary data) is stored in the memory 204, and the binary data which is the reproduction binary signals of the two adjacent tracks (Tn−1 and Tn+1) on both sides of the reading track (Tn) at the nearest positions is input from the memory 204 to the multi-input adaptive equalizer 205.

Further, the reproduction signal (binary data) of the adjacent track input from the memory 204 to the multi-input adaptive equalizer 205 is preferably data at the nearest position of the current reading track (Tn) input via the ADC 202, that is, data at the position along the radial direction of the disc.

In other words, it is necessary to synchronize and input the signals of the A-B line illustrated in the enlarged track diagram of FIG. 15(2). The A-B line corresponds to the lines in the radial direction of the disc.

Although not illustrated in FIG. 15, the synchronization input control is performed by the memory controller on the basis of the rotation synchronization signal, the address, or the like provided from the system controller to the memory controller as described above with, reference to FIG. 8 or the like.

In the configuration illustrated in FIG. 15, the reproduction binary signals (binary data) of the adjacent tracks (Tn−1 and Tn+1) of the current reproduction track (Tn) are stored in the memory 204.

In the configuration described above with reference to FIGS. 8, 10, 12, and 13, it is necessary to store the digitized analog signal (for example, 8 bits (0 to 255)) obtained by digitizing the read signal (RF signal) by the optical pickup 11 in the memory 103, and a large memory capacity is necessary to store the data.

On the other hand, in the configuration illustrated in FIG. 15, since the reproduction binary signals (binary data) of the adjacent tracks (Tn−1 and Tn+1) of the current reproduction track (Tn) are in the memory 204, the necessary memory capacity is significantly reduced.

Further, in the configuration illustrated in FIG. 15, the ADC installed in at stage before the multi-input adaptive equalizer 205 is only the ADC for the read signal R(tn) A to E of the current reproduction track (Tn), and it is possible to reduce the number of necessary ADCs as compared with the configuration described with reference to FIG. 13.

Further, a configuration in which the data amount is further reduced by executing a compression process according to a predetermined algorithm on the reproduction binary signal (binary data) stored in the memory 204 before the reproduction binary signal (binary data) stored in the memory 204 is stored in the memory 204. In this case, however, it is necessary to execute a decompression process on compressed data as a process before the data is output from the memory 204 to the multi-input adaptive equalizer 205.

In the configuration of the present disclosure, the adjacent track reproduction binary signal supply unit 203 supplies the last reproduction signals of the adjacent tracks (Tn−1 and Tn+1) of the current reproduction track (Tn), that is, a binary signal or binary data having any one of 1 and 0 corresponding to a mark (pit) recorded in the disc to the memory.

The adjacent track reproduction binary signal supply unit 203 can have various configurations. As one of the configurations, it is possible to apply a configuration of executing a conventional type reproduction signal generation process, for example, a reproduction signal generation configuration similar to that described with reference to FIG. 4 without change.

Alternatively, it is also possible to reuse the reproduction signal obtained by applying the configuration illustrated in FIG. 15 for the next reproduction track.

Alternatively, for example, in a case where the recording signal for the disc 10 is known, the recording signal may be used without change.

The process examples will be described later.

Figure 16:
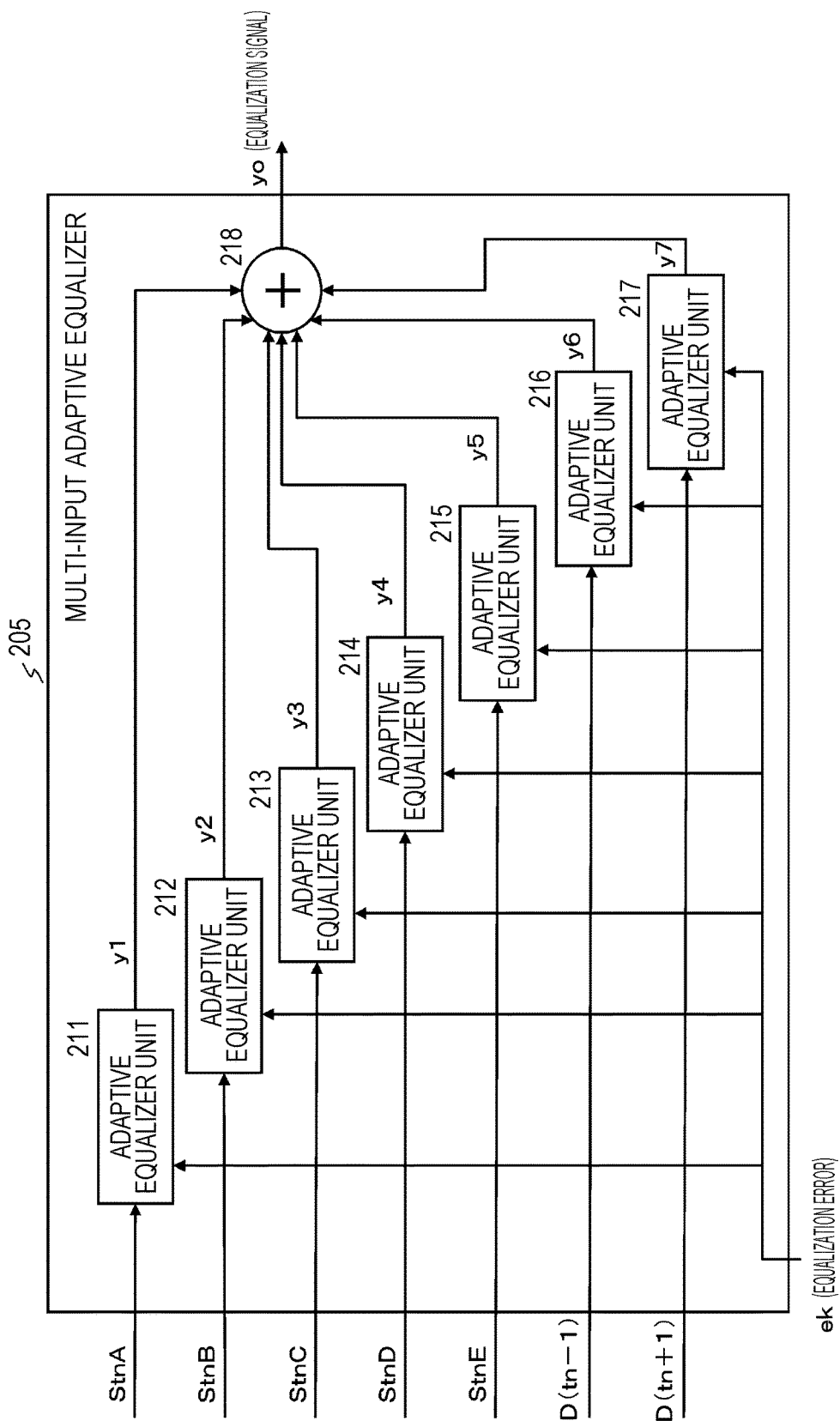
FIG. 16 is a diagram illustrating a configuration of a multi-input adaptive equalizer 205 illustrated in FIG. 15.

FIG. 16 is a diagram illustrating a configuration of the multi-input adaptive equalizer 205.

As illustrated in FIG. 16, the multi-input adaptive equalizer 205 includes adaptive equalizer units 211 to 217 and an adder 218.

The read signals of the current reproduction track (Tn), that is, the five signals (StnA to StnE) obtained through the five-signal output type pickup are input to the adaptive equalizer units 211 to 215, respectively.

Further, the reproduction binary signals (binary data) (D(tn−1) and D(tn+1)) of the adjacent tracks are input from the memory 204 to the adaptive equalizer units 216 to 217.

The multi-input adaptive equalizer 205 performs the PR adaptive equalization process on the basis of the input signals.

Each of the adaptive equalizer units 211 to 217 is constituted by an FIR filter similar to that in FIG. 6 described above.

Each of the adaptive equalizer units 211 and 217 has an FIR filter tap number, a calculation accuracy (bit resolution), and a parameter of an update gain of adaptive operation, and an optimal value is set in each of the adaptive equalizer units 211 and 217.

The equalization error ek is supplied to each of the adaptive equalizer units 211 and 217 as a coefficient control value for adaptive control.

Outputs y1 to y7 of the adaptive equalizer units 211 to 217 are added by the adder 218 and output as an equalization signal y0 of a multi-input adaptive equalizer 206.

The output target of the multi-input adaptive equalizer 206 is an ideal PR waveform in which binary detection result is convoluted into the partial response (PR).

Each of the adaptive equalizer units 211 to 217 is constituted by, for example, the FIR filters illustrated in FIG. 6.

In other words, each of the adaptive equalizer unit 211 to 217 is a filter with (n+1) taps including delay elements 80-1 to 80-$n$, coefficient multipliers 81-0 to 81-$n$, and an adder 84 similar to those illustrated in FIG. 6.

The coefficient multipliers 81-0 to 81-$n$ multiply an input x at each time point by tap coefficients C0 to Cn.

Outputs of the coefficient multipliers 81-0 to 81-$n$ are added by an adder 84 and sent out as an output y.

In order to perform the adaptive equalization process, the tap coefficients C0 to Cn are controlled. To this end, calculators 82-0 to 82-$n$ that receive the equalization error ek and each tap input and perform a calculation are installed. Further, integrators 83-0 to 83-$n$ that integrate outputs of the calculators 82-0 to 82-$n$ are installed.

Each of the calculators 82-0 to 82-$n$ performs, for example, a calculation of $-1 \times ek \times x$. The outputs of the calculators 82-0 to 82-$n$ are integrated by integrators 83-0 to 83-$n$, and the tap coefficients C0 to Cn of the coefficient multipliers 81-0 to 81-$n$ are changed and controlled on the basis of the integration result. Further, the integration of the integrators 83-0 to 83-$n$ is performed to adjust the responsiveness of adaptive coefficient control.

By using the above configuration, the crosstalk cancellation is performed, and then the binary data is decoded.

Each of the adaptive equalizer units 211 to 217 has the configuration illustrated in FIG. 6, and is supplied with the same equalization error ek and performs the adaptive equalization. The adaptive equalizer units 211 to 215 to which the signals StnA to StnE of the track (Tn) of the reproduction target are input perform optimization of the error and the phase distortion of the input signal frequency component of the reproduction signal, that is, the adaptive PR equalization. This is identical to the function of the normal adaptive equalizer.

In other words, the tap coefficients C0 to Cn are adjusted in accordance with the calculation result of $-1 \times ek \times x$ in each of the calculators 82-0 to 82-$n$ illustrated in FIG. 6, and the tap coefficients C0 to Cn are adjusted in the direction in which the equalization error is eliminated.

On the other hand, in the other two adaptive equalizer units 216 and 217, the output target is not related to the reproduction signals of the adjacent tracks. From this fact, in the adaptive equalizer units 216 and 217 perform the calculation of cancelling the correlation component, that is, the crosstalk component.

In other words, in the case of adaptive equalizer units 216 and 217, the tap coefficients C0 to Cn are adjusted in accordance with the calculation result of $-1 \times ek \times x$ in each of the calculator 82-0 to 82-$n$, and the tap coefficients C0 to Cn are adjusted so that the frequency characteristic is obtained in the direction in which the crosstalk component is eliminated in the addition result of the adder 218 of FIG. 16.

In this manner, the adaptive equalizer units 211 to 215 adaptively controls the tap coefficients C0 to Cn in the direction in which the desired frequency characteristic is obtained using the equalization error ek, while the adaptive equalizer units 216 and 217 automatically control the tap coefficients C0 to Cn in the direction in which the frequency characteristic for the crosstalk cancellation is similarly obtained using the equalization error ek. Accordingly, the equalization signal y0 of the multi-input adaptive equalizer 206 obtained by adding the outputs y1 to y7 of the adaptive equalizer units 211 to 217 by the adder 218 is a signal in which the crosstalk is canceled.

Further, in the adaptive equalizer units 211 to 215 to which the read signals of the current reproduction track (Tn), that is, the five signals (StnA to StnE) obtained through the five-signal output type pickup are input, the control process for the tap coefficients according to the characteristics of the five signals (StnA to StnE) is performed. A specific example of this process is described in Patent Document 1 (International Publication No. WO 2016/006157) which is a prior application of the same applicant as the present applicant. In the configuration of the present application, a tap coefficient setting process corresponding to each signal similar to that described in the prior application can be applied.

[3-2. Example in which Reproduction Signal of One Adjacent Track is Applied]

The example described with reference to FIGS. 15 and 16 is the process example of executing the crosstalk cancellation using the reproduction binary signals (binary data) of the adjacent tracks (Tn−1 and Tn+1) on both sides of the current reproduction track (Tn).

However, it may be difficult to acquire in advance the reproduction signals on both sides of the reproduction target signal, depending on the configuration of the pickup or the reproduction sequence setting condition.

The example to be described below is a process example of applying the reproduction signal of only one adjacent track instead of the two tracks on both sides of the current reproduction track (Tn).

Figure 17:
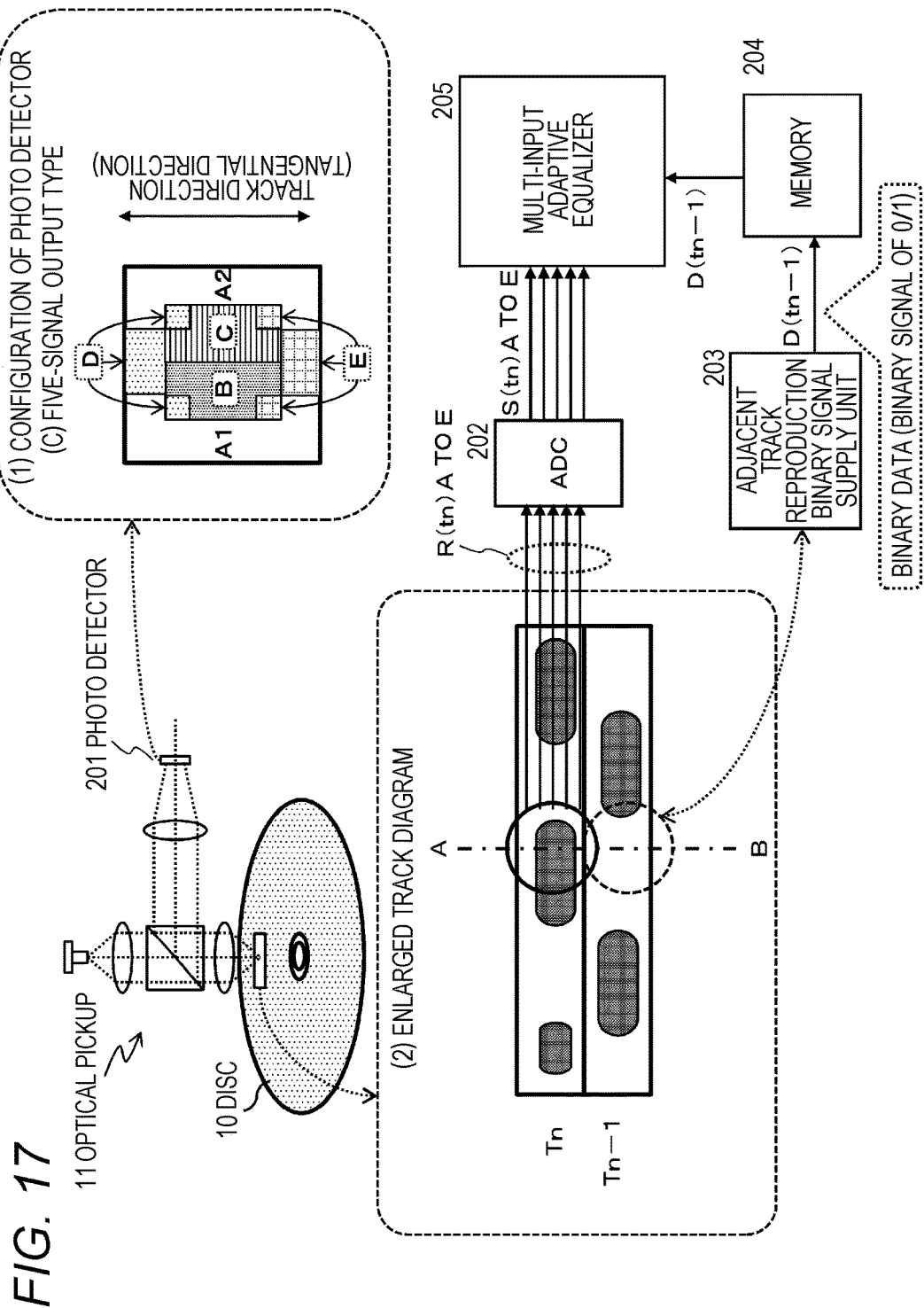
FIG. 17 illustrates an overview of a configuration and a process of an information processing device that executes crosstalk cancellation using a binary reproduction signal (binary data) of one adjacent track (Tn−1) adjacent to a current reproduction track (Tn).

FIG. 17 illustrates an overview of a configuration and a process of an information processing device that executes the crosstalk cancellation using the binary reproduction signal (binary data) of one adjacent track (Tn−1) adjacent to the current reproduction track (Tn).

In FIG. 17, the optical pickup 11 includes a five-signal output type photo detector 201 as illustrated in FIG. 17(1).

Further, as described above, the process of the present disclosure can also be applied even in a configuration in which photo detectors having various signal output numbers such as the one-signal output type or the three-signal output type other than the five-signal output type a reused.

The optical pickup 11 reads the record data of the current reproduction track (Tn), that is, the record data of one track (Tn) of the two adjacent tracks (Tn−1 and Tn) illustrated in an enlarged track diagram of FIG. 17(2). The photo detector 201 of the optical pickup 11 inputs the read signals [R(tn)A to R(tn)E] including the five signals to the ADC 202.

The ADC 202 performs the digital conversion of the five read signals and inputs the signals S(tn)A to S(tn)E to the multi-input adaptive equalizer 205.

The input signals are digitized analog signals (for example, 8 bits (0 to 255)) obtained by digitizing the read signal (RF signal) from the disc 10.

On the other hand, for one adjacent track (Tn−1) of the current reproduction track (Tn), the last reproduction signal, that is, a binary signal or binary data having any one of 1 and 0 corresponding to a mark (pit) recorded in the disc is input from an adjacent track reproduction binary signal supply unit 203 to a multi-input adaptive equalizer 205 via a memory 204.

A signal D(tn−1) illustrated in FIG. 15 is the reproduction binary signal (binary data) of the track Tn−1.

The signals supplied by the adjacent track reproduction binary signal supply unit 203 is the last reproduction signal of the adjacent track (Tn−1) of the current reproduction track (Tn), that is, a binary signal or binary data having any one of 1 and 0 corresponding to a mark (pit) recorded in the disc.

This binary signal (binary data) is stored in the memory 204, and the binary data which is the reproduction binary signal of one adjacent track (Tn−1) of the reading track (Tn) at the nearest positions is input from the memory 204 to the multi-input adaptive equalizer 205.

Further, the reproduction signal (binary data) of the adjacent track input from the memory 204 to the multi-input adaptive equalizer 205 is preferably data at the nearest position of the current reading track (Tn) input via the ADC 202, that is, data at the position along the radial direction of the disc.

In other words, it is necessary to synchronize and input the signals of the A-B line illustrated in the enlarged track diagram of FIG. 17(2). The A-B line corresponds to the lines in the radial direction of the disc.

Although not illustrated in FIG. 17, the synchronization input control is performed by the memory controller on the basis of the rotation synchronization signal, the address, or the like provided from the system controller to the memory controller as described above with reference to FIG. 8 or the like.

In the configuration illustrated in FIG. 17, the reproduction binary signal (binary data) of the adjacent track (Tn−1) of the current reproduction track (Tn) is stored in the memory 204.

In the present example, the memory capacity required for the memory 204 is significantly reduced, similarly to that described above with reference to FIG. 15 as compared with the memories 103 described above with reference to FIG. 8, FIG. 10, FIG. 12, and FIG. 13. Further, it is possible to reduce the number of necessary ADCs.

Further, a configuration in which the data amount is further reduced by executing a compression process according to a predetermined algorithm on the reproduction binary signal (binary data) stored in the memory 204 before the reproduction binary signal (binary data) stored in the memory 204 is stored in the memory 204. In this case, however, it is necessary to execute a decompression process on compressed data as a process before the data is output from the memory 204 to the multi-input adaptive equalizer 205.

As described above. In the configuration of the present disclosure, the adjacent track reproduction binary signal supply unit 203 supplies the last reproduction signal of one adjacent track (Tn−1) of the current reproduction track (Tn), that is, a binary signal or binary data having any one of 1 and 0 corresponding to a mark (pit) recorded in the disc to the memory.

Further, the adjacent track reproduction binary signal supply unit 203 can have various configurations.

Figure 18:
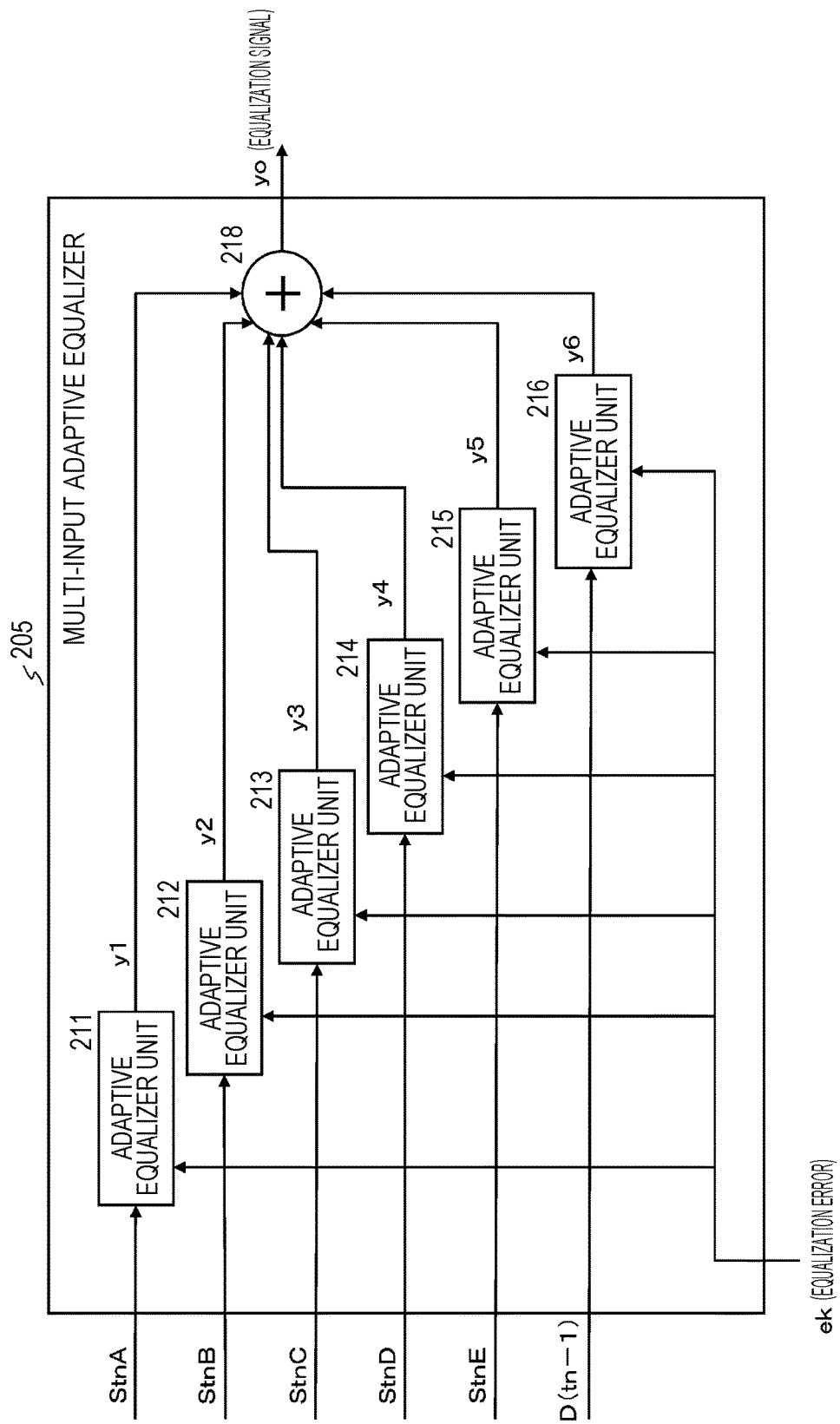
FIG. 18 is a diagram illustrating a configuration of a multi-input adaptive equalizer 205 illustrated in FIG. 17.

FIG. 18 is a diagram illustrating a configuration of the multi-input adaptive equalizer 205.

As illustrated in FIG. 18, the multi-input adaptive equalizer 205 has adaptive equalizer units 211 to 216 and an adder 218.

A configuration of the multi-input adaptive equalizer 205 illustrated in FIG. 18 corresponds to a configuration in which the adaptive equalizer unit 217 is deleted from the multi-input adaptive equalizer 205 of FIG. 16 described above.

In this configuration, only the adaptive equalizer unit 216 receives the reproduction signal of one adjacent track (Tn−1) which is not the current reproduction track (Tn).

The adaptive equalizer units 211 to 215 adaptively controls the tap coefficients C0 to Cn in the direction in which the desired frequency characteristic is obtained using the equalization error ek.

On the other hand, the adaptive equalizer unit 216 automatically controls the tap coefficients C0 to Cn in the direction in which the frequency characteristic for the crosstalk cancellation is similarly obtained using the equalization error ek. Accordingly, the equalization signal y0 of the multi-input adaptive equalizer 206 obtained by adding the outputs y1 to y6 of the adaptive equalizer units 211 to 216 by the adder 218 is a signal in which the crosstalk is canceled.

Further, in the adaptive equalizer units 211 to 215 to which the read signals of the current reproduction track (Tn), that is, the five signals (StnA to StnE) obtained through the five-signal output type pickup are input, the control process for the tap coefficients according to the characteristics of the five signals (StnA to StnE) is performed. A specific example of this process is described in Patent Document 1 (International Publication No. WO 2016/006157) which is a prior application of the same applicant as the present applicant as described above. In the configuration of the present application, a tap coefficient setting process corresponding to each signal similar to that described in the prior application can be applied.

[3-3. Specific Configuration Example of Adjacent Track Reproduction Binary Signal Supply Unit in Example in which Reproduction Signal of One Adjacent Track is Applied and Configuration Example of Information Processing Device]

Next, a specific configuration example of the adjacent track reproduction binary signal supply unit 203 illustrated in the configuration of rigs. 15 and 17 and a configuration example of an information processing device will be described.

First, a specific configuration example of the adjacent track reproduction binary signal supply unit and a configuration example of an information processing device in the example in which a reproduction signal of one adjacent track is applied will be described with reference to FIG. 19 and subsequent drawings.

As described above, the adjacent track reproduction binary signal supply unit 203 can have various configurations.

As one of the configurations, it is possible to apply a configuration of executing a conventional type reproduction signal generation process, for example, a reproduction signal generation configuration similar to that described with reference to FIG. 4 without change.

Alternatively, it is also possible to reuse the reproduction signal obtained by applying the configuration illustrated in FIG. 15 for the next reproduction track.

Alternatively, for example, in a case where the recording signal for the disc 10 is known, the recording signal may be used without change.

Figure 19:
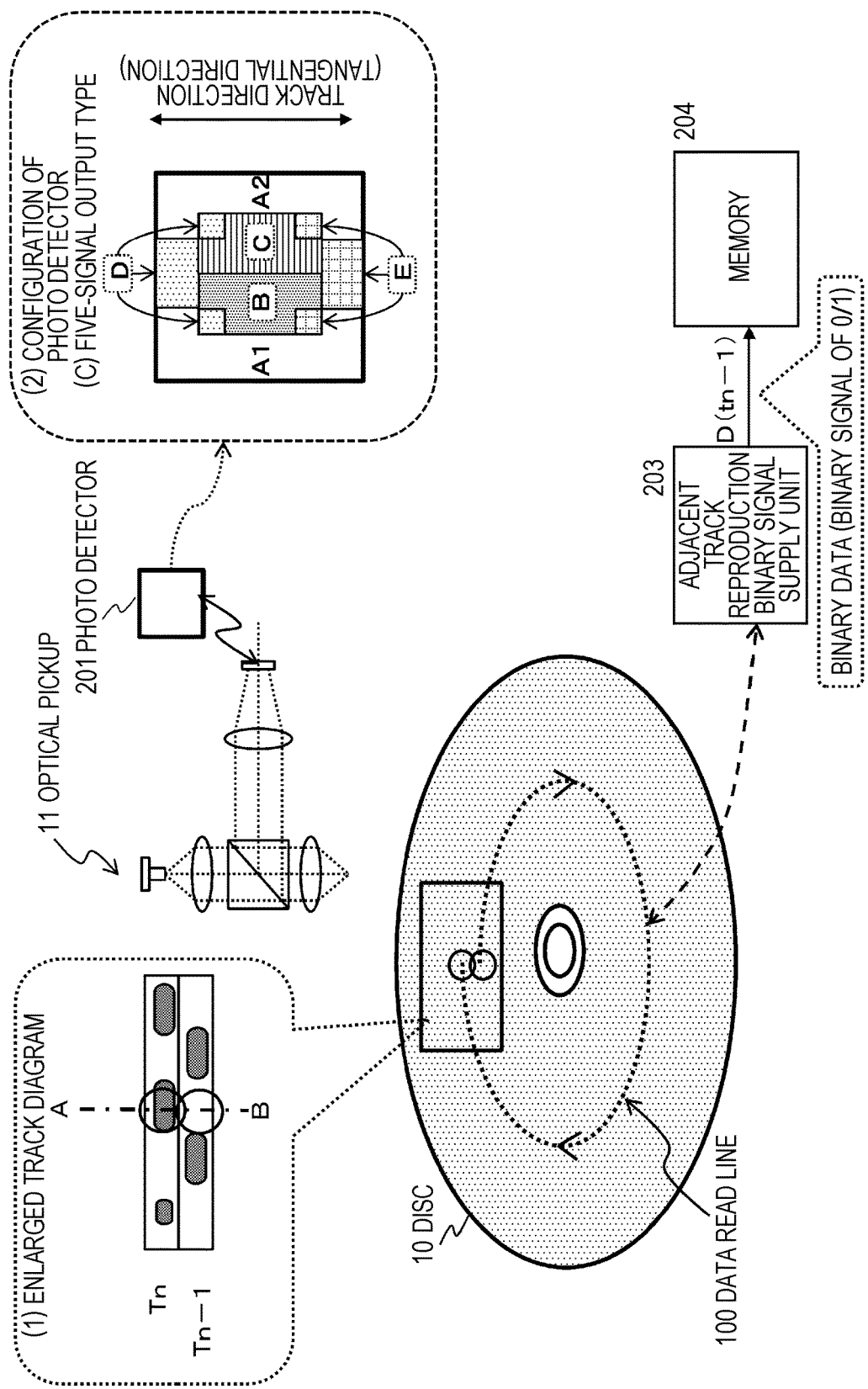
FIG. 19 is a diagram for describing a configuration of an adjacent track reproduction binary signal supply unit that generates a reproduction binary signal (binary data) of one track (Tn−1) adjacent to a current reproduction track (Tn).

FIG. 19 is a diagram illustrating one process example in a configuration in which the adjacent track reproduction binary signal supply unit 203 generates the reproduction binary signal (binary data) of one track (Tn−1) adjacent to the current reproduction track (Tn).

The example illustrated in FIG. 19 is a process example in which a reproducing device in which one optical pickup 11 sets one irradiation spot and performs reproduction is applied.

The data read by the optical pickup 11 along the data read line 100 of the disc 10 illustrated in FIG. 19 is supplied to the adjacent track reproduction binary signal supply unit 203, and a common reproduction signal (binary data (binary data)) generation process is executed here.

In other words, the adjacent track reproduction binary signal supply unit 203 generates the reproduction signal of the preceding track region by applying, for example, the reproduction signal generation signal configuration described above with reference to FIG. 4 and stores the reproduction signal in the memory 204.

Figure 20:
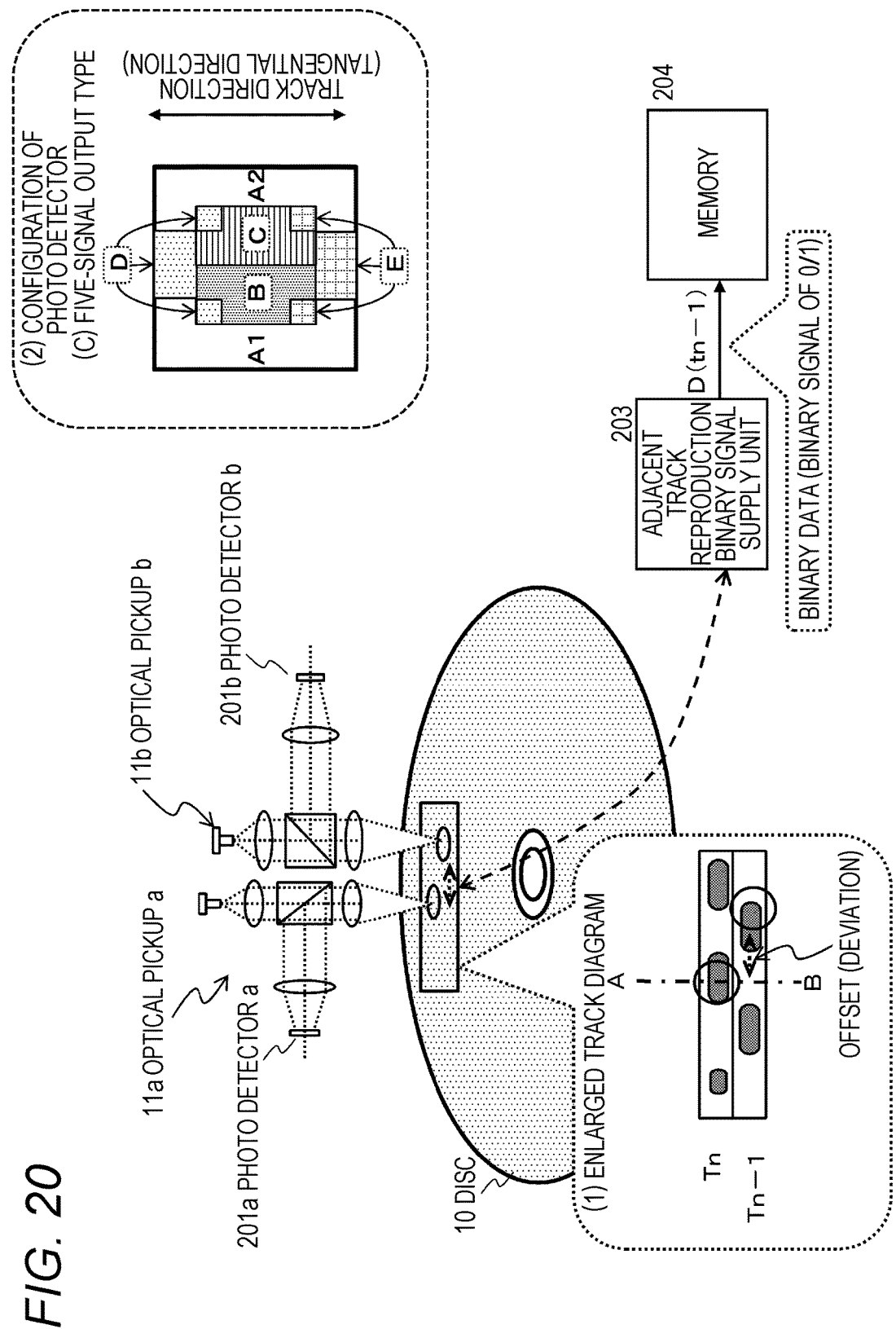
FIG. 20 is a diagram for describing a process example of a reproducing device that sets two irradiation spots and performs reproduction through two optical pickups 11a and 11b.

An example illustrated in FIG. 20 is a process example in which a reproducing device includes two optical pickups 11a and 11b and sets two irradiation spots and performs reproduction is applied.

Further, two irradiation lights may be set using one optical pickup. The optical pickup has a configuration similar to the optical pickup described above with reference to FIG. 10.

In an example of the disc 10 illustrated in FIG. 20, the optical pickup a, 11a acquires the reproduction signal of the current reproduction track (Tn), and the optical pickup b, 11b acquires the reproduction signal of the adjacent track (Tn−1).

In this configuration, the read data from the adjacent track (Tn−1) corresponding to the offset (deviation) distance between the two irradiation lights is supplied to the adjacent track reproduction binary signal supply unit 203 via the optical pickup b, 11b, and the common reproduction signal (binary data (binary data)) generation process is here executed.

Further, FIG. 20 illustrates an example in which the pickup having the offset (deviation) in the track direction in irradiation spot light between adjacent tracks is used, but in a case where an optical pickup capable of irradiating a plurality of spot lights having no offset is used, a data storage process according to the offset distance is unnecessary.

A specific example will be described with reference to FIG. 21.

Figure 21:
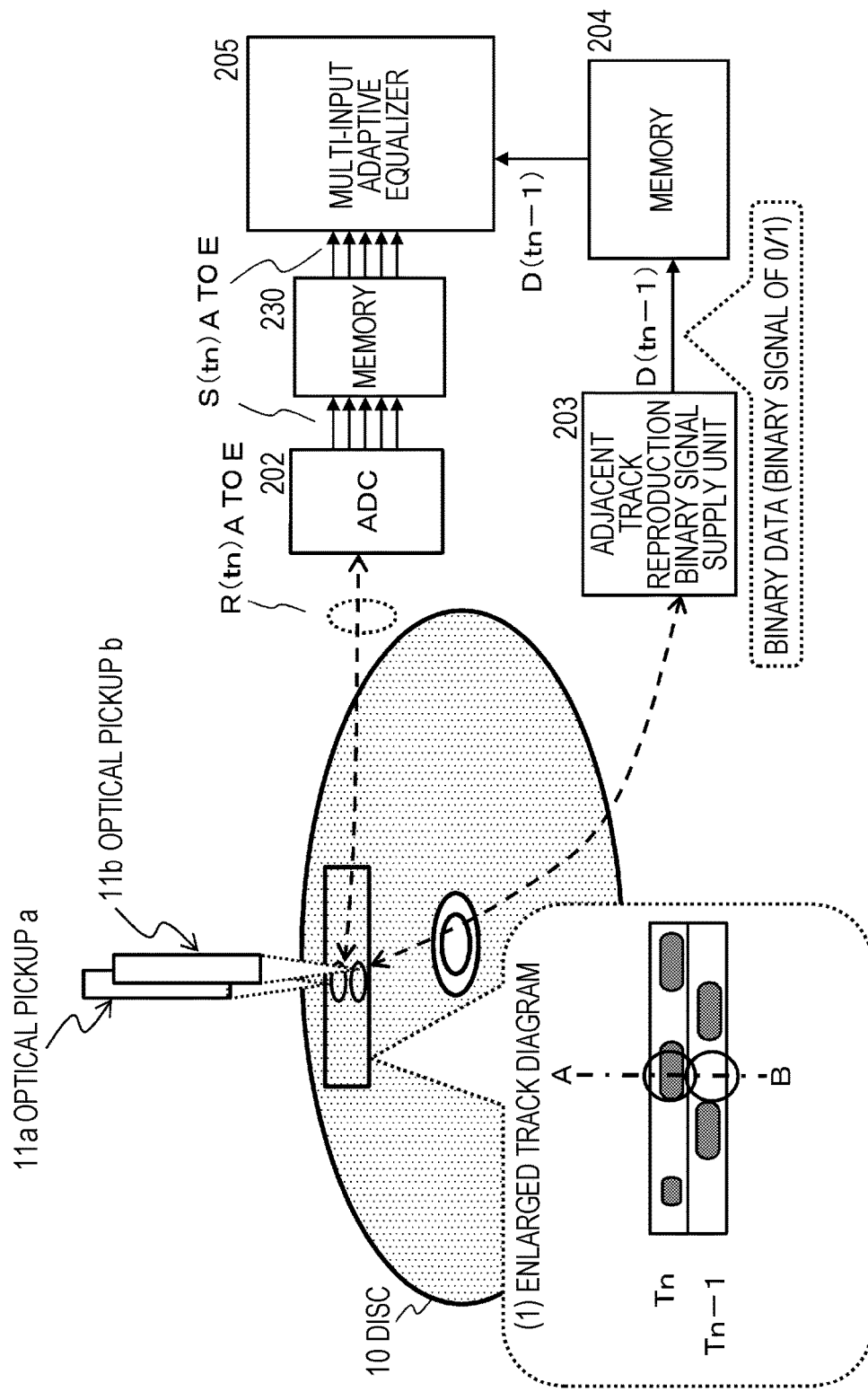
FIG. 21 is a diagram for describing a process example of a reproducing device that sets two irradiation spots and performs reproduction through two optical pickups 11a and 11b.

An example illustrated in FIG. 21 is a process example in which a reproducing device includes two optical pickups 11a and 11b and sets two irradiation spots and performs reproduction is applied, similarly to the example illustrated m FIG. 20.

Here, in the example illustrated in FIG. 20, there is an offset (deviation) in the track direction in the irradiation spot light between the adjacent tracks, but in the example illustrated in FIG. 21, there is no offset.

In a case where there is a shift as illustrated in FIG. 20, it is necessary to correct data by storing data corresponding to the shift in memory.

Further, two irradiation lights may be set using one optical pickup. The optical pickup has a configuration similar to the optical pickup described above with reference to FIG. 10.

In the example illustrated in FIG. 21, the optical pickup a, 11a acquires the reproduction signal of the current reproduction track (In), and the optical pickup b, 11b acquires the reproduction signal of the adjacent track (Tn−1).

In this configuration, the read data from the adjacent track (Tn−1) of the current reproduction track (Tn) is supplied to the adjacent track reproduction binary signal supply unit 203 via the optical pickup b, 11b, and here, the common normal reproduction signal (binary data (binary data)) is generated and input to the multi-input adaptive equalizer 205 via the memory 204.

The reproduction signal (binary data (binary data)) of the adjacent track (Tn−1) generated by the reproduction binary signal supply unit 203 is stored in the memory 204.

On the other hand, the read signals [R(tn)A to R(tn)E] of the current reproduction track (Tn) are input to the ADC 202, converted into digital data [the digitized analog signals S(tn)A to S(tn)E (for example, 8 bits (0 to 255)), stored in a memory 230, and then input from the memory 230 to the multi-input adaptive equalizer 205.

Further, the memory 230 and the memory 204 are buffers for adjustment (delay processing) of an input timing to the multi-input adaptive equalizer 205 and can have a small memory capacity.

Figure 22:
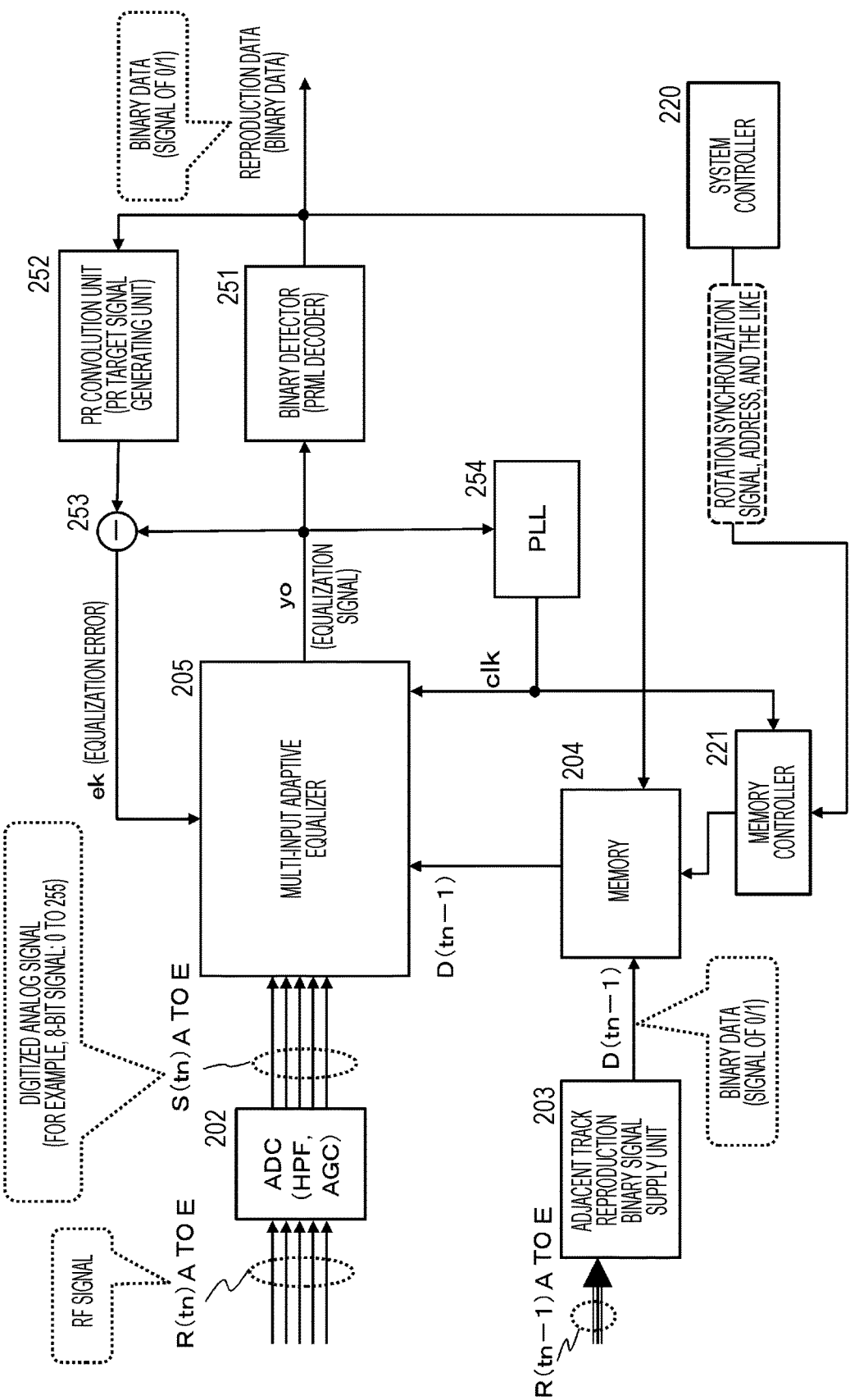
FIG. 22 is a diagram illustrating a configuration example of an information processing device in an example in which a reproduction signal of one adjacent track is applied.

FIG. 22 is a diagram for describing a configuration example of an information processing device in the example in which the reproduction signal of one adjacent track is applied.

The ADC 202, the adjacent track reproduction binary signal supply unit 203, the memory 204, and the multi-input adaptive equalizer 205 illustrated in FIG. 22 are identical to the ADC 202, the adjacent track reproduction binary signal supply unit 203, the memory 204, and the multi-input adaptive equalizer 205 illustrated in FIG. 17.

A configuration illustrated in FIG. 22 is an example in which a pickup including a five-signal output type photo detector as an optical pickup is used, similarly to that described with reference to FIG. 17.

Further, as described above, the process of the present disclosure can also be applied even in a configuration in which photo detectors having various signal output numbers such as the one-signal output type or the three-signal output type other than the five-signal output type are used.

The five read signals [R(tn)A to R(tn)E] from the current reproduction track (Tn) are input from the optical pickup to the ADC 202 illustrated in FIG. 22.

Further, the ADC 201 illustrated in FIG. 22 may include a signal processing function such as a high pass filter (HPF) and an auto gain controller (AGC) in addition to the ADC.

The ADC 202 performs the digital conversion of the five read signals and inputs the signals S(tn)A to S(tn)E to the multi-input adaptive equalizer 205.

The input signals are digitized analog signals (for example, 8 bits (0 to 255)) obtained by digitizing the read signal (RF signal) from the disc 10.

On the other hand, for one adjacent track (Tn−1) of the current reproduction track (Tn), the last reproduction signal, that is, a binary signal or binary data having any one of 1 and 0 corresponding to a mark (pit) recorded in the disc is input from an adjacent track reproduction binary signal supply unit 203 to a multi-input adaptive equalizer 205 via a memory 204.

A signal D(tn−1) illustrated in FIG. 22 is the reproduction binary signal (binary data) of the track Tn−1.

The signals supplied by the adjacent track reproduction binary signal supply unit 203 is the last reproduction signal of the adjacent track (Tn−1) of the current reproduction track (Tn), that is, a binary signal or binary data having any one of 1 and 0 corresponding to a mark (pit) recorded in the disc.

This binary signal (binary data) is stored in the memory 204, and the binary data which is the reproduction binary signal of one adjacent track (Tn−1) of the reading track (Tn) at the nearest positions is input from the memory 204 to the multi-input adaptive equalizer 205.

Further, the reproduction signal (binary data) of the adjacent track input from the memory 204 to the multi-input adaptive equalizer 205 is preferably data at the nearest position of the current reading track (Tn) input via the ADC 202, that is, data at the position along the radial direction of the disc.

This synchronization input control is performed by a memory controller 221 on the basis of the rotation synchronization signal, the address, or the like provided from a system controller 220 to the memory controller 221.

In the configuration illustrated in FIG. 22, the reproduction binary signal (binary data) of the adjacent track (Tn−1) of the current reproduction track (Tn) is stored in the memory 204.

In the present example, the memory capacity required for the memory 204 is significantly reduced, similarly to that described above with reference to FIG. 15, as compared with the memories 103 described above with reference to FIG. 8, FIG. 10, FIG. 12, and FIG. 13. Further, it is possible to reduce the number of necessary ADCs.

The multi-input adaptive equalizer 205 has the configuration illustrated in FIG. 18 described above.

The multi-input adaptive equalizer 205 includes adaptive equalizer units 211 to 216 and adder 218 as illustrated in FIG. 18.

The adaptive equalizer units 211 to 215 adaptively controls the tap coefficients C0 to Cn in the direction in which the desired frequency characteristic is obtained using the equalization error ek.

On the other hand, the adaptive equalizer unit 216 automatically controls the tap coefficients C0 to Cn in the direction in which the frequency characteristic for the crosstalk cancellation is similarly obtained using the equalization error ek. Accordingly, the equalization signal y0 of the multi-input adaptive equalizer 206 obtained by adding the outputs y1 to y6 of the adaptive equalizer units 211 to 216 by the adder 218 is a signal in which the crosstalk is canceled.

The multi-Input adaptive equalizer 205 receives the equalization error (ek (ek)) calculated in a subtracter 253 on the basis of the target signals generated by a binary detector [a partial response maximum likelihood (PRML) decoder] 251 and a PR convolution unit [PR target signal generating unit]252, executes a noise component removal process or the like on the basis of the input thereof, and outputs the generated signal to the binary detector (PRML decoder) 251, a PLL 254, and the subtracter 253.

The binary detector (PRML decoder) 251 receives the equalization signal (y0) input from the multi-input adaptive equalizer 205, and generates a most probable reproduction signal in accordance with a maximum likelihood decoding scheme.

Specifically, for example, the Viterbi decoding scheme is applied. The Viterbi decoding implements maximum likelihood decoding of convolutional codes through repetition of simple processes such as addition, comparison, and selection and a traceback manipulation of ultimately decoding data. In the Viterbi decoding, every time coded data (received data sequence) corresponding to an information bit of one bit is obtained, an inter-signal distance (metric) of a path of each state at that time is calculated, and a most probable path is obtained.

With the decoding process, the reproduction signal is output.

Further, a clock signal is input from the PLL 254 that generates the clock signal on the basis of the output of the multi-input adaptive equalizer 205 to the binary detector (PRML decoder) 251, and the reproduction signal is generated and output under clock control.

The PLL 254 executes a clock signal generation process according to a servo signal included in the output of the multi-input adaptive equalizer 205.

The clock signal generated by the PLL 254 is also input to the memory controller 221 and also used for controlling a data input timing to the multi-input adaptive equalizer 205 of the adjacent track reproduction signal from the memory 204.

Further, the reproduction signal generated by the binary detector (PRML decoder) 251 is input to a PR target generating unit 212.

The PR convolution unit (PR target signal generating unit) 212 generates a target of a subsequent reproduction signal on the basis of the reproduction signal generated by the binary detector (PRML decoder) 251, and inputs it to the subtracter 253.

The subtracter calculates a difference between the target signal and the signal generated by the multi-input adaptive equalizer 205, and feeds the difference back to the multi-input adaptive equalizer 205 as the equalization error (ek) for the target.

The multi-input adaptive equalizer 205 inputs the equalization error (ek), executes the adaptive equalization process, and generates an output signal.

Figure 23:
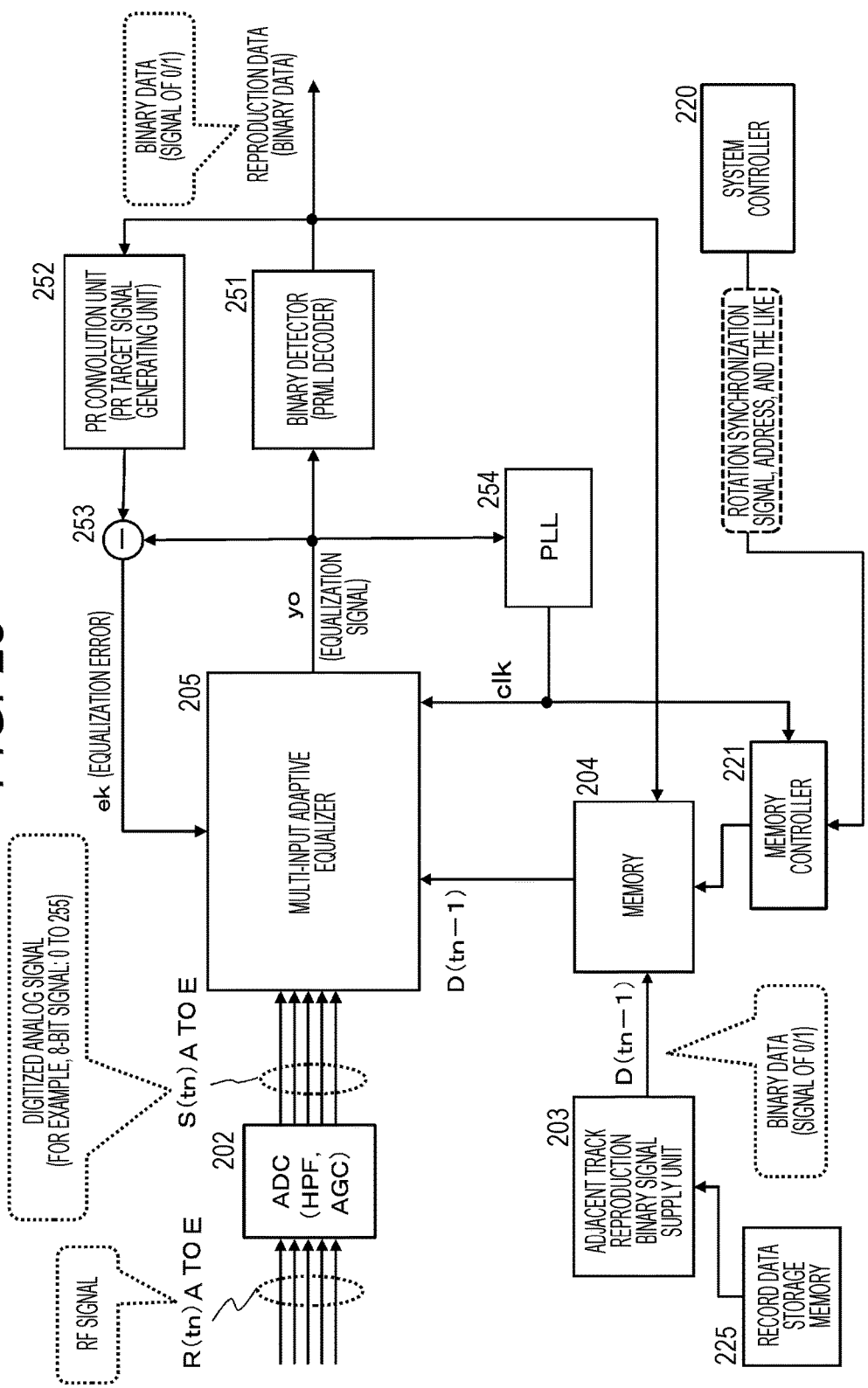
FIG. 23 is a diagram for describing a configuration and a process of an information processing device (a reproducing device) in a case where a signal (binary data) recorded in a disc is known and stored in a record data storage memory.

FIG. 23 is a diagram for describing a configuration and a process of an information processing device (reproducing device) in a case where the signal (binary data) previously recorded in the disc 10 is known and stored in a record data storage memory 225.

The adjacent track reproduction binary signal supply unit 203 fetches the reproduction binary signal of the adjacent track (Tn−1) of the current reproduction track (Tn) from the record data storage memory 225 and inputs the reproduction binary signal to the multi-input adaptive equalizer 205 via the memory 204.

The remaining components are similar to the components illustrated in FIG. 22.

Further, for example, there are cases in which data recording by a recording pickup is performed on the disc, and data recording associated with a so-called verification process of reproducing the recorded track and checking whether or not data recording is performed normally is performed.

With this configuration, the record data of the adjacent track of the current reproduction track is already known, and the process of applying the configuration illustrated in FIG. 23 is possible.

Figure 24:
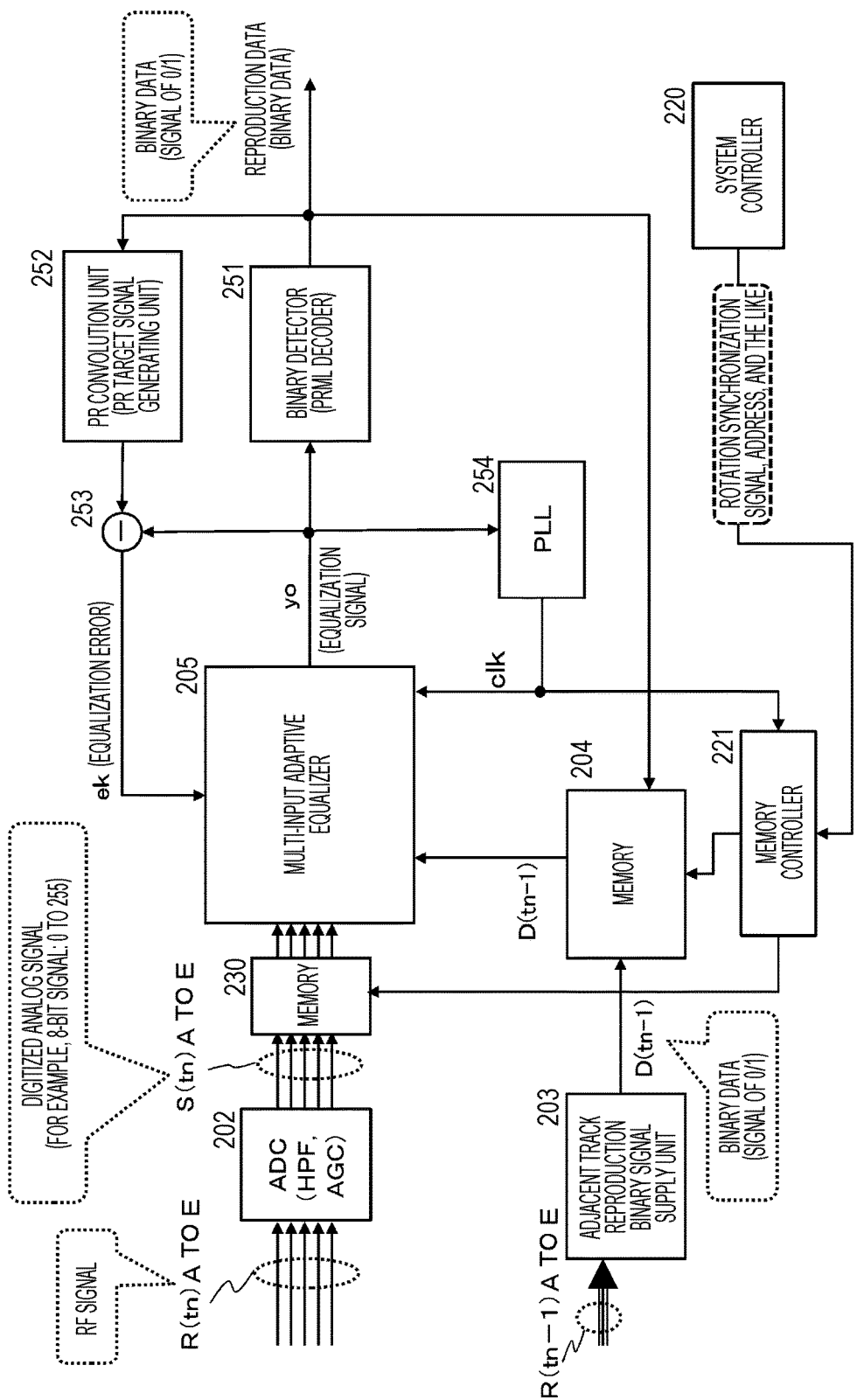
FIG. 24 is a diagram illustrating a configuration example of an information processing device a (reproducing device) to which a memory 230 for controlling a timing at which a read signal of a current reproduction track (Tn) is input to a multi-input, adaptive equalizer 205 is added.

FIG. 24 is a diagram illustrating a configuration example of an information processing device (reproducing device) to which a memory 230 for controlling an input timing of the read signal of the current reproduction track (Tn) to a multi-input adaptive equalizer 205 is added.

The remaining components are similar to the components illustrated in FIG. 22.

For example, the memory 230 corresponds to the memory 230 in the configuration described above with reference to FIG. 21.

The read signals [R(tn)A to R(tn)E] of the current reproduction track (Tn) are input to the ADC 202, converted into digital data [the digitized analog signals S(tn)A to S(tn)E (for example, 8 bits (0 to 255)), stored in a memory 230, and then input from the memory 230 to the multi-input adaptive equalizer 205.

Further, the memory 230 and the memory 204 are buffers for adjustment (delay processing) of an input timing to the multi-input adaptive equalizer 205 and can have a small memory capacity.

The signals of the respective tracks input from the memory 230 and the memory 204 to the multi-input adaptive equalizer 205 are preferably data at the position along the radial direction of the disc.

This synchronization input control is performed by a memory controller 221 on the basis of the rotation synchronization signal, the address, or the like provided from a system controller 220 to the memory controller 221.

Further, the reproduction process according to the circuit configuration illustrated in FIGS. 22 to 24 can be executed, for example, under control of a reproduction process program stored in the storage unit of the reproducing device (information processing device).

Further, in the above embodiment, the example in which the reproduction signal of the adjacent track input to the multi-input adaptive equalizer is the binary signal (binary data) has been described, but for example, a signal having a data amount of two or more values such as a ternary signal may be used. Further, the target signal such as the PR signal generated from the binary signal (binary data) may be used.

Further, the example in which for the reproduction signal from the current reproduction track, in the above embodiment, the binary detector 251 generates and outputs the binary signal (binary data) has been described, but a signal having a data amount of two or more values such as a ternary signal may be output.

Further, in the configurations illustrated in FIGS. 22 to 24, the output of the photo detector may be input to the matrix calculation circuit, and the matrix calculation circuit may output a plurality of signals corresponding to the amount of received light of the split region unit of the photo detector to be input to the ADC 202.

Alternatively, a matrix calculation circuit may be installed at a stage subsequent to the ADC 202, and the matrix calculation circuit may generate a plurality of signals according to the amount of received light of the split region unit of the photo detector to be input to the other input adaptive equalizer 205.

Further, the process described in the present embodiment can be applied to both a configuration in which data is recorded in the land (L) and the groove (G) of the disc 10, and data of both is read by one pickup and a configuration in which a plurality of pickups such as a pickup corresponding to the land (L) and a pickup corresponding to the groove (G) are used.

Further, the process described in the present embodiment can be also applied to a disc in which data is recorded only in one of the land (L) and the groove (G) and a high-density recording type discs in which there is no distinction between the land (L) and the groove (G), and the density between tracks is low.

[3-4. Specific Configuration Example of Adjacent Track Reproduction Binary Signal Supply Unit in Example in which Reproduction Signals of Two Adjacent Tracks are Applied and Configuration Example of Information Processing Device]

Next, a specific configuration example of the adjacent track reproduction binary signal supply unit 203 and a configuration example of an information processing device in an example in which the reproduction signals of the two tracks (Tn−1 and Tn+1) on both sides adjacent to the current reproduction track (Tn) are applied as illustrated in FIG. 15 described above.

As described above, the adjacent track reproduction binary signal supply unit 203 can have various configurations.

As one of the configurations, it is possible to apply a configuration of executing a conventional type reproduction signal generation process, for example, a reproduction signal generation configuration similar to that described with reference to FIG. 4 without change.

Alternatively, it is also possible to reuse the reproduction signal obtained by applying the configuration illustrated in FIG. 15 for the next reproduction track.

Alternatively, for example, in a case where the recording signal for the disc 10 is known, the recording signal may be used without change.

Figure 25:
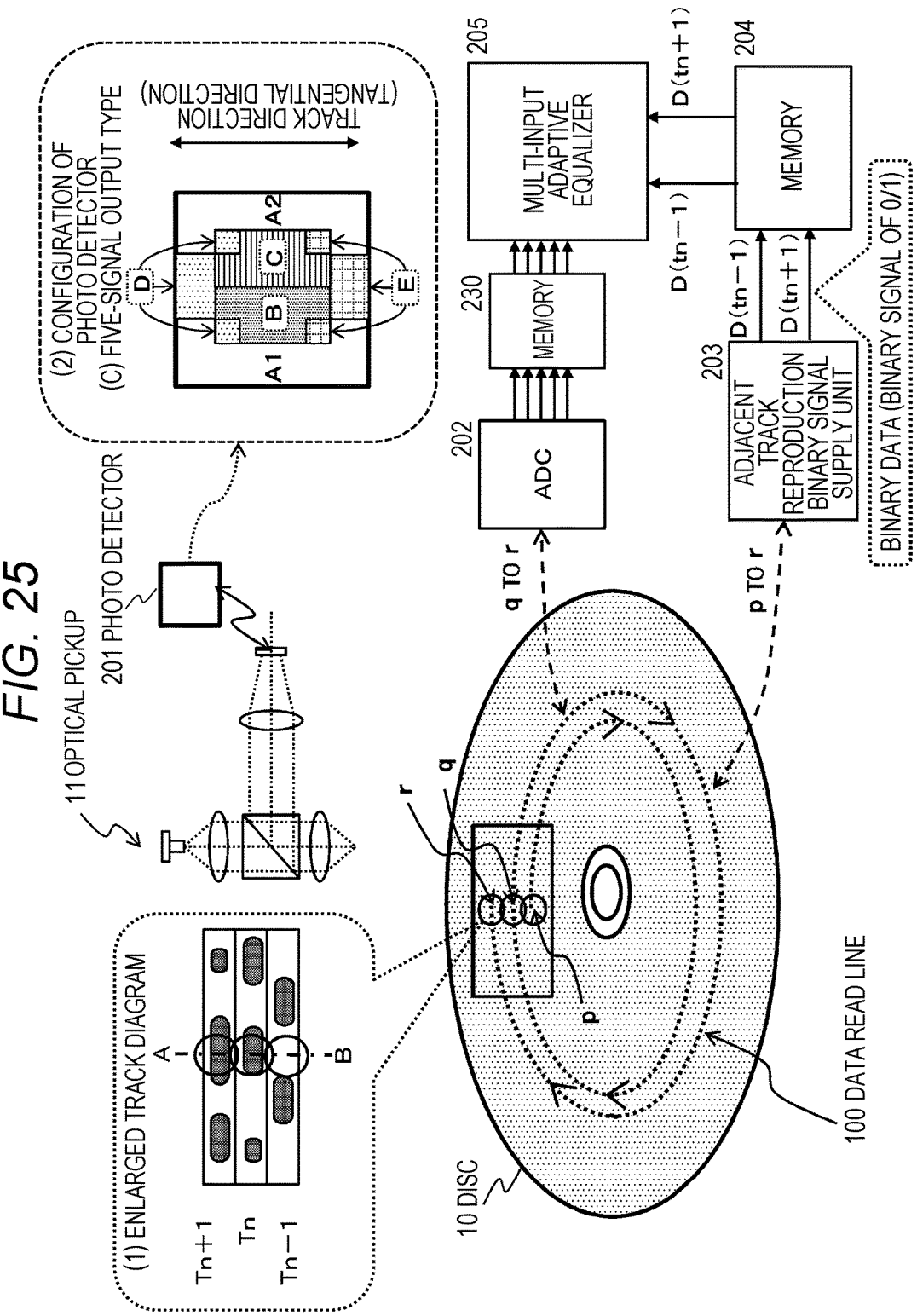
FIG. 25 is a diagram for describing a configuration of an adjacent track reproduction binary signal supply unit that generates reproduction binary signals (binary data) of two tracks adjacent to a current reproduction track (Tn).

FIG. 25 is a diagram illustrating one process example in a configuration in which the adjacent track reproduction binary signal supply unit 203 generates the reproduction binary signals (binary data) of the two tracks (Tn−1 and Tn+1) adjacent to the current reproduction track (Tn).

The example illustrated in FIG. 25 is a process example in which a reproducing device in which one optical pickup 11 sets one irradiation spot and performs reproduction is applied.

The data read by the optical pickup 11 along the data read line 100 of the disc 10 illustrated in FIG. 25 is supplied to the adjacent track reproduction binary signal supply unit 203, and a common reproduction signal (binary data (binary data) generation process is executed here.

In other words, the adjacent track reproduction binary signal supply unit 203 generates the reproduction signal of the preceding track region by applying, for example, the reproduction signal generation signal configuration described above with reference to FIG. 4 and stores the reproduction signal in the memory 204.

Further, in the present example, the adjacent track reproduction binary signal supply unit 203 generates the reproduction binary signals of the read data of almost two rounds of tracks between two of three irradiation spots p, q, and r in accordance with the data read line 100 of the disc 10 illustrated in FIG. 25 and stores the reproduction binary signals in the memory 204.

The irradiation spot of the current reproduction track (Tn) is indicated by q, the irradiation spot of the adjacent track (Tn−1) closest to the irradiation spot q is indicated by p, and the irradiation spot of the adjacent track (Tn+1) closest to the irradiation spot q is indicated by r.

The spot position of the reproduction target is q, and in order to use the reproduction signals of p and r in the reproduction signal generation process of the spot position q, it is necessary for the irradiation spot to be moved to the position of r.

The read data between q and r is converted into digital data through the ADC 202 and then stored in the memory 230.

The read signals [R(tn)A to R(tn)E] of the current reproduction track (Tn) are input to the ADC 202, converted into digital data [the digitized analog signals S(tn)A to S(tn)E (for example, 8 bits (0 to 255)), stored in a memory 230, and then input from the memory 230 to the multi-input adaptive equalizer 205.

The memory 230 and the memory 204 are buffers for adjustment (delay processing) of the input timing to the multi-input adaptive equalizer 205. The signals of the respective tracks input from the memory 230 and the memory 204 to the multi-input adaptive equalizer 205 are preferably data at the position along the radial direction of the disc.

This synchronization input control is performed by the memory controller on the basis of the rotation synchronization signal, the address, or the like provided from the system, controller (not illustrated) to the memory controller.

Figure 26:
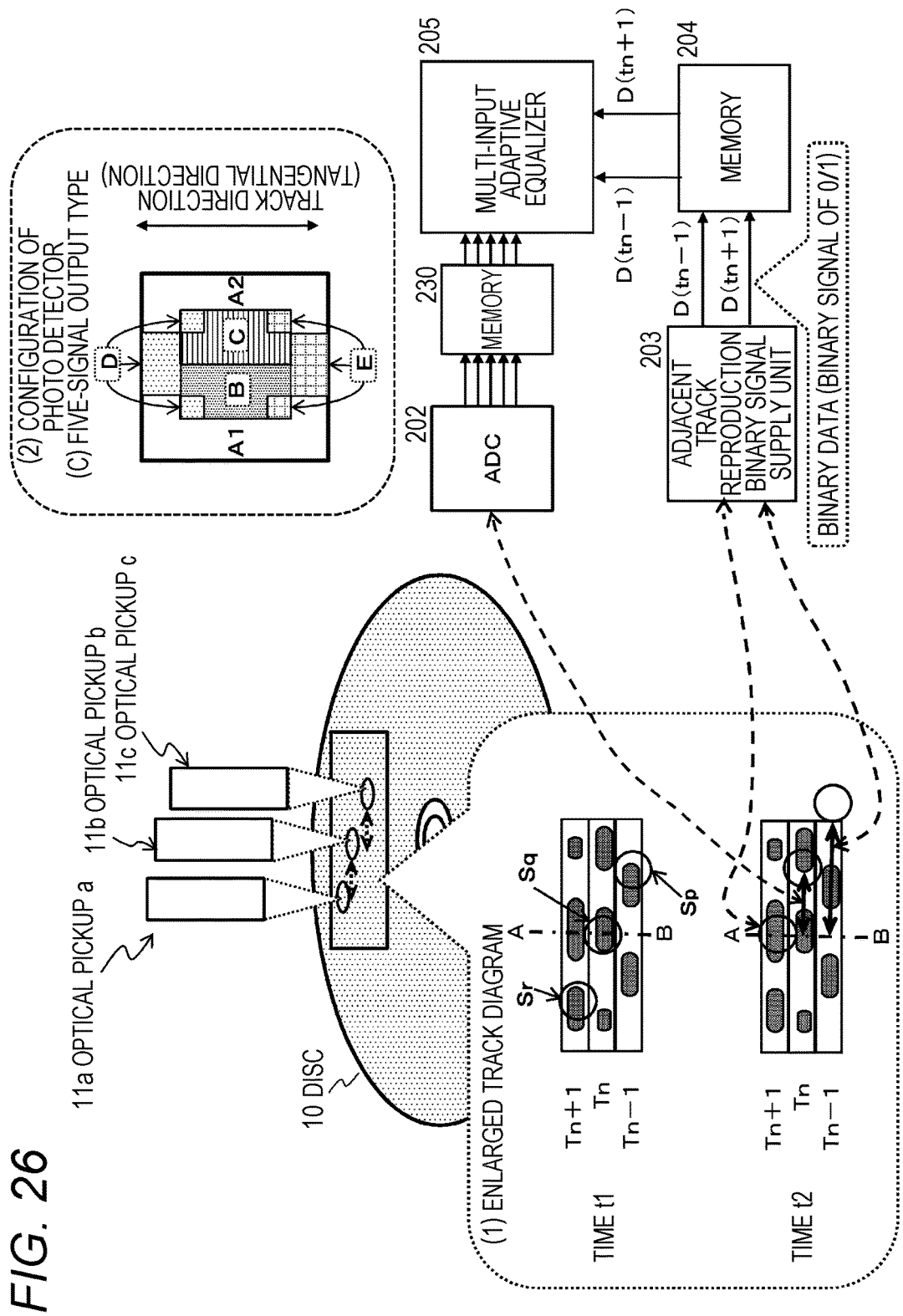
FIG. 26 is a diagram for describing a process example of a reproducing device that sets three irradiation spots and performs reproduction through three optical pickups 11a to 11c.

The example illustrated in FIG. 26 is a process example in which a reproducing device includes two optical pickups 11a, 11b, and 11c and sets three irradiation spots and performs reproduction is applied.

Further, three irradiation lights may be set using one optical pickup. The optical pickup has a configuration similar to the optical pickup described above with reference to FIG. 10.

In the example of the disc 10 illustrated in FIG. 26, the optical pickup a, 11a acquires the reproduction signal of the adjacent track (Tn+1), the optical pickup b, 11b acquires the reproduction signal of the current reproduction track (Tn), and the optical pickup c, 11c acquires the reproduction signal of the adjacent track (Tn−1).

In this configuration, at a time t1, an irradiation spot Sq of the reproduction track (Tn) is set at the reproduction position of the current reproduction track (Tn) (on the A-B line) as illustrated in an enlarged track diagram of FIG. 26(1).

Thereafter, at a time t2, an irradiation spot Sr of the adjacent track (Tn+1) is set on the AB line.

Further, an irradiation spot Sp of the other adjacent track (Tn−1) is set on the A-B line at a time t0 (not illustrated) before the time t1.

In order to perform the process of applying the reproduction signals of the tracks (Tn−1 and Tn+1) on both sides to the generation process of the reproduction signal of the reproduction track (Tn) at the reproduction position (Sq) at the time t1, the reproduction signal of the adjacent track (Tn−1) at the time t0 and the reproduction signal of the adjacent track (Tn+1) at the time t2 are required.

The memory 204 and the memory 230 are used to hold the data.

The adjacent track reproduction binary signal supply unit 203 generates reproduction binary signals of the times t0 to t2 of the adjacent track (Tn−1) and reproduction binary signals of track (Tn+1) of the time t2, and stores the generated reproduction binary signals in the memory 204.

Further, the read signal of the current reproduction track (Tn) is digitally converted by the ADC 202 and stored in the memory 230. The read signals of the current reproduction track (Tn) between the times t1 and t2 are also stored in the memory 230.

After the data are sorted, the three signals along the A-B line, that is, the digital data [the digitized analog signals S(tn)A to S(tn)E (for example, 8 bits (0 to 255))] of the current reproduction track (Tn) and the reproduction binary signals of the adjacent tracks (Tn−1 and Tn+1) on both sides are input to the multi-input adaptive equalizer 205.

The reproduction signals (binary data (binary data)) of the adjacent tracks (Tn−1 and Tn+1) generated by the reproduction binary signal supply unit 203 is stored in the memory 204.

On the other hand, the read signals [R(tn)A to R(tn)E] of the current reproduction track (Tn) are input to the ADC 202, converted into digital data [the digitized analog signals S(tn)A to S(tn)E (for example, 8 bits (0 to 255)), stored in a memory 230, and then input from the memory 230 to the multi-input adaptive equalizer 205.

The memory 230 and the memory 204 are buffers for adjustment (delay processing) of the input timing to the multi-input adaptive equalizer 205. The signals of the respective tracks input from the memory 230 and the memory 204 to the multi-input adaptive equalizer 205 are preferably data at the position along the radial direction of the disc.

This synchronization input control is performed by the memory controller on the basis of the rotation synchronization signal, the address, or the like provided from the system controller (not illustrated) to the memory controller.

Further, the memory 230 and the memory 204 are buffers for adjustment (delay processing) of an input timing to the multi-input adaptive equalizer 205 and can have a small memory capacity.

Further, FIG. 26 illustrates an example in which the pickup having the offset (deviation) in the track direction in irradiation spot light between adjacent tracks is used, but in a case where an optical pickup capable of irradiating a plurality of spot lights having no offset is used, a data storage process according to the offset distance is unnecessary.

A specific example will be described with reference to FIG. 27.

Figure 27:
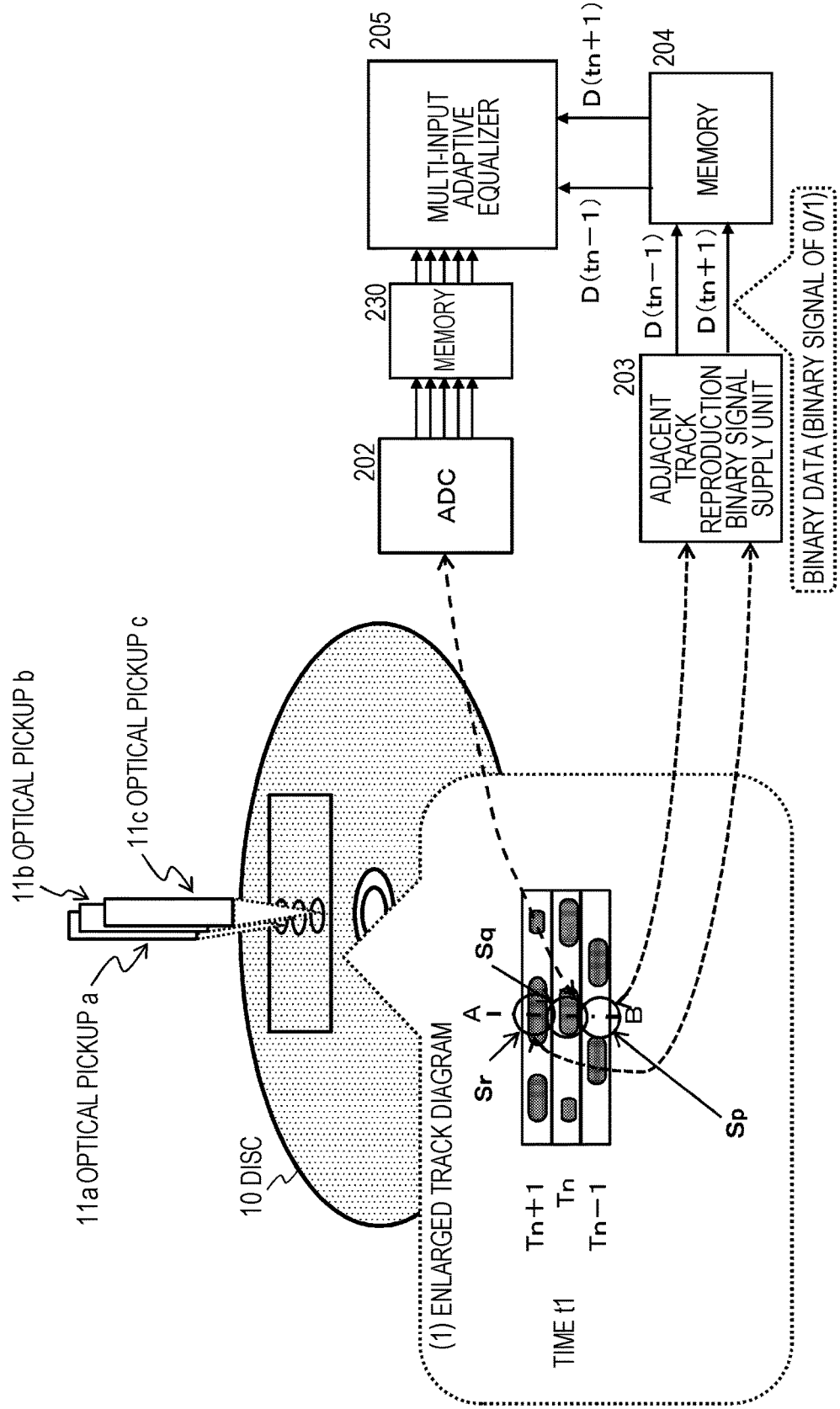
FIG. 27 is a diagram, for describing a process example of a reproducing device that sets three irradiation spots and performs reproduction through three optical pickups 11a to 11c.

The example illustrated in FIG. 27 is a process example in which a reproducing device includes three optical pickups 11a, 11b, and 11c and sets three irradiation spots and performs reproduction is applied, similarly to the example illustrated in FIG. 26.

However, in the example illustrated in FIG. 26, there is an offset (deviation) in the track direction in the irradiation spot light between the adjacent tracks, but in the example illustrated in FIG. 27, there is no offset.

Further, three irradiation lights may be set using one optical pickup. The optical pickup has a configuration similar to the optical pickup described above with reference to FIG. 10.

In the example illustrated in FIG. 27, the optical pickup a, 11a acquires the reproduction signal of the adjacent track (Tn+1), the optical pickup b, 11b acquires the reproduction signal of the current reproduction track (Tn), and the optical pickup c, 11c acquires the reproduction signal of the adjacent track (Tn−1).

In this configuration, the read data from the adjacent tracks (Tn−1 and Tn+1) of the current reproduction track (Tn) is supplied to the adjacent track reproduction binary signal supply unit 203, and the common reproduction signal (binary data) (binary data)) is generated and input to the multi-input adaptive equalizer 205 via the memory 204.

The reproduction signals (binary data (binary data)) of the adjacent tracks (Tn−1 and Tn+1) generated by the reproduction binary signal supply unit 203 are stored In the memory 204.

On the other hand, the read signals [R(tn)A to R(tn)E] of the current reproduction track (Tn) are input to the ADC 202, converted into digital data [the digitized analog signals S(tn)A to S(tn)E (for example, 8 bits (0 to 255)), stored in a memory 230, and then input from the memory 230 to the multi-input adaptive equalizer 205.

Further, the memory 230 and the memory 204 are buffers for adjustment (delay processing) of an input timing to the multi-input adaptive equalizer 205 and can have a small memory capacity.

Figure 28:
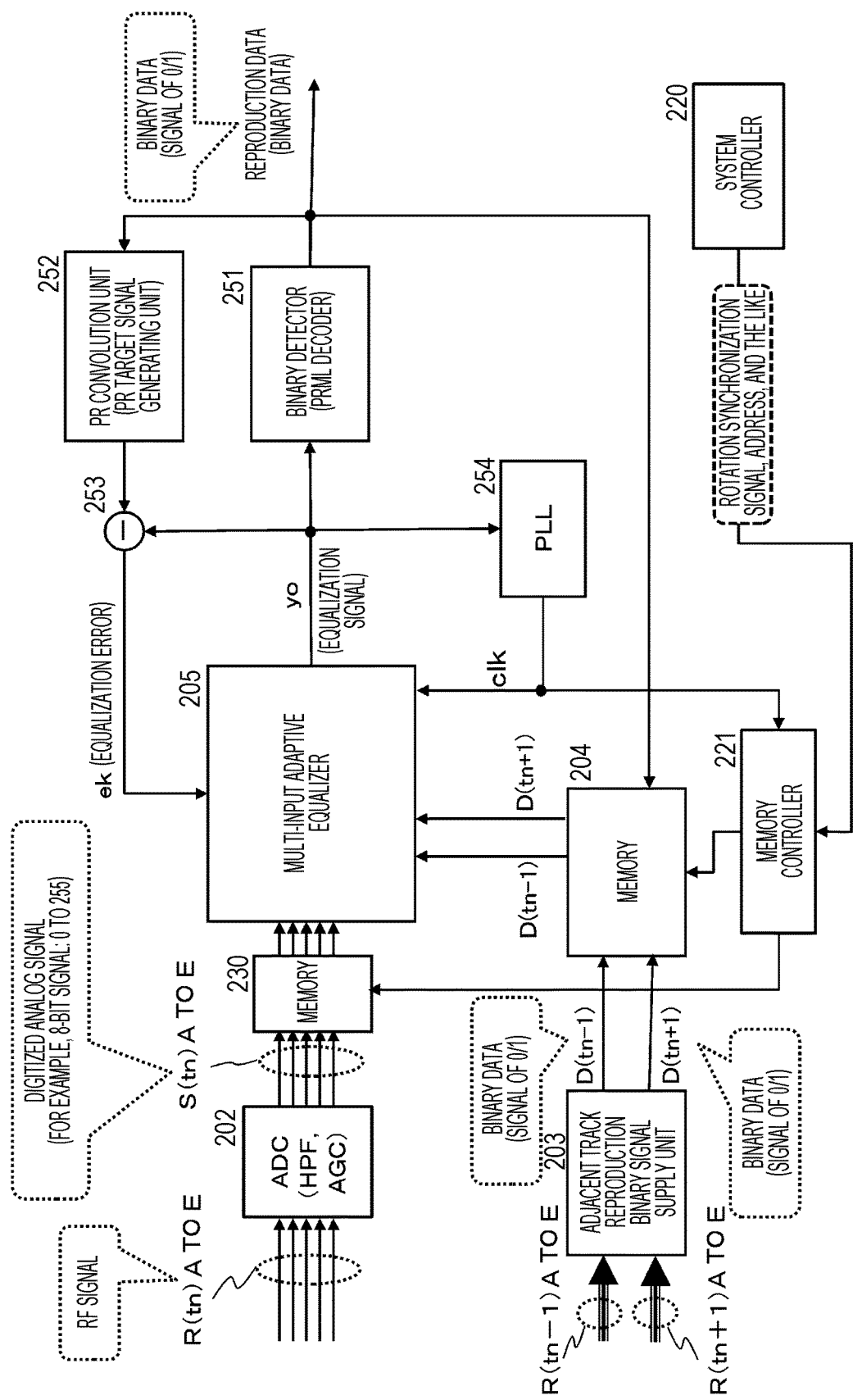
FIG. 28 is a diagram for describing a configuration example of an information processing device in an example in which reproduction signals of two adjacent tracks are applied.

FIG. 28 is a diagram for describing a configuration example of an information processing device in the example in which the reproduction signals of two adjacent tracks on both sides of the current reproduction track (Tn) is applied.

The ADC 202, the adjacent track reproduction binary signal supply unit. 203, the memory 204, and the multi-input adaptive equalizer 205, and the memory 230 illustrated in FIG. 28 are identical to the ADC 202, the adjacent track reproduction binary signal supply unit 203, the memory 204, and the multi-input adaptive equalizer 205, and the memory 230 illustrated in FIGS. 26 and 27.

A configuration illustrated in FIG. 28 is an example in which a pickup including a five-signal output type photo detector as an optical pickup is used.

Further, as described above, the process of the present disclosure can also be applied even in a configuration in which photo detectors having various signal output numbers such as the one-signal output type or the three-signal output type other than the five-signal output type are used.

The five read signals [R(tn)A to R(tn)E] from the current reproduction track. (Tn) are input from the optical pickup to the ADC 202 illustrated in FIG. 28. Further, the ADC 201 illustrated in FIG. 28 may include a signal processing function such as a high pass filter (HPF), an auto gain controller (AGC), or the like in addition to the ADC.

The ADC 202 performs the digital conversion of the five read signals and inputs the signals S(tn)A to S(tn)E to the multi-input adaptive equalizer 205 via the memory 230.

The input signals are digitized analog signals (for example, 8 bits (0 to 255)) obtained by digitizing the read signal (RF signal) from the disc 10.

On the other hand, for the two adjacent tracks (Tn−1 and Tn+1) adjacent to the current reproduction track (Tn), the last reproduction signal, that is, a binary signal or binary data having any one of 1 and 0 corresponding to a mark (pit) recorded in the disc is input from an adjacent track reproduction binary signal supply unit 203 to a multi-input adaptive equalizer 205 via a memory 204.

A signal D(tn−1) illustrated in FIG. 22 is the reproduction binary signal (binary data) of the track Tn−1, and D(tn+1) is the reproduction binary signal (binary data) of the track Tn+1.

The signals supplied by the adjacent track reproduction binary signal supply unit 203 is the last reproduction signals of the adjacent tracks (Tn−1 and Tn+1) of the current reproduction track (Tn), that is, a binary signal or binary-data having any one of 1 and 0 corresponding to a mark (pit) recorded in the disc.

This binary signal (binary data) is stored in the memory 204, and the binary data which is the reproduction binary signals of one adjacent track (Tn−1 and Tn+1) of the reading track (Tn) at the nearest positions is input the memory 204 to the multi-input adaptive equalizer 205.

On the other hand, the read signals [R(tn)A to R(tn)E] of the current reproduction track (Tn) are input to the ADC 202, converted into the digital data [the digitized analog signals S(tn)A to S(tn)E (for example, 8 bits (0 to 255)), stored in the memory 230, and then input to the multi-input adaptive equalizer 205 from the memory 230.

The reproduction signals (binary data) of the adjacent tracks which are input from the memory 204 and the memory 230 to the multi-input adaptive equalizer 205 are preferably data at the position along the radial direction of the disc.

This synchronization input control is performed by a memory controller 221 on the basis of the rotation synchronization signal, the address, or the like provided from a system controller 220 to the memory controller 221.

Further, the memory 230 and the memory 204 are buffers for adjustment (delay processing) of an input timing to the multi-input adaptive equalizer 205 and can have a small memory capacity.

As described above, in the present example, the memory capacity required for the memory 204 is significantly reduced as compared with the memories 103 described above with reference to FIGS. 8, 10, 12, and 13. Further, it is possible to reduce the number of necessary ADCs.

The multi-input adaptive equalizer 205 has the configuration illustrated in FIG. 16 described above.

The multi-input adaptive equalizer 205 includes adaptive equalizer units 211 to 217 and adder 218 as illustrated in FIG. 16.

The adaptive equalizer units 211 to 215 adaptively controls the tap coefficients C0 to Cn in the direction in which the desired frequency characteristic is obtained using the equalization error ek.

On the other hand, the adaptive equalizer units 216 and 217 automatically control the tap coefficients C0 to Cn in the direction in which the frequency characteristic for the crosstalk cancellation is similarly obtained using the equalization error ek. Accordingly, the equalization signal y0 of the multi-input adaptive equalizer 206 obtained by adding the outputs y1 to y6 of the adaptive equalizer units 211 to 217 by the adder 218 is a signal in which the crosstalk is canceled.

The multi-input adaptive equalizer 205 receives the equalization error (ek (ek)) calculated in a subtracter 253 on the basis of the pertial response maximum likelihood (PRML) decoder 251 and the PR convolution unit (PR target signal generating unit) 212, executes a noise component removal process or the like on the basis of the input thereof, and outputs the generated signal to the binary detector (PRML decoder) 251, a PLL 254, and the subtracter 253.

The binary detector (PRML decoder) 251 receives the equalization signal (y0) input from the multi-input adaptive equalizer 205, and generates a most probable reproduction signal in accordance with a maximum likelihood decoding scheme.

Specifically, for example, the Viterbi decoding scheme is applied. The Viterbi decoding implements maximum likelihood decoding of convolutional codes through repetition of simple processes such as addition, comparison, and selection and a traceback manipulation of ultimately decoding data. In the Viterbi decoding, every time coded data (received data sequence) corresponding to an information bit of one bit is obtained, an inter-signal distance (metric) of a path of each state at that time is calculated, and a most probable path is obtained.

With the decoding process, the reproduction signal is output.

Further, a clock signal is input from the PLL 254 that generates the clock signal on the basis of the output of the multi-input adaptive equalizer 205 to the binary detector (PRML decoder) 251, and the reproduction signal is generated and output under clock control.

The PLL 254 executes a clock signal generation process according to a servo signal included in the output of the multi-input adaptive equalizer 205.

The clock signal generated by the PLL 254 is also input to the memory controller 221 and also used for controlling a data input timing to the multi-input adaptive equalizer 205 of the adjacent track reproduction signal from the memory 204.

Further, the reproduction signal generated by the binary detector (PRML decoder) 251 is input to a PR target generating unit 212.

The PR convolution unit (PR target signal generating unit) 212 generates a target of a subsequent reproduction signal on the basis of the reproduction signal generated by the binary detector (PRML decoder) 251, and inputs it to the subtracter 253.

The subtracter calculates a difference between the target signal and the signal generated by the multi-input adaptive equalizer 205, and feeds the difference back to the multi-input adaptive equalizer 205 as the equalization error (ek) for the target.

The multi-input adaptive equalizer 205 inputs the equalization error (ek), executes the adaptive equalization process, and generates an output signal.

Figure 29:
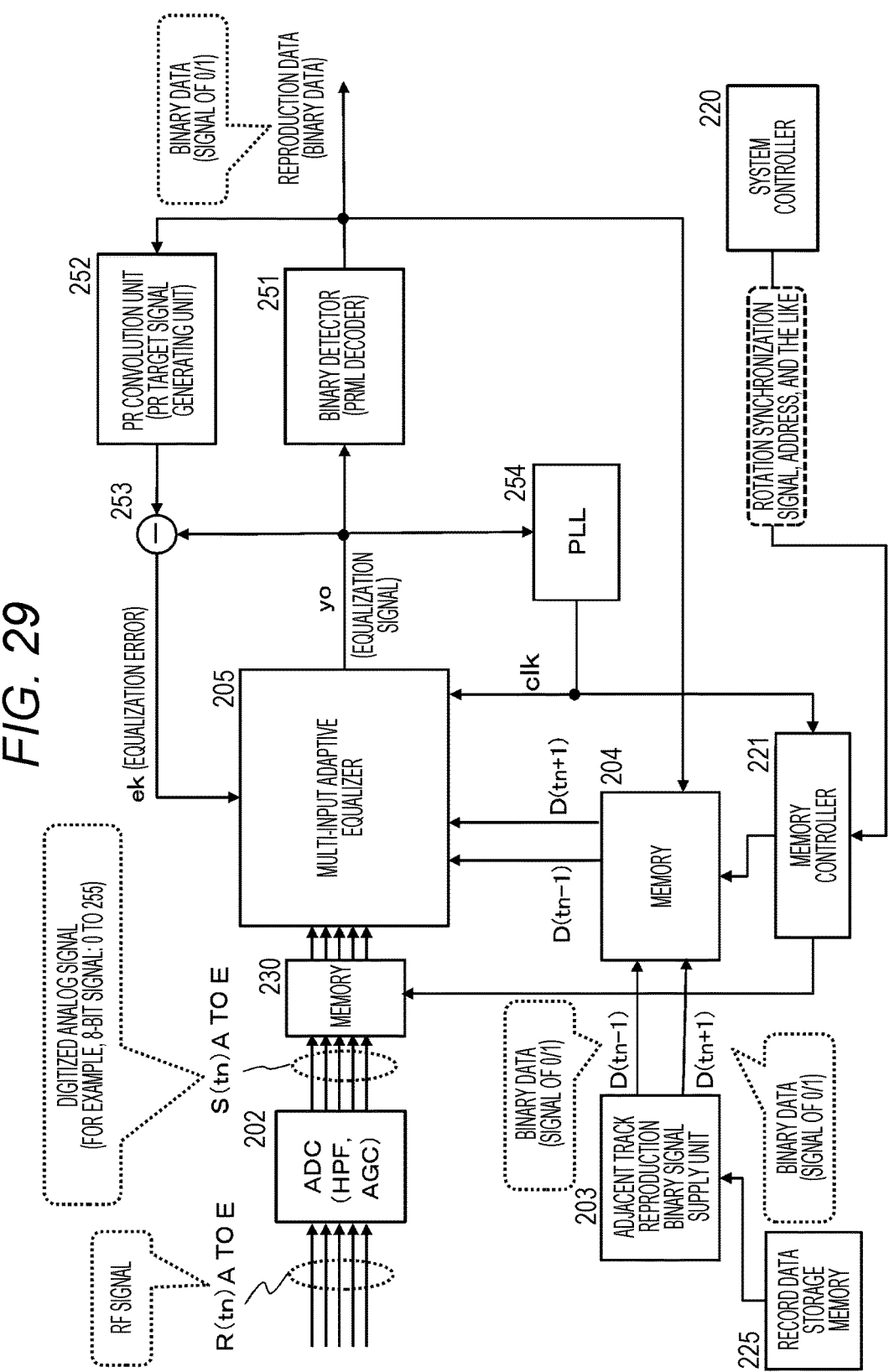
FIG. 29 is a diagram for describing a configuration and a process of an information processing device (a reproducing device) in a case where a signal (binary data) recorded in a disc is known and stored in a record data storage memory.

FIG. 29 is a diagram for describing a configuration example of an information processing device (reproducing device) in a case where the signal (binary data) previously recorded in the disc 10 is known and stored in a record data storage memory 225.

The adjacent track reproduction binary signal supply unit 203 fetches the reproduction binary signals of the adjacent tracks (Tn−1 and Tn+1) of the current reproduction track (Tn) from the record data storage memory 225 and inputs the reproduction binary signal to the multi-input adaptive equalizer 205 via the memory 204.

The remaining components are similar to the components illustrated in FIG. 28.

Further, for example, the configuration illustrated in FIG. 29 can be applied to a configuration in which data recording associated with the verification process of executing the recording process and the reproduction process in parallel is executed.

Further, the reproduction process according to the circuit configuration illustrated in FIGS. 28 and 29 can be executed, for example, under control of a reproduction process program stored in the storage unit of the reproducing device (information processing device).

Further, in the above embodiment, the example in which the reproduction signal of the adjacent track input to the multi-input adaptive equalizer is the binary signal (binary data) has been described, but for example, a signal having a data amount of two or more values such as a ternary signal may be used. Further, the target signal such as the PR signal generated from the binary signal (binary data) may be used.

Further, the example in which for the reproduction signal from the current reproduction track, in the above embodiment, the binary detector 251 generates and outputs the binary signal (binary data) has been described, but a signal having a data amount of two or more values such as a ternary signal may be output.

Further, in the configurations illustrated in FIGS. 28 to 29, the output of the photo detector may be input to the matrix calculation circuit, and the matrix calculation circuit may output a plurality of signals corresponding to the amount of received light of the split region unit of the photo detector to be input to the ADC 202.

Alternatively, a matrix calculation circuit may be installed at a stage subsequent to the ADC 202, and the matrix calculation circuit may generate a plurality of signals according to the amount of received light of the split region unit of the photo detector to be input to the other input adaptive equalizer 205.

Further, the process described in the present embodiment can be applied to both a configuration in which data is recorded in the land (L) and the groove (G) of the disc 10, and data of both is read by one pickup and a configuration in which a plurality of pickups such as a pickup corresponding to the land (L) and a pickup corresponding to the groove (G) are used.

Further, the process described in the present embodiment can be also applied to a disc in which data is recorded only in one of the land (L) and the groove (G) and a high-density recording type discs in which there is no distinction between the land (L) and the groove (G), and the density between tracks is low.

[3-5. Configuration Example in which Parallel Reproduction Process of Plurality of Tracks is Executed]

Next, a configuration of an information processing device that applies the reproduction signal of the adjacent track to the crosstalk cancellation process at the time of the reproduction process of the current reproduction track, and implements simultaneous reproduction of a plurality of tracks will be described.

Figure 30:
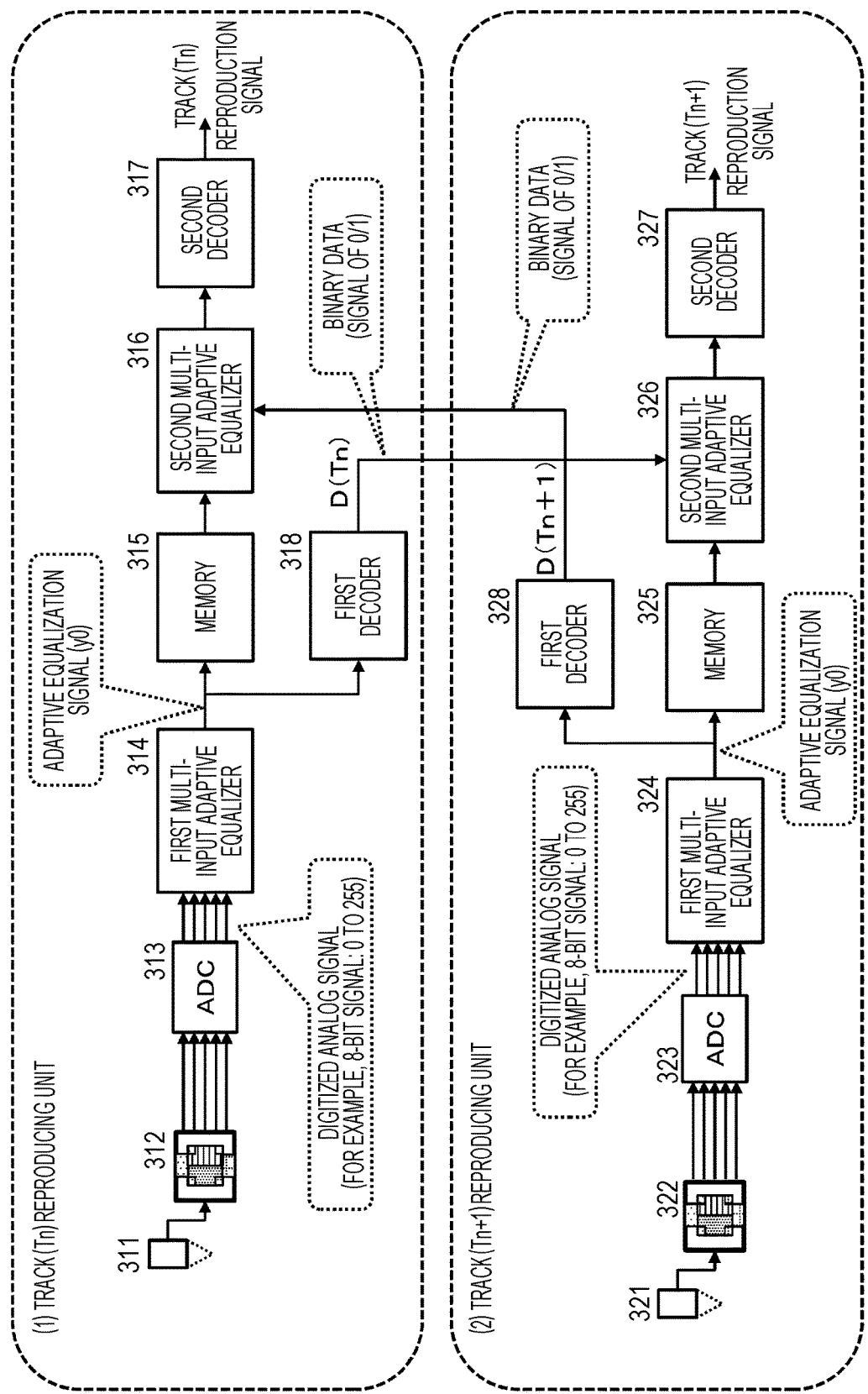
FIG. 30 is a diagram for describing a configuration of an information processing device that applies a reproduction signal of an adjacent track to a crosstalk cancellation processing and implements simultaneous reproduction of a plurality of tracks.

FIG. 30 is a diagram illustrating a reproduction process configuration of the information processing device according to the present embodiment.

FIG. 30 illustrates the following two reproduction process configurations:

(1) a track (Tn) reproducing unit; and
(2) a track (Tn+1) reproducing unit

The two reproducing units perform the data reproducing processes from the two adjacent tracks of the disc in parallel.

Data reading of the track (Tn) is executed by an optical pickup 311.

Data reading of the track (Tn+1) is executed by an optical pickup 321.

The data readings are executed in parallel.

Irradiation lights of the optical pickups 311 and 312 are irradiated to positions along the half radial direction of the disc.

Further, each of the optical pickups 311 and 312 is assumed to be equipped with the five-signal output type photo detector described above with reference to FIG. 3.

Further, in the present embodiment, the photo detector is not limited to the five-signal output type, and other photo detectors having various configurations such as the one-signal output type and the three-signal output type can be applied.

A configuration and a process of (1) the track (Tn) reproducing unit will be described. Reflected light of the disc for the optical pickup 311 is received by a photo detector 312, and the photo detector 312 outputs five signals corresponding to the amount of received light of the split region unit to an ADC 313.

As described above with reference to FIG. 3, the signals A to E are the following electric signals corresponding to the amount of received light of the regions illustrated in FIG. 3.

the signal A=A1+A2
the signal B=B
the signal C=C
the signal D=D1+D2+D3
the signal E=E1+E2+E3

Further, as described above, a signal including addition signals of a plurality of regions may be configured to generate a signal by multiplying by a weight coefficient of a preset region unit.

For example, an output signal may be generated by multiplying the following weight coefficients p and q:

$$A = p*A1 + q*A2$$

The ADC 313 digitally converts the five signals to generate the five digitized analog signals (for example, 8 bits: 0 to 255) and inputs the five digitized analog signals to a first multi-input adaptive equalizer 314.

The first multi-input adaptive equalizer 314 is a 5-input 1-output type equalizer described above with reference to FIG. 5.

As described above with reference to FIG. 5, the adaptive equalizer units 71 to 75 illustrated in FIG. 5 performs optimization of the error and the phase distortion of the input signal frequency components of the signals A to E, that is, the adaptive PR equalization.

In other words, the tap coefficients C0 to Cn are adjusted in accordance with the calculation result of $-1 \times ek \times x$ in the calculators 82-0 to 82-n.

This means that the tap coefficients C0 to Cn are adjusted in the direction in which the equalization error is eliminated.

As described above, the adaptive equalizer units 71 to 75 adaptively control the tap coefficients C0 to Cn in a direction in which a desired frequency characteristic is obtained using the equalization error ek.

The equalization signal y0 of the first multi-input adaptive equalizer 313 obtained by adding the outputs y1, y2, y3, y4, and y5 of the adaptive equalizer units 71 to 75 by the adder 76 is the signal in which the crosstalk and the like is reduced.

This adaptive equalization signal y0 is input to a memory 315 and a first decoder 318.

Since the adaptive equalization signal is the crosstalk reduction process signal using only the read signal from track (Tn), and does not undergo the crosstalk reduction using the reproduction signal of the adjacent track (Tn−1), the crosstalk reduction is unlikely to be sufficiently performed.

The output of the first multi-input adaptive equalizer 314 illustrated in FIG. 30 is stored in the memory 315 and further output to the first decoder 318.

The first decoder 318 is, for example, a Viterbi decoder, and generates the binary data D(Tn) by performing the maximum likelihood decoding process on the PR equalized equalization signal y0.

The binary data D(Tn) generated by the first decoder 318 is input to a second multi-input adaptive equalizer 326 of (2) the track (Tn+1) reproducing unit illustrated in FIG. 30.

In (2) the track (Tn+1) reproducing unit, the optical pickup 321 sequentially inputs the read signal of the track (Tn+1) to a photo detector 322, an ADC 323, a first multi-input adaptive equalizer 324, and a first decoder 328, and generates the reproduction binary data D(Tn+1) of the track (Tn+1).

The binary data D(Tn+1) generated by the first decoder 328 is input to a second multi-input adaptive equalizer 316 of (1) the track (Tn) reproducing unit illustrated in FIG. 30.

Figure 31:
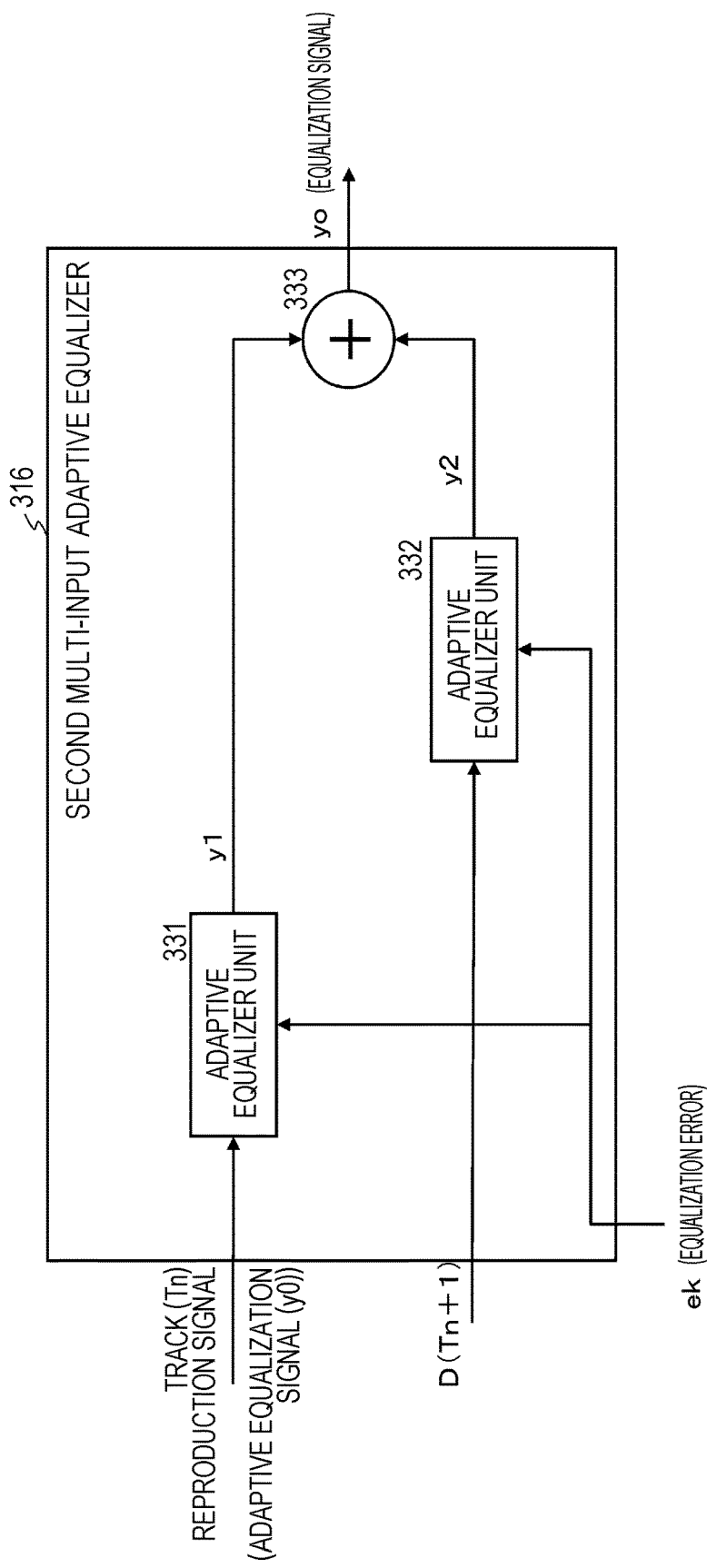
FIG. 31 is a diagram illustrating a configuration of a second multi-input adaptive equalizer 316.

The second multi-input adaptive equalizer 316 of (1) the track (Tn) reproducing unit illustrated in the drawing has a configuration illustrated in FIG. 31.

As illustrated in FIG. 31, the second multi-input adaptive equalizer 316 includes adaptive equalizer units 331 and 332 and an adder 333.

The adaptive equalizer unit 331 receives the adaptive equalization signal y0 generated on the basis of the reproduction signal (digitized analog signal) of the current reproduction track (Tn).

This signal is the adaptive equalization signal (y0) generated in the first multi-input adaptive equalizer 314. The adaptive equalizer unit 332 receives D(Tn+1) which is the binary reproduction signal (binary data) of the adjacent track (Tn+1).

The adaptive equalizer unit 331 adaptively controls the tap coefficients C0 to Cn in the direction in which the desired frequency characteristic is obtained using the equalization error ek.

On the other hand, the adaptive equalizer unit 332 automatically controls the tap coefficients C0 to Cn in the direction in which the frequency characteristic for the crosstalk cancellation is obtained similarly using the equalization error ek. Accordingly, the equalization signal y0 of the second multi-input adaptive equalizer 316 obtained by adding the outputs y1 and y2 of the adaptive equalizer units 331 and 332 by the adder 333 is the signal in which the crosstalk is canceled using the reproduction signal of the adjacent track.

The adaptive equalization signal y0 generated by the second multi-input adaptive equalizer 316 is input to a second decoder 317.

The second decoder 317 is, for example, a Viterbi decoder, and generates a binary reproduction signal of the last track (Tn) by performing the maximum likelihood decoding process on the PR equalized equalization signal y0.

The last binary reproduction signal is high-quality reproduction data which is generated by executing the adaptive equalization process based on the five signals obtained as the read signal of the track (Tn) of the reproduction target and further the adaptive equalization process when the reproduction signal of the adjacent track (Tn+1) is applied, that is, high-quality reproduction data from which the crosstalk is sufficiently excluded.

Figure 32:
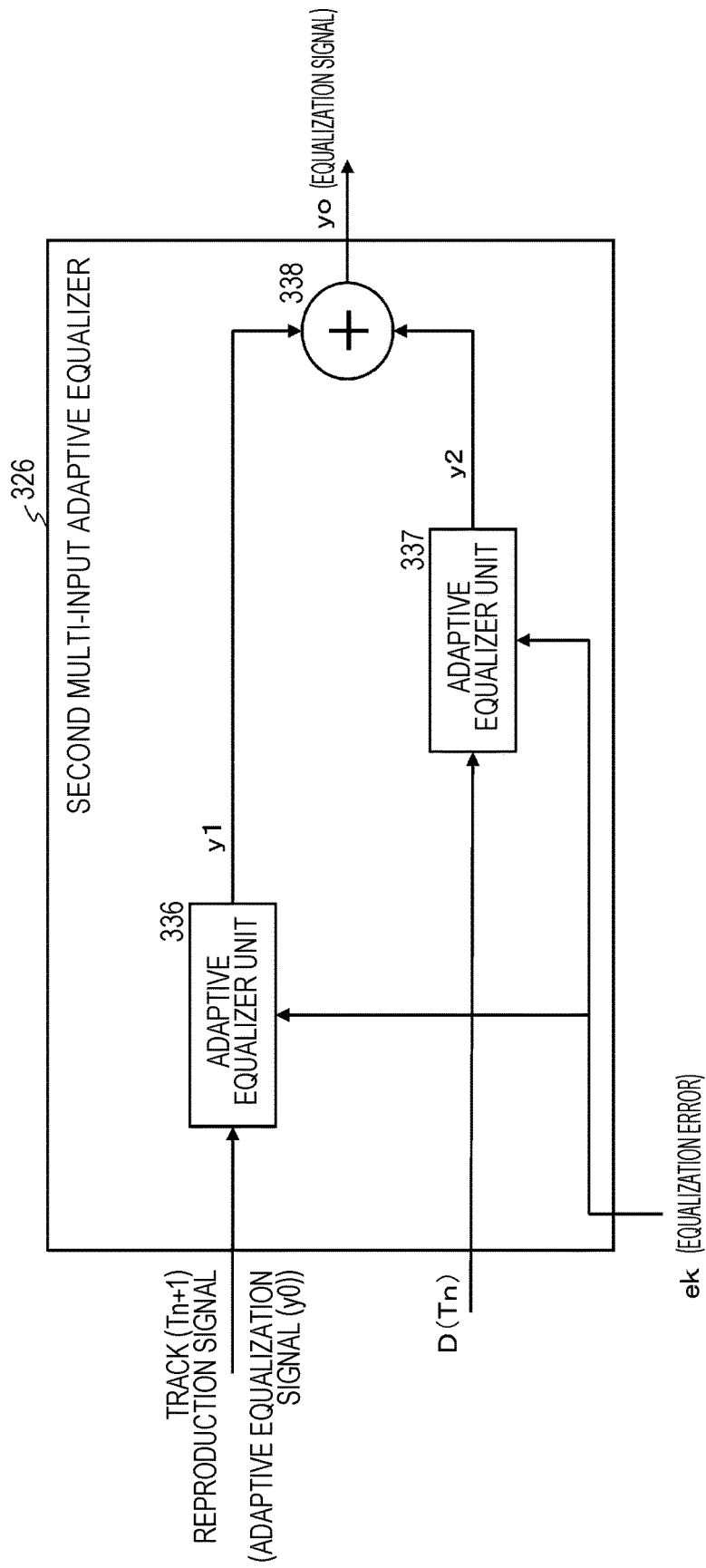
FIG. 32 is a diagram illustrating a configuration of a second multi-input adaptive equalizer 326.

The second multi-input adaptive equalizer 326 in (2) the track (Tn+1) reproducing unit has the configuration illustrated in FIG. 32.

The adaptive equalizer unit 336 of the second multi-input adaptive equalizer 326 receives the adaptive equalization signal y0 generated on the basis of the reproduction signal (digitized analog signal) of the current reproduction track (Tn+1).

This signal is the adaptive equalization signal (y0) generated in the first multi-input adaptive equalizer 324.

The adaptive equalizer unit 337 receives D(Tn) which is the binary reproduction signal (binary data) of the adjacent track (Tn).

The adaptive equalizer unit 336 adaptively controls the tap coefficients C0 to Cn in the direction in which the desired frequency characteristic is obtained using the equalization error ek.

On the other hand, the adaptive equalizer unit 337 automatically controls the tap coefficients C0 to Cn in the direction in which the frequency characteristic for the crosstalk cancellation is obtained similarly using the equalization error ek. Accordingly, the equalization signal y0 of the second multi-input adaptive equalizer 326 obtained by adding the outputs y1 and y2 of the adaptive equalizer units 336 and 337 by an adder 338 is the signal in which the crosstalk is canceled using the reproduction signal of the adjacent track.

The adaptive equalization signal y0 generated by the second multi-input adaptive equalizer 326 is input to a second decoder 327.

The second decoder 327 is, for example, a Viterbi decoder, and generates a binary reproduction signal of the last track (Tn+1) by performing the maximum likelihood decoding process on the PR equalized equalization signal y0.

The last binary reproduction signal is high-quality reproduction data which is generated by executing the adaptive equalization process based on the five signals obtained as the read signal of the track (Tn+1) of the reproduction target and further the adaptive equalization process when the reproduction signal of the adjacent track (Tn) is applied, that is, high-quality reproduction data from which the crosstalk is sufficiently excluded.

By applying the configuration illustrated in FIG. 30, it is possible to reproduce the high-quality crosstalk-cancelled reproduction signals from the two tracks in parallel.

Further, the example illustrated in FIG. 30 is an example, and other configurations can be employed. For example, the second multi-input adaptive equalizers 316 and 326 in the configuration illustrated in FIG. 30 receive the adaptive equalization signal y0 generated on the basis of the reproduction signal (digitized analog signal) of the current reproduction track and the binary reproduction signal (binary data) of the adjacent track, and executes the adaptive equalization process.

Figure 33:
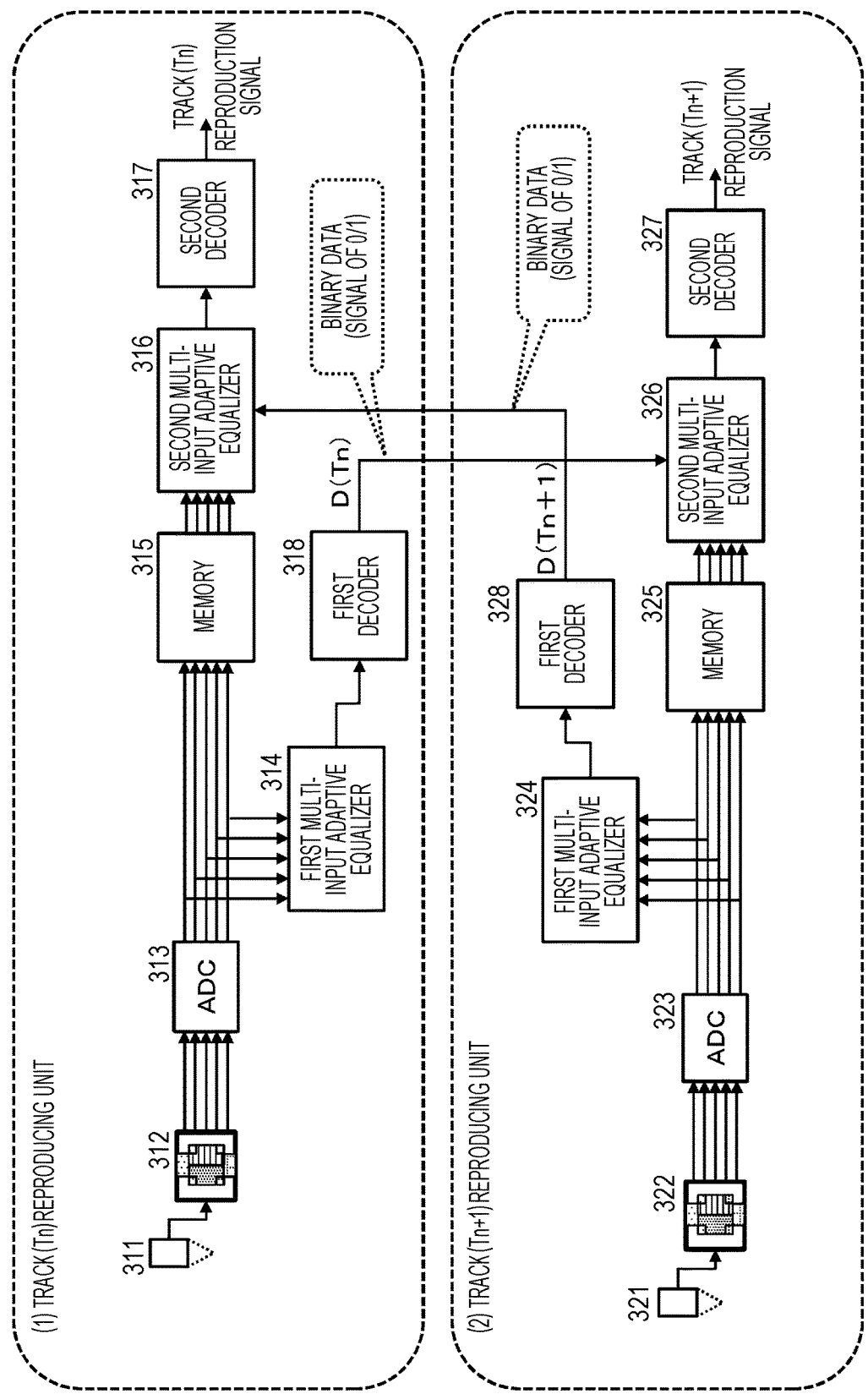
FIG. 33 is a diagram for describing a configuration of an information processing device that applies a reproduction signal of an adjacent track to a crosstalk cancellation processing and implements simultaneous reproduction of a plurality of tracks.

The configuration may be modified such that the reproduction signals before the adaptive equalization of the reproduction signal (digitized analog signal) of the current reproduction track are stored in the memories 315 and 325, and the memory storage signals are input to the second multi-input adaptive equalizers 316 and 326, and the binary reproduction signal (binary data) of the adjacent track is further input, and the adaptive equalization process is executed, as illustrated in FIG. 33.

[4. Quality Evaluation of Reproduction Signal Using Binary Reproduction Signal (Binary Data) of Adjacent Track]

As described above, the information processing device of the present disclosure implements the acquisition of the high-quality reproduction signal from which the crosstalk signal is effectively removed by obtaining the reproduction signal using the binary reproduction signal (binary data) of the adjacent track of the current reproduction track.

The quality of the reproduction signal generated using the binary reproduction signal (binary data) of the adjacent track will be described below with reference to an evaluation test result of the reproduction signal.

Figure 34:
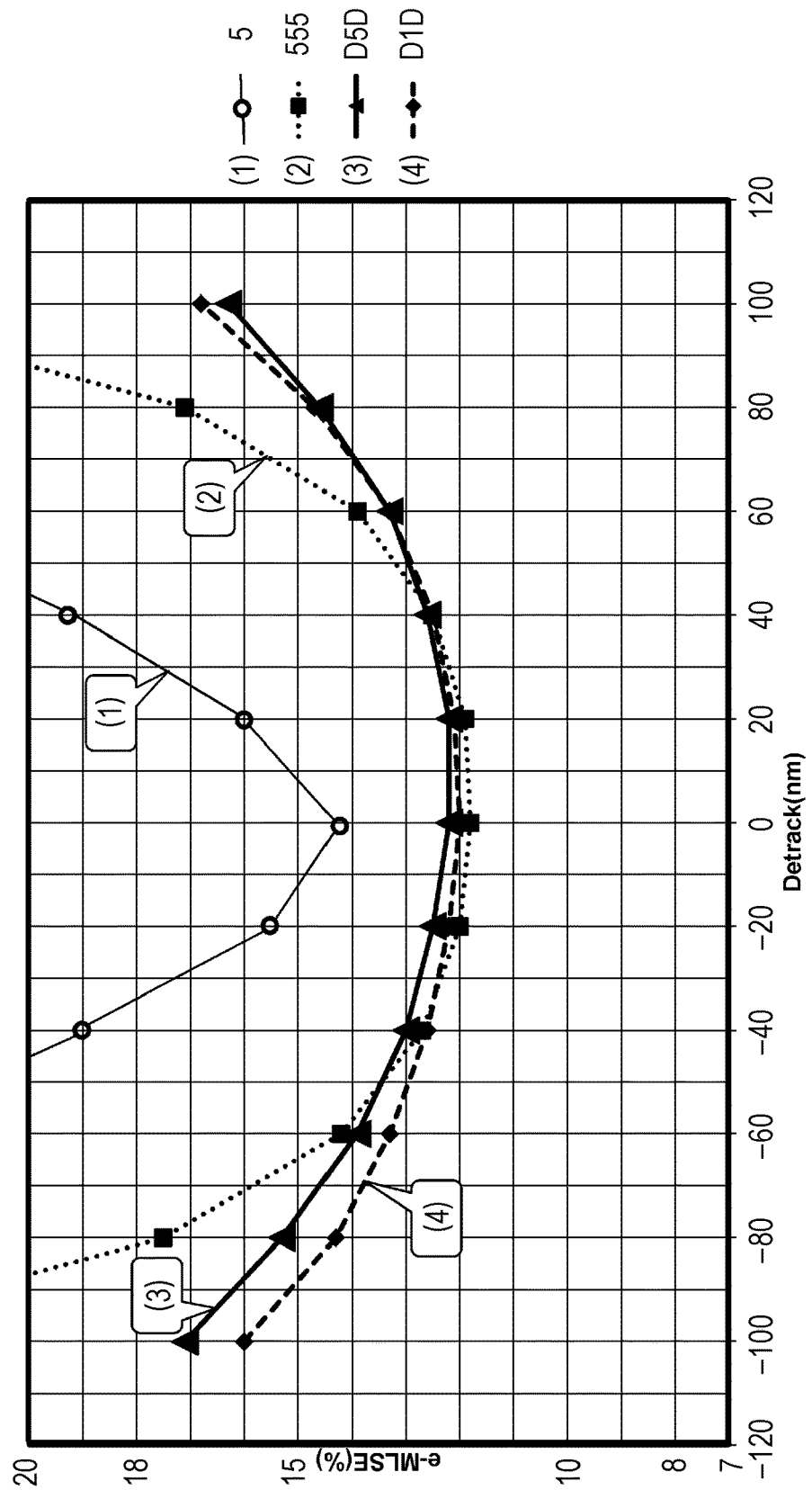
FIG. 34 is a diagram for describing quality evaluation data of reproduction data.

FIG. 34 is a graph illustrating a quality evaluation results of the reproduction signals obtained through a plurality of different reproduction processes.

Specifically, it is a graph illustrating a correspondence relation between a position deviation amount (Detrack) of the center of irradiation spot light from the center of the current reproduction track and a reproduction signal evaluation value (e-MLSE).

Further, FIG. 34 is a diagram illustrating an example of a reproduction data quality evaluation result by simulation in a case where data recording and data reproduction are performed in accordance with the following condition setting.

The condition setting is as follows:
laser wavelength of optical pickup: λ=405 nm
numerical aperture of optical pickup: NA=0.85 PR (235777532)
track pitch: 0.225 μm (interval between land and groove)

Further, a distance between the land and the groove is 0.45 μm. Further, the recording density corresponds to 0.0339 μm/channel bit. This corresponds to 78 GB per layer in the case of the same coding rate as the Blu-ray (a registered trademark) disc (BD).

Further, PR (235777532) is a parameter to be applied in the target signal Zk generation process by the convolution process in the PR convolution unit (PR target signal generating unit) 212. PR (235777532) means that the value P of each channel clock is (2, 3, 5, 7, 7, 7, 5, 3, 2), and the constraint length is 9.

Under the above-described condition, the reproduction signals are acquired by applying a plurality of different optical pickups, and a correspondence between the position shift (Detrack) from the current reproduction track and the reproduction signal evaluation value (e-maximum likelihood sequence error (MLSE)) is measured.

A horizontal axis indicates an amount of deviation [Detrack (nm)] of the irradiation spot set on the disc by the optical pickup from the center of the reproduction track.

A vertical axis indicates an [e-MLSE evaluation value] which is a quality evaluation value of the reproduction signal.

Further, the e-MLSE is an evaluation index value of the reproduction signal.

"i-MLSE" is known as a common evaluation value of the reproduction signal. The MLSE is obtained by calculating an index corresponding to an error probability using a difference of an actual signal level with respect to a target level set using Viterbi detected data.

In the i-MLSE, a calculation is performed by weighting a data pattern that is likely to cause errors.

However, in a case where the recording density is increased, the data pattern which is likely cause errors is different, and errors occur in the i-MLSE which is a signal index value of the related art. In this regard, the "e-MLSE" is created as a signal evaluation value to which a new data pattern is added to improve the accuracy of the signal index value at a higher linear density.

Further, the quality evaluation process of the reproduction data using the error pattern is described in International Publication No. WO 2013/183385 which is a prior patent application by the same applicant as the present applicant. The "e-MLSE" is a signal evaluation value according to this description.

The e-MLSE indicated on the vertical axis of the graph illustrated in FIG. 34 indicates a probability of error included in the reproduction signal. A value of the e-MLSE indicates that as the value decreases, a more satisfactory reproduction signal having a lower error rate is obtained.

For example, in the graph illustrated in FIG. 34, it is a satisfactory reproduction signal in a case where the e-MLSE is 15% or less.

FIG. 34 is a graph illustrating a correspondence relation between the deviation amount between the center position of the irradiation spot light by the optical pickup and the center position of the current reproduction track indicated by the horizontal axis and the reproduction signal evaluation value (e-MLSE) indicated by the vertical axis.

Evaluation results (1) to (4) of four reproduction signals illustrated in FIG. 34 are the following four pieces of reproduction signal evaluation data as illustrated in FIG. 35.

(1) An evaluation result, of the reproduction signal generated by applying the read signal (A to E) using the five-signal output type detector to the current reproduction track (Tn) (the reference circuit example=FIG. 4)

(2) An evaluation result of the reproduction signal obtained by executing the crosstalk cancellation processing by applying the read signals (A to E) obtained by applying the five-signal output type detector to the current reproduction track (Tn) and the reproduction signals (five signals of A to E×2=10 signals) obtained by applying the five-signal output type detector to the adjacent tracks (Tn−1 and Tn+1) on both sides (the reference circuit example=FIG. 13)

(3) An evaluation result of the reproduction signal obtained by executing the crosstalk cancellation processing by applying the read signals (A to E) obtained by applying the five-signal output type detector to the current reproduction track (Tn) and the binary reproduction signals (binary data) D (D(Tn−1) and D(Tn+1)) obtained from the adjacent tracks (Tn−1 and Tn+1) on both sides (the reference circuit example=FIGS. 15 and 16 and FIGS. 25 to 29)

(4) An evaluation result of the reproduction signal obtained by executing the crosstalk cancellation processing by applying the read signals obtained by applying the one-signal output type detector to the current reproduction track (Tn) and the binary reproduction signals (binary data) D (D(Tn−1) and D(Tn+1)) obtained from the adjacent tracks (Tn−1 and Tn+1) on both sides (the reference circuit example=FIGS. 15 and 16 and FIGS. 25 to 29)

Further, (1) and (2) correspond to the examples of the related art, (3) and (4) correspond to the configuration example of the present disclosure, that is, the process example in which the reproduction signal generation process including the crosstalk cancellation using the binary reproduction signal (binary data) of the adjacent track is performed.

D5D type of (3) corresponds to the embodiment described above with reference to FIGS. 15 and 16 and FIGS. 25 to 29. The DID type of (4) is the configuration in which the five-signal output type photo detector used in the embodiment described with reference to FIGS. 15 and 16 and FIGS. 25 to 29 is replaced by a one-signal output type photo detector.

As understood from the graph illustrated in FIG. 34, the (e-MLSE) indicating the error rate which is the reproduction signal evaluation value in a case where the processing according to the present disclosure is performed, that is, the reproduction signal generation including the crosstalk cancellation using the binary reproduction signal (binary data) of the adjacent track is performed is below the lines of (1) and (2) corresponding to the examples of the related art, and the satisfactory reproduction signal with less error rate is obtained.

Particularly, it indicates that even in a case where the spot light is located at a position deviated from the track center, the degradation of the quality of the reproduction signal is small.

FIG. 34 illustrates the quality evaluation result of the reproduction data in the process example using the adjacent reproduction signals on both sides adjacent to the current reproduction track (Tn), and next, a quality evaluation result of the reproduction data in the process example using the reproduction signal of one adjacent track (Tn−1) adjacent to the current reproduction track (Tn) will be described with reference to FIG. 36.

Figure 36:
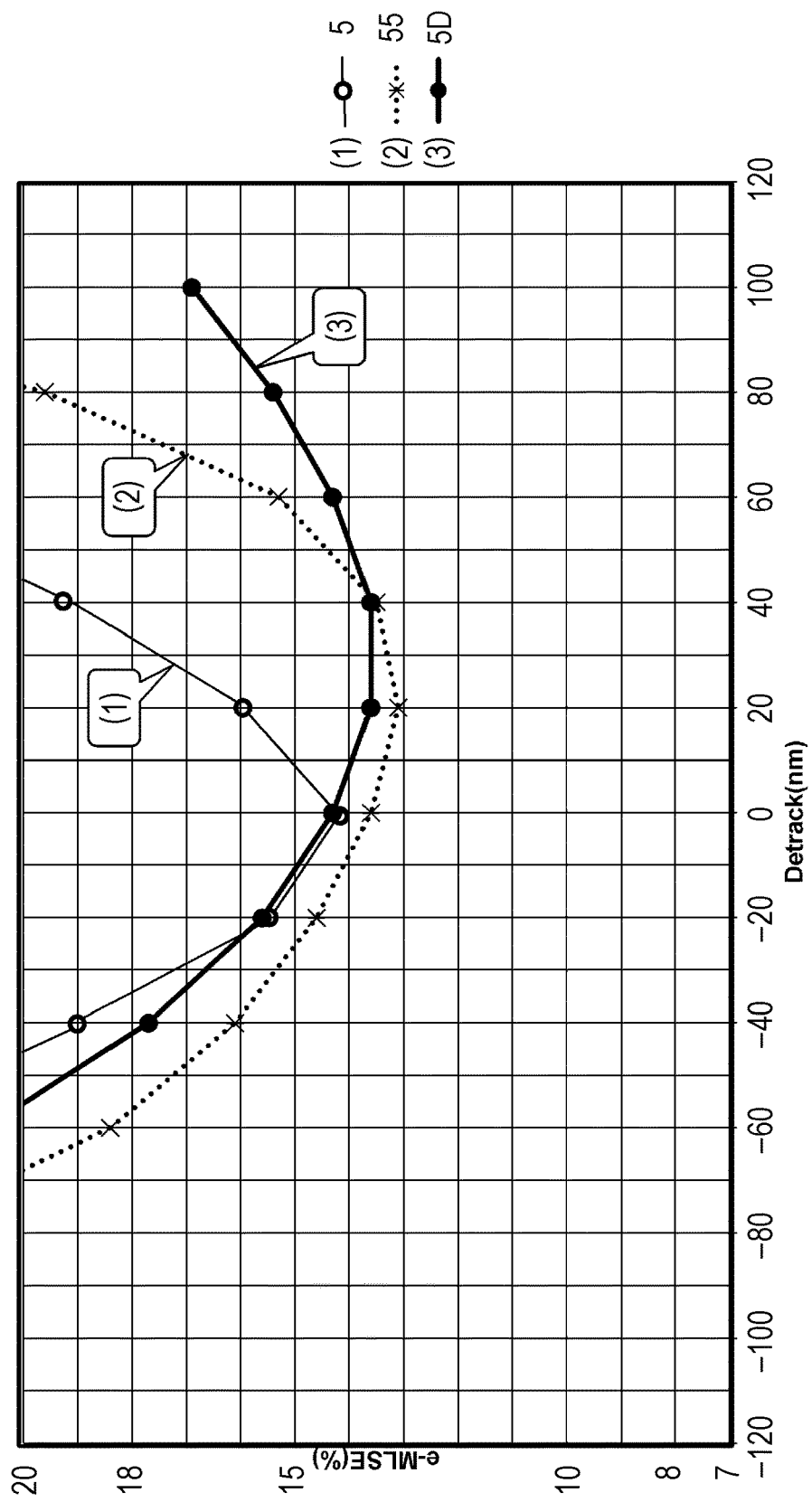
FIG. 36 is a diagram for describing quality evaluation data of reproduction data.

FIG. 36 is a graph illustrating the quality evaluation results of the reproduction signals obtained by a plurality of different reproduction processes, similarly to FIG. 34.

Specifically, it is a graph illustrating a correspondence relation between a position deviation amount (Detrack) of the center of irradiation spot light from the center of the current reproduction track and a reproduction signal evaluation value (e-MLSE).

FIG. 36 is a diagram illustrating an example of a reproduction data quality evaluation result by simulation in a case where data recording and data reproduction are performed in accordance with the following condition setting, similarly to FIG. 34.

The condition setting is as follows.
laser wavelength of optical pickup: λ=405 nm
numerical aperture of optical pickup: NA=0.85
recording density: 55 GBL (linear recording density in which the track pitch of a Blu-ray (a registered trademark) disc (BD) is 0.32 μm, and one layer is 55 GB)
PR (235777532)

Evaluation results (1) to (3) of three reproduction signals illustrated in FIG. 36 are the following three pieces of reproduction signal evaluation data as illustrated in FIG. 37.

(1) An evaluation result of the reproduction signal generated by applying the read signal (A to E) using the five-signal output type detector to the current reproduction track (Tn) (the reference circuit example=FIG. 4)

(2) An evaluation result of the reproduction signal obtained by executing the crosstalk cancellation processing by applying the read signals (A to E) obtained by applying the five-signal output type detector to the current reproduction track (Tn) and the reproduction signals obtained by applying the five-signal output type detector to on adjacent track (Tn−1) (the reference circuit example=FIG. 13)

(3) An evaluation result of the reproduction signal obtained by executing the crosstalk cancellation processing by applying the read signals (the five signals A to E) obtained by applying the five-signal output type detector to the current reproduction track (Tn) and the binary reproduction signal (binary data) D (D(Tn−1)) obtained from one adjacent track (Tn−1) (the reference circuit example=FIGS. 17 and 18 and FIGS. 19 to 24)

Further, 13 is illustrated as the reference circuit example of (2), but FIG. 13 is an example using the reproduction signals of the tracks (Tn−1 and Tn+1) on both sides of the current reproduction track, and a 55 type illustrated in (2) of FIGS. 36 and 37 corresponds to a configuration in which the output from the photo detector 101a is not used from the configuration illustrated in FIG. 13.

Among the signal evaluation lines illustrated in FIG. 36, (1) and (2) correspond to the examples of the related art, and (3) corresponds to the configuration example of the present disclosure, that is, the process example in which the reproduction signal generation process including the crosstalk cancellation using the binary reproduction signal (binary data) of the adjacent track is performed.

As understood from the graph illustrated in FIG. 36, the (e-MLSE) indicating the error rate which is the reproduction signal evaluation value in a case where the processing according to the present disclosure is performed, that is, the reproduction signal generation including the crosstalk cancellation using the binary reproduction signal (binary data) of the adjacent, track is performed is below the lines of (1) and (2) corresponding to the examples of the related art particularly in at a left deviation position (Detrack is a positive side), and the satisfactory reproduction signal with less error rate is obtained.

Further, in the present example, it corresponds to an example in which the crosstalk cancellation is executed using the reproduction signal (binary data) from the right adjacent track.

[5. Conclusion of Configuration of Present Disclosure]

The embodiment of the present disclosure has been described above in detail with reference to the specific examples. However, it is obvious that those skilled in the art can make modifications or substitutions of the embodiment without departing from the gist of the present disclosure. In other words, the present disclosure has been disclosed in the form of an example, and should not be interpreted restrictively. In order to determine the gist of the present disclosure, claims set forth below should be taken into consideration.

Further, the technique disclosed in this specification can have the following configurations.

(1) An information processing device, including:
a photo detector that outputs a readout signal from a reproduction track of an information recording disc;
an adjacent track reproduction identification signal supply unit that outputs a reproduction identification signal obtained from a reproduction signal of an adjacent track of the reproduction track;
a multi-input adaptive equalizer that includes an equalizer unit that receives the readout signal from the reproduction track and an adjacent track reproduction identification signal and outputs an equalization signal by an adaptive equalization process based on an input signal; and
a reproduction signal generating unit that executes a reproduction signal generation process based on the equalization signal and generates a reproduction signal of the reproduction track.

(2) The information processing device according to (1), in which the reproduction identification signal supply unit is an adjacent track reproduction binary signal supply unit that outputs a binary signal (binary data) obtained from the reproduction signal of the adjacent track, and
the reproduction signal generating unit is a binarization processing unit that executes a binarization process based on the equalization signal and generates the reproduction signal of the reproduction track.

(3) The information processing device according to (2), in which the adjacent track reproduction binary signal supply unit outputs a binary signal (binary data) of at least one adjacent t rack of the reproduction track.

(4) The information processing device according to (2), in which the adjacent track reproduction binary signal supply unit outputs binary signals (binary data) of two adjacent tracks of the reproduction track.

(5) The information processing device according to any of (2) to (4), in which the adjacent track reproduction binary signal supply unit generates an adjacent track reproduction binary signal on the basis of a read signal of an adjacent track read via an optical pickup.

(6) The information processing device according to any of (2) to (4), in which the adjacent track reproduction binary signal supply unit acquires an adjacent track reproduction binary signal previously stored in a record data storage memory from the record data storage memory.

(7) The information processing device according to any of (2) to (6), further including:
a memory that stores an adjacent track reproduction binary signal supplied by the adjacent track reproduction binary signal supply unit; and
a memory controller that executes data input control on the multi-input adaptive equalizer from the memory.

(8) The information processing device according to (7), in which the memory controller executes data input control of simultaneously inputting a readout signal from the reproduction track and an adjacent track reproduction binary-signal at a position nearest to the readout signal to the multi-input adaptive equalizer.

(9) The information processing device according to any of (2) to (8), in which the photo detector is a multi-signal output type photo detector that outputs a plurality of signals corresponding to an amount of received light of a split region unit, and
the multi-input adaptive equalizer includes an equalizer unit that receives the plurality of signals output from the photo detector and an adjacent track reproduction binary signal and outputs an equalization signal by an adaptive equalization process based on an input signal.

(10) The information processing device according to (9), in which the photo detector is a multi-signal output type photo detector that has a plurality of split regions along a track direction (tangential direction) and outputs a plurality of signals corresponding to the amount of received light of each split region unit.

(11) The information processing device according to (8), (9), or (10), in which the photo detector is a multi-signal output type photo detector that has a plurality of split regions along a disc radial direction (radial direction) and outputs a plurality of signals corresponding to the amount of received light of each split region unit.

(12) The information processing device according to any of (2) to (11), in which an output of the photo detector is input to a matrix calculation circuit,
the matrix calculation circuit outputs a plurality of signals corresponding to an amount of received light of a split region unit of the photo detector, and
the multi-input adaptive equalizer includes an equalizer unit that receives the plurality of signals output from the matrix calculation circuit and an adjacent track reproduction binary signal and outputs an equalization signal by an adaptive equalization process based on an input signal.

(13) The information processing device according to any of (2) to (12), in which the multi-input adaptive equalizer executes a partial response equalization process based on an input signal, and
the binarization processing unit executes a maximum likelihood decoding process as the binarization process for the equalization signal output from the multi-input adaptive equalizer.

(14) The information processing device according to any of (2) to (13), further including:
a partial response (PR) convolution unit that generates an equalization target signal on the basis of the binary signal generated by the binarization processing unit; and an equalization error calculating unit that calculates an equalization error from the equalization target signal and the equalization signal output from the multi-input adaptive equalizer unit, in which the multi-input adaptive equalizer receives the equalization error and executes an adaptive equalization process.

(15) The information processing device according to any of (1) to (14), in which the information recording disc is a disc in which data recording is performed on both a land and a groove, and the reproduction track and the adjacent track are a combination of a land track and a groove track.

(16) The information processing device according to (2), further including:

a configuration that executes data reproduction in parallel from the adjacent track;

a first photo detector that outputs a readout signal from a first reproduction track of the information recording disc;

a second photo detector that outputs a readout signal from a second reproduction track adjacent to the first reproduction track;

a decoder that generates a binary signal (binary data) serving as a reproduction signal of the first reproduction track and a binary signal (binary data) serving as a reproduction signal of the second reproduction track;

a first reproduction track compatible multi-input adaptive equalizer that includes an equalizer unit that receives the readout signal from the first reproduction track and the binary signal serving as the reproduction signal of the second reproduction track generated by the decoder, and outputs an equalization signal by an adaptive equalization process based on an input signal;

a second reproduction track compatible multi-input adaptive equalizer that includes an equalizer unit that receives the readout signal from the second reproduction track and the binary signal serving as the reproduction signal of the first reproduction track generated by the decoder, and outputs an equalization signal by an adaptive equalization process based on an input signal;

a first track compatible binarization processing unit that executes a binarization process based on the equalization signal output from the first reproduction track compatible multi-input adaptive equalizer and generates a first track compatible reproduction binary signal; and a second track compatible binarization processing unit that executes a binarization process based on the equalization signal output from the second reproduction track compatible multi-input adaptive equalizer and generates a second track compatible reproduction binary signal.

(17) An information processing method executed in an information processing device, the method including:

outputting, by a photo detector, a readout signal from a reproduction track of an information recording disc;

outputting, by an adjacent track reproduction identification signal supply unit, a reproduction identification signal obtained from a reproduction signal of an adjacent track of the reproduction track;

inputting, by a multi-input adaptive equalizer, the readout signal from the reproduction track and an adjacent track reproduction identification signal to an equalizer unit and outputting an equalization signal by an adaptive equalization process based on an input signal; and executing, by a reproduction signal generating unit, a reproduction signal generation process based on the equalization signal and generating a reproduction signal of the reproduction track.

(18) A program causing an information processing device to execute information processing including:

a process of outputting, by a photo detector, a readout signal from a reproduction track of an information recording disc;

a process of outputting, by an adjacent track reproduction identification signal supply unit, a reproduction identification signal obtained from a reproduction signal of an adjacent track of the reproduction track;

a process of inputting, by a multi-input adaptive equalizer, the readout signal from the reproduction track and an adjacent track reproduction identification signal to an equalizer unit and outputting an equalization signal by an adaptive equalization process based on an input signal; and a process of generating, by a reproduction signal generating unit, a reproduction signal of the reproduction track by executing a reproduction signal generation process based on the equalization signal.

Further, a series of processes described in the specification can be executed by hardware, software, or a combination of both. In a case where a process by software is executed, a program having a processing sequence recorded therein may be installed in a memory in a computer incorporated into dedicated hardware and executed, or a program may be installed in a general-purpose computer capable of executing various kinds of processes and executed. For example, the program may be recorded in a recording medium in advance. The program may be installed in a computer from a recording medium, and the program may be received via a network such as a local area network (LAN) and the Internet and installed on a recording medium such as an internal hard disk.

Further, various kinds of processes described in the specification may be chronologically executed in accordance with the description or may be executed in parallel or separately depending on a processing capability of a device that executes a process or if necessary. Further, in this specification, a system refers to a logical aggregate configuration of a plurality of devices and is not limited to a configuration in which devices of respective components are in the same housing.

INDUSTRIAL APPLICABILITY

As described above, according to the configuration of one embodiment of the present disclosure, a device and a method which are capable of performing crosstalk-removed high-quality data reproduction from a high-density recording type optical disc are realized.

Specifically, the device includes a photo detector that outputs a readout signal from a reproduction track of an information recording disc, an adjacent track reproduction binary signal supply unit that outputs a binary signal (binary data) which is a reproduction signal of an adjacent track of the reproduction track, a multi-input adaptive equalizer that includes an equalizer unit that receives the readout signal from the reproduction track and an adjacent track reproduction binary signal and outputs an equalization signal by an adaptive equalization process based on an input signal, and a binarization processing unit that executes a binarization process based on the equalization signal and generates a reproduction signal of the reproduction track.

With this configuration, a device and a method which are capable of performing crosstalk-removed high-quality data reproduction from a high-density recording type optical disc are realized.

REFERENCE SIGNS LIST

10 Disc
11 Optical pickup
12 Spindle motor
13 Thread
14 Matrix circuit
15 Data detection processing unit
16 Wobble signal processing unit
17 ENC/DEC
18 Host I/F
19 Address decoder
20 System controller
21 Optical block servo circuit
22 Spindle servo circuit
23 Laser driver
24 Write strategy
25 Thread driver
26 ADIP demodulation processing unit
27 Spindle driver
28 Driver
30 Host device
51 Semiconductor laser
52 Collimator lens
53 Polarizing beam splitter
54 Objective lens
55 Lens
56 Photo detector
61 ADC
62 PLL
63 Multi-input adaptive equalizer
64 Binary detector
65 PR convolution unit
66 Equalization error calculator
67 Addition circuit
71 to 75 Adaptive equalizer unit
76 Adder
80 Delay element
81 Coefficient multiplier
82 Calculator
83 Integrator
8 4 Adder
91 Subtracter
92 Coefficient multiplier
101 Photo detector
102 ADC
103 Memory
104 System controller
105 Memory controller
106 Multi-input adaptive equalizer
111 to 113 Adaptive equalizer unit
114 Adder
120 Multi-input adaptive equalizer set
121 to 123 Multi-input adaptive equalizer
124 Adder
131 to 135 Adaptive equalizer unit
136 Adder
201 Photo detector
202 ADC
203 Adjacent track reproduction binary signal supply unit
204 Memory
205 Multi-input adaptive equalizer
211 to 216 adaptive equalizer unit
217 Adder
220 System controller
221. Memory controller
230 Memory
251 Binary detector (PRML decoder)
252 PR convolution unit (PR target signal generating unit)
253 Subtracter
254 PLL
311, 322 Optical pickup
312, 322 Photo detector
313, 323 ADC
314, 324 First multi-input adaptive equalizer
315, 325 Memory
316, 326 Second multi-input adaptive equalizer
317, 327 Second decoder
318, 328 First decoder
331, 332, 336, 337 Adaptive equalizer unit

The invention claimed is:

1. An information processing device, comprising:
a photo detector that outputs a readout signal from a reproduction track of an information recording disc;
an adjacent track reproduction binary signal supply unit that outputs a binary signal (binary data) obtained from a reproduction signal of an adjacent track of the reproduction track;
a multi-input adaptive equalizer that includes an equalizer unit that receives the readout signal from the reproduction track, another equalizer unit that receives the adjacent track reproduction binary signal, and an adder that adds an output of the equalizer unit and an output of the another equalizer unit, and outputs an output of the adder as an equalization signal by an adaptive equalization process based on an input signal; and
a binarization processing unit that executes a binarization process based on the equalization signal and generates a reproduction signal of the reproduction track,
wherein the adjacent track reproduction binary signal supply unit, the multi-input adaptive equalizer, and the binarization processing unit are each implemented via at least one processor.

2. The information processing device according to claim 1, wherein the adjacent track reproduction binary signal supply unit outputs a binary signal (binary data) of at least one adjacent track of the reproduction track.

3. The information processing device according to claim 1, wherein the adjacent track reproduction binary signal supply unit outputs binary signals (binary data) of two adjacent tracks of the reproduction track.

4. The information processing device according to claim 1, wherein the adjacent track reproduction binary signal supply unit generates an adjacent track reproduction binary signal on the basis of a read signal of an adjacent track read via an optical pickup.

5. The information processing device according to claim 1, wherein the adjacent track reproduction binary signal supply unit acquires an adjacent track reproduction binary signal previously stored in a record data storage memory from the record data storage memory.

6. The information processing device according to claim 1, further comprising:
a memory that stores an adjacent track reproduction binary signal supplied by the adjacent track reproduction binary signal supply unit; and
a memory controller that executes data input control on the multi-input adaptive equalizer from the memory.

7. The information processing device according to claim 6, wherein the memory controller executes data input control of simultaneously inputting a readout signal from the reproduction track and an adjacent track reproduction binary signal at a position nearest to the readout signal to the multi-input adaptive equalizer.

8. The information processing device according to claim 1, wherein the photo detector is a multi-signal output type photo detector that outputs a plurality of signals corresponding to an amount of received light of a split region, and
the multi-input adaptive equalizer includes an equalizer unit that receives the plurality of signals output from the photo detector and an adjacent track reproduction binary signal and outputs an equalization signal by an adaptive equalization process based on an input signal.

9. The information processing device according to claim 8, wherein the photo detector is a multi-signal output type photo detector that has a plurality of split regions along a track direction (tangential direction) and outputs a plurality of signals corresponding to the amount of received light of each split region of the plurality of split regions.

10. The information processing device according to claim 8, wherein the photo detector is a multi-signal output type photo detector that has a plurality of split regions along a disc radial direction (radial direction) and outputs a plurality of signals corresponding to the amount of received light of each split region of the plurality of split regions.

11. The information processing device according to claim 1, wherein an output of the photo detector is input to a matrix calculation circuit,
the matrix calculation circuit outputs a plurality of signals corresponding to an amount of received light of a split region unit of the photo detector, and
the multi-input adaptive equalizer includes an equalizer unit that receives the plurality of signals output from the matrix calculation circuit and an adjacent track reproduction binary signal and outputs an equalization signal by an adaptive equalization process based on an input signal.

12. The information processing device according to claim 1, wherein the multi-input adaptive equalizer executes a partial response equalization process based on an input signal, and
the binarization processing unit executes a maximum likelihood decoding process as the binarization process for the equalization signal output from the multi-input adaptive equalizer.

13. The information processing device according to claim 1, further comprising:
a partial response (PR) convolution unit that generates an equalization target signal on the basis of the binary signal generated by the binarization processing unit; and
an equalization error calculating unit that calculates an equalization error from the equalization target signal and the equalization signal output from the multi-input adaptive equalizer,
wherein the multi-input adaptive equalizer receives the equalization error and executes an adaptive equalization process, and
wherein the partial response (PR) convolution unit and the equalization error calculating unit are each implemented via at least one processor.

14. The information processing device according to claim 1, wherein the information recording disc is a disc in which data recording is performed on both a land and a groove, and
the reproduction track and the adjacent track are a combination of a land track and a groove track.

15. The information processing device according to claim 1, further comprising:
a configuration that executes data reproduction in parallel from the adjacent track;
a first photo detector that outputs a readout signal from a first reproduction track of the information recording disc;
a second photo detector that outputs a readout signal from a second reproduction track adjacent to the first reproduction track;
a decoder that generates a binary signal (binary data) serving as a reproduction signal of the first reproduction track and a binary signal (binary data) serving as a reproduction signal of the second reproduction track;
a first reproduction track compatible multi-input adaptive equalizer that includes an equalizer unit that receives the readout signal from the first reproduction track and the binary signal serving as the reproduction signal of the second reproduction track generated by the decoder, and outputs an equalization signal by an adaptive equalization process based on an input signal;
a second reproduction track compatible multi-input adaptive equalizer that includes an equalizer unit that receives the readout signal from the second reproduction track and the binary signal serving as the reproduction signal of the first reproduction track generated by the decoder, and outputs an equalization signal by an adaptive equalization process based on an input signal;
a first track compatible binarization processing unit that executes a binarization process based on the equalization signal output from the first reproduction track compatible multi-input adaptive equalizer and generates a first track compatible reproduction binary signal; and
a second track compatible binarization processing unit that executes a binarization process based on the equalization signal output from the second reproduction track compatible multi-input adaptive equalizer and generates a second track compatible reproduction binary signal,
wherein the decoder, the first reproduction track compatible multi-input adaptive equalizer, the second reproduction track compatible multi-input adaptive equalizer, the first track compatible binarization processing unit, and the second track compatible binarization processing unit are each implemented via at least one processor.

16. An information processing method executed in an information processing device, the method comprising:
outputting, by a photo detector, a readout signal from a reproduction track of an information recording disc;
outputting, by an adjacent track reproduction binary signal supply unit, a binary signal (binary data) obtained from a reproduction signal of an adjacent track of the reproduction track;
inputting, by a multi-input adaptive equalizer, the readout signal from the reproduction track to an equalizer unit;
inputting, by the multi-input adaptive equalizer, an adjacent track reproduction binary signal to another equalizer unit;
inputting, by the multi-input adaptive equalizer, an output of the equalizer unit and an output of the another equalizer unit to an adder;
outputting, by the adder, an equalization signal by an adaptive equalization process based on an input signal; and
executing, by a binarization processing unit, a binarization process based on the equalization signal and generating a reproduction signal of the reproduction track.

17. A non-transitory computer-readable medium having embodied thereon a program, which when executed by a computer causes the computer to execute an information processing method, the method comprising:

outputting, by a photo detector, a readout signal from a reproduction track of an information recording disc;

outputting, by an adjacent track reproduction binary signal supply unit, a binary signal (binary data) obtained from a reproduction signal of an adjacent track of the reproduction track;

inputting, by a multi-input adaptive equalizer, the readout signal from the reproduction track to an equalizer unit;

inputting, by the multi-input adaptive equalizer, an adjacent track reproduction binary signal to another equalizer unit;

inputting, by the multi-input adaptive equalizer, an output of the equalizer unit and an output of the another equalizer unit to an adder;

outputting, by the adder, an equalization signal by an adaptive equalization process based on an input signal; and generating, by a binarization processing unit, a reproduction signal of the reproduction track by executing a binarization process based on the equalization signal.

\* \* \* \* \*